(12) United States Patent
Kawanishi

(10) Patent No.: US 9,146,353 B2
(45) Date of Patent: Sep. 29, 2015

(54) OPTICAL FIBER FUSION SPLICER

(71) Applicant: FUJIKURA LTD., Koto-ku, Tokyo (JP)

(72) Inventor: Noriyuki Kawanishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/496,716

(22) Filed: Sep. 25, 2014

(65) Prior Publication Data

US 2015/0049991 A1    Feb. 19, 2015

Related U.S. Application Data

(63) Continuation of application No. PCT/JP2012/083080, filed on Dec. 20, 2012.

(30) Foreign Application Priority Data

Mar. 29, 2012    (JP) .................................. 2012-078259

(51) Int. Cl.
G02B 6/255    (2006.01)
G02B 6/36    (2006.01)

(52) U.S. Cl.
CPC ............ *G02B 6/2551* (2013.01); *G02B 6/2553* (2013.01); *G02B 6/2555* (2013.01); *G02B 6/3616* (2013.01)

(58) Field of Classification Search
CPC ........ G02B 6/255; G02B 6/2553; G02B 6/00; G02B 6/01
USPC ................................. 385/96, 14, 16
See application file for complete search history.

(56) References Cited

U.S. PATENT DOCUMENTS

| 6,610,965 | B1 | 8/2003 | Tanabe | |
|---|---|---|---|---|
| 2003/0000257 | A1* | 1/2003 | Chang et al. .................... | 65/425 |
| 2004/0190834 | A1* | 9/2004 | Bush et al. ...................... | 385/50 |
| 2004/0190838 | A1* | 9/2004 | Bush et al. ...................... | 385/96 |

(Continued)

FOREIGN PATENT DOCUMENTS

| CN | 101164001 A | 4/2008 |
|---|---|---|
| JP | 05-134127 A | 5/1993 |

(Continued)

OTHER PUBLICATIONS

Communication dated Oct. 31, 2014, issued by the State Intellectual Property Office of P.R. China in counterpart Chinese application No. 201310086300.1.

(Continued)

*Primary Examiner* — Kaveh Kianni
(74) *Attorney, Agent, or Firm* — Sughrue Mion, PLLC

(57) ABSTRACT

An optical fiber fusion splicer includes: a windshield cover that is formed so as to be openable and closable and that includes one or more cover members that cover a heat fusion portion in a closed state; a pair of fiber mounting portions that are provided on left and right sides of the heat fusion portion; a pair of fiber mounting detectors that are provided in the fiber mounting portions and that detect that an optical fiber has been mounted. Also, when both the fiber mounting detectors detect that the optical fibers have been mounted in a state where the cover member is open, an operation to close the cover member is performed, the fusion splice is performed, connection portion inspection is performed, and an operation to open the windshield cover is performed after the connection portion inspection is completed.

15 Claims, 26 Drawing Sheets

(56) References Cited

U.S. PATENT DOCUMENTS

| | | | | |
|---|---|---|---|---|
| 2004/0190839 A1* | 9/2004 | Bush et al. | ............ | 385/96 |
| 2006/0280417 A1 | 12/2006 | Sato et al. | | |
| 2008/0282522 A1 | 11/2008 | Song et al. | | |
| 2010/0074582 A1* | 3/2010 | Kossat | ............ | 385/95 |

FOREIGN PATENT DOCUMENTS

| | | | |
|---|---|---|---|
| JP | 11-090625 A | 4/1999 | |
| JP | 2001-066456 A | 3/2001 | |
| JP | 2003-167151 A | 6/2003 | |
| JP | 2004184543 A | 7/2004 | |
| JP | 2005-164792 A | 6/2005 | |
| JP | 3761192 B | 3/2006 | |
| JP | 2009-506348 A | 2/2009 | |
| JP | 2009-086201 A | 4/2009 | |
| JP | 2009-300846 A | 12/2009 | |
| JP | 4382694 B | 12/2009 | |
| JP | 201054689 A | 3/2010 | |
| KR | 1020070029702 A | 3/2007 | |
| WO | 2006/112675 A1 | 10/2006 | |

OTHER PUBLICATIONS

Communication dated Oct. 5, 2014, issued by the Korean Intellectual Property Office in corresponding Korean Application No. 10-2013-7018009.

International Search Report in Application No. PCT/JP2012/083080 mailed Mar. 5, 2013.

Office Action issued by Japanese Patent Office in Japanese Application No. 2012-078259 mailed Nov. 27, 2012.

Office Action issued by Japanese Patent Office in Japanese Patent Application No. 2013-031453 mailed Sep. 24, 2013.

Communication dated Apr. 14, 2015, issued by the Korean Intellectual Property Office in counterpart Application No. 10-2013-7018009.

Communication dated Jan. 22, 2013, issued by the Japanese Patent Office in counterpart Application No. 2012078259.

Communication dated Jun. 24, 2014, issued by the Japanese Patent Office in counterpart Application No. 2013243153.

Communication dated Sep. 9, 2014, issued by the Japanese Patent Office in counterpart Application No. 2013243153.

English Machine Translation of JP2005164792A filed in an IDS on Oct. 31, 2014.

English Machine Translation of JP05134127A filed in an IDS on Oct. 31, 2014.

English Machine Translation of JP2009086201A filed in an IDS on Oct. 31, 2014.

English Machine Translation of JP2001066456A filed in an IDS on Oct. 31, 2014.

English Machine Translation of JP2009300846A filed in an IDS on Oct. 31, 2014.

* cited by examiner

OPTICAL FIBER FUSION SPLICER

CROSS REFERENCE TO RELATED APPLICATIONS

This application is a continuation application based on a PCT Patent Application No. PCT/JP2012/083080, filed Dec. 20, 2012, whose priority is claimed on Japanese Patent Application No. 2012-78259, filed Mar. 29, 2012, the entire content of which are hereby incorporated by reference.

BACKGROUND OF THE INVENTION

1. Field of the Invention

The present invention relates to an optical fiber fusion splicer and in particular, to an optical fiber fusion splicer having an openable and closable windshield cover that covers a heat fusion portion for fusion-splicing optical fibers by heating.

2. Description of the Related Art

As an optical fiber fusion splicer, an apparatus (single-core machine) which fusion-splices a pair of optical fibers facing each other in the longitudinal direction by performing discharging and heating between a pair of electrode rods, or an apparatus (multi-core machine) which fusion-splices a plurality of optical fibers (tape fibers) in a bundle by performing discharging and heating between a pair of electrode rods, is provided.

In addition, as a conventional optical fiber fusion splicer (hereinafter, simply referred to as a fusion splicer), an apparatus with the following function and configuration is widely available (Japanese Patent No. 4382694).

(1) An optical fiber is illuminated from two directions using two light sources, and two-axis imaging (two-axis observation) of the optical fiber from the two directions is performed using two lenses and two cameras (for example, Japanese Patent No. 4382694).

(2) A pair of V grooves are provided on both sides of a heat fusion portion disposed between a pair of electrode rods.

The pair of V grooves are formed so that the fusion-spliced tips of optical fibers can be positioned between the pair of electrode rods.

The pair of V grooves are provided along the apparatus body top surface, on which a pair of electrode rods are disposed, and also the pair of V grooves are provided both side of the heat fusion portion in left and right direction perpendicular to a front and rear direction in which the pair of electrode rods are spaced apart.

As the optical fiber, a coated optical fiber, such as an optical fiber core or an optical fiber stand, is used in many cases.

An optical fiber glass portion obtained by removing the coat of the tip of the optical fiber (coated optical fiber) is disposed on the V groove, and is held between the V groove and a fiber clamp member that presses the optical fiber glass portion against the V groove from above.

Corresponding to two optical fibers disposed in the left and right direction, two sets of V grooves and fiber clamp members are provided (for example, Japanese Patent No. 4382694).

(3) In order to hold coated portions of left and right optical fibers, movable coating clamps are provided in the left and right direction of the apparatus body, or a fiber holder is disposed on each side in the left and right direction so as to move in the left and right direction of the apparatus body (for example, Japanese Patent No. 3761192 and Japanese Unexamined Patent Application, First Publication No. 2003-167151).

(4) Discharge that occurs between the electrode rods is sensitive to wind, and a fluctuation in discharge also occurs due to receiving a slight wind.

Therefore, as a fusion splicer, a configuration is adopted in which an openable and closable windshield cover that covers an electrode rod, a V groove, a fiber clamp member, or a coating clamp is provided (for example, Japanese Patent No. 4382694, Japanese Patent No. 3761192, and Japanese Unexamined Patent Application, First Publication No. 2003-167151, and Japanese Unexamined Patent Application, First Publication No. 2003-167151).

The windshield cover is configured to have a sealed structure, in which the wind does not reach a discharge portion between the pair of electrode rods, by covering the electrode rod and the like.

The operation of mounting an optical fiber in the general fusion splicer of the conventional art is as follows.

(a) Coating clamp system: close the lid, and hold a single-core optical fiber by pinching it with a coating clamp.

A large coating clamp can hold single-core optical fibers having various coat diameters.

In addition, since the coating clamp is fixed to the apparatus (fusion splicer), there is no risk of losing the coating clamp.

(b) Fiber holder system: place a fiber holder separate from the fusion splicer on the fusion splicer.

The fiber holder holds an optical fiber by pinching it between a base plate and a cover plate that is pivotally attached to the base plate so as to be openable and closable.

In addition, the fiber holder is placed in the fusion splicer in a state of holding the optical fiber.

The fiber holder allows the optical fiber to be easily mounted in each process of coat removal, cutting, and fusion.

In the fiber holder system, however, it is necessary to prepare various kinds of fiber holders corresponding to the coat diameter or the number of core wires.

A windshield cover of a conventional fusion splicer is generally formed by one or more cover members that can be manually opened and closed.

Therefore, when performing the work of fusion-splicing the optical fibers using a conventional fusion splicer, the windshield cover is manually opened and closed.

That is, in the work of fusion-splicing the optical fibers using a conventional fusion splicer, the optical fibers are first mounted in a state where the windshield cover is open.

In the case of a fusion splicer based on the coating clamp system, each optical fiber is pinched by the coating clamp.

In the case of a fusion splicer based on the fiber holder system, a fiber holder that pinches each optical fiber is mounted in the fusion splicer.

After the mounting of the optical fibers to the fusion splicer is completed, the windshield cover is closed and then a connection start switch of the fusion splicer is turned on.

Then, the optical fibers are moved forward to predetermined positions, and the left and right optical fibers are connected by discharge between electrode rods. As a result, the optical fibers are fusion-spliced.

After the discharge between the electrode rods is performed for a predetermined time, the discharge is automatically stopped, then a connection portion is inspected.

After the completion of fusion splice, the windshield cover is opened, and the optical fibers are taken out.

In the conventional fusion splicer described above, it is necessary to manually close the windshield cover securely after mounting the optical fibers to be fusion-spliced.

In addition, in a conventional fusion splicer, when mounting the optical fibers to be fusion-spliced or taking out the optical fibers after the completion of fusion splice in a state where the windshield cover is open, a risk of the optical fiber being broken due to being hooked to the windshield cover is increased. Accordingly, it was necessary to be cautious when handling the optical fiber.

In addition, the work of fusion-splicing hundreds of optical fibers can be performed in a day.

For this reason, a fusion splicer with a reduction in working time of fusion splice of optical fibers and an improvement in workability has been sought.

In view of the above-described problems, it is an object of the present invention to provide a fusion splicer capable of shortening the working time of fusion splice of optical fibers and an improving workability.

SUMMARY

In order to solve the above-described problems, the following configurations are provided in the present invention.

An optical fiber fusion splicer according to a first aspect of the present invention includes an apparatus body having a heat fusion portion that fusion-splices a pair of optical fibers; a windshield cover that is formed so as to be openable and closable with respect to the apparatus body and that includes one or more cover members that cover the heat fusion portion in a closed state; a pair of fiber mounting portions that are provided on left and right sides of the heat fusion portion and comprise either a coating clamp system including a coating clamp, the coating clamp having a lower clamp member attached to the apparatus body and an upper clamp member pivotally attached to the lower clamp member so as to be openable and closable with respect to the lower clamp member, the coating clamp holding a coated portion of the optical fiber between the lower clamp member and the upper clamp member, or a fiber holder system including a holder mounting portion on which a fiber holder is mounted, the fiber holder serving as the coating clamp, the fiber holder having a base plate and a lid member pivotally attached to the base plate so as to be openable and closable with respect to the base plate, and the fiber holder holding a coated portion of the optical fiber between the base plate and the lid member is detachably placed; a pair of positioning grooves that are provided on the left and right sides of the heat fusion portion, the positioning grooves being disposed between the fiber mounting portions and the heat fusion portion; a pair of fiber clamp members that are connected to the cover members, the fiber clamp members pushing the optical fibers into the positioning grooves when the cover members are closed;

a cover member detector that detects opening and closing of the cover members; a pair of fiber mounting detectors that are provided in the fiber mounting portions and that detect that the optical fiber has been mounted by detecting either that the upper clamp member of the coating clamp has been closed with respect to the lower clamp member or that the optical fiber has been placed on the lower clamp member of the coating clamp when the fiber mounting portions comprise the coating clamp and by detecting either that the fiber holder has been mounted on the holder mounting portion or the optical fiber held and fixed to the fiber holder has been disposed at a predetermined position on the holder mounting portion when the fiber mounting portions comprise the holder mounting portion; a cover open and close power source that generates power to open and close the cover member; and a driving control device that controls driving of the cover open and close power source based on detection signals from the fiber mounting detectors. When both the fiber mounting detectors detect that the optical fibers have been mounted in a state where the cover member is open, an operation to close the cover member by driving the cover member with the cover open and close power source is performed, the fusion splice is performed, connection portion inspection is performed, and an operation to open the windshield cover by driving the windshield cover with the cover open and close power source is performed after the connection portion inspection is completed.

In the optical fiber fusion splicer according to the first aspect of the present invention, the fiber holder and the coating clamp may be configured to be replaced with each other and be mounted with respect to the apparatus body, and the fiber mounting detector may be detectable that the upper clamp member of the coating clamp has been closed with respect to the lower clamp member mounted in the apparatus body and that the fiber holder has been placed on the holder mounting portion mounted on the apparatus body.

In the optical fiber fusion splicer according to the first aspect of the present invention, a clamp mount, to which the coating clamp is attached, or the holder mounting portion may be located on the left and right sides of the heat fusion portion and may be disposed on a movable stage that moves in a left and right direction with respect to the apparatus body, and the fiber mounting detector may be incorporated in the movable stage In the optical fiber fusion splicer according to the first aspect of the present invention, the windshield cover may be formed by two or more cover members that are powered by the cover open and close power source, and cover the heat fusion portion, the positioning groove, and the fiber clamp member, and the fiber holder or the coating clamp placed on the holder mounting portion in a closed state, the one or more cover members may be rotating cover embers, which are opened and closed by being rotated around a rotating shaft disposed along an upper surface of the apparatus body, and a rotational operation range exceeding 90° may be secured in the rotating cover member, and the fiber clamp member is directly connected to an inside of the rotating cover member or is attached to the rotating cover member and is mechanically connected to a clamp arm provided inside the rotating cover member, and may be opened and closed with respect to the positioning groove so as to be interlocked with opening and closing of the rotating cover member.

In the optical fiber fusion splicer according to the first aspect of the present invention, a power source for opening and closing the cover member may generate power by electromagnetic force, and one or more of an electric motor, an electromagnet, and a solenoid may be used.

In the optical fiber fusion splicer according to the first aspect of the present invention, in an operation to open and close the cover member to which the fiber clamp member is connected, when closing the cover member, the cover member may be driven at high speed at the start of closing and at a speed, which is lower than that at the start of closing, at the end of closing.

In the optical fiber fusion splicer according to the first aspect of the present invention, the windshield cover may be divided into two rotating cover members in a front and rear direction.

In the optical fiber fusion splicer according to the first aspect of the present invention, a light source for imaging that emits light when imaging each of the optical fibers with a camera may be disposed on an inner side of each of the two divided rotating cover members.

In the optical fiber fusion splicer according to the first aspect of the present invention, a groove formed substrate having an upper surface, on which the positioning groove is provided, may be provided on the apparatus body, and an axis of the rotating shaft of the rotating cover member may be disposed on approximately the same plane as the upper surface of the groove formed substrate.

An optical fiber fusion splicer according to a second aspect of the present invention includes: an apparatus body having a heat fusion portion that fusion-splices a pair of optical fibers; a windshield cover that is formed so as to be openable and closable with respect to the apparatus body and that includes one or more cover members that cover the heat fusion portion in a closed state; a pair of fiber mounting portions that are provided on left and right sides of the heat fusion portion and comprise either a coating clamp system including a coating clamp, the coating clamp having a lower clamp member attached to the apparatus body and an upper clamp member pivotally attached to the lower clamp member so as to be openable and closable with respect to the lower clamp member, the coating clamp holding a coated portion of the optical fibers between the lower clamp member and the upper clamp member, or a fiber holder system including a holder mounting portion on which a fiber holder is mounted, the fiber holder serving as the coating clamp, the fiber holder having a base plate and a lid member pivotally attached to the base plate so as to be openable and closable with respect to the base plate, and the fiber holder holding a coated portion of the optical fibers between the base plate and the lid member is detachably placed; a pair of positioning grooves that are provided on the left and right sides of the heat fusion portion, the positioning grooves being disposed between the fiber mounting portions and the heat fusion portion; a pair of fiber clamp members that are connected to the cover members, the fiber clamp members pushing the optical fibers into the positioning grooves when the cover members are closed; a cover member detector that detects opening and closing of the cover members; a pair of finger detectors each of which is provided on a side of each fiber mounting portion opposite a side on which the heat fusion portion is provided and each of which detects fingers; a cover open and close power source that generates power to open and close the cover member; and a driving control device that controls driving of the cover open and close power source on the basis of detection signals from the finger detectors. When the pair of finger detectors detect fingers and then the pair of finger detectors do not detect fingers in a state where the cover member is open, an operation to close the windshield cover by driving the windshield cover with the cover open and close power source is performed, fusion splice is performed, connection portion inspection is performed, and an operation to open the cover member by driving the cover member with the cover open and close power source is performed after the connection portion inspection is completed.

An optical fiber fusion splicer according to a third aspect of the present invention includes: an apparatus body having a heat fusion portion that fusion-splices a pair of optical fibers; a windshield cover that is formed so as to be openable and closable with respect to the apparatus body and that includes one or more cover members that cover the heat fusion portion in a closed state; a pair of fiber mounting portions that are provided on left and right sides of the heat fusion portion and comprise either a coating clamp system including a coating clamp, the coating clamp having a lower clamp member attached to the apparatus body and an upper clamp member pivotally attached to the lower clamp member so as to be openable and closable with respect to the lower clamp member, the coating clamp holding a coated portion of the optical fiber between the lower clamp member and the upper clamp member, or a fiber holder system including a holder mounting portion on which a fiber holder is mounted, the fiber holder serving as the coating clamp, the fiber holder having a base plate and a lid member pivotally attached to the base plate so as to be openable and closable with respect to the base plate, and the fiber holder holding a coated portion of the optical fiber between the base plate and the lid member is detachably placed; a pair of positioning grooves that are provided on the left and right sides of the heat fusion portion, the positioning grooves being disposed between the fiber mounting portions and the heat fusion portion; a pair of fiber clamp members that are connected to the cover members, the fiber clamp members pushing the optical fibers into the positioning grooves when the cover members are closed; a cover member detector that detects opening and closing of the cover members; a pair of fiber mounting detectors that are provided in the fiber mounting portions and that detect that the optical fiber has been mounted by detecting either that the upper clamp member of the coating clamp has been closed with respect to the lower clamp member or that the optical fiber has been placed on the lower clamp member of the coating clamp when the fiber mounting portions comprise the coating clamp and by detecting either that the fiber holder has been mounted on the holder mounting portion or the optical fiber held and fixed to the fiber holder has been disposed at a predetermined position on the holder mounting portion when the fiber mounting portions comprise the holder mounting portion; a cover open and close power source that generates power to open and close the cover member; a driving control device that controls driving of the cover open and close power source based on detection signals from the fiber mounting detectors; and an operation command input operating portion to which an operation start command is input by manual operation. When the pair of fiber mounting detectors detect that the optical fibers have been mounted and the operation start command is input from the operation command input operating portion in a state where the cover member is open, an operation to close the cover member by driving the cover member with the cover open and close power source is performed, fusion splice is performed, connection portion inspection is performed, and an operation to open the cover member by driving the cover member with the cover open and close power source is performed after the connection portion inspection is completed.

An optical fiber fusion splicer according to a fourth aspect of the present invention includes: an apparatus body having a heat fusion portion that fusion-splices a pair of optical fibers; a windshield cover that is formed so as to be openable and closable with respect to the apparatus body and that includes one or more cover members that cover the heat fusion portion in a closed state; a pair of fiber mounting portions that are provided on left and right sides of the heat fusion portion and comprise either a coating clamp system including a coating clamp, the coating clamp having a lower clamp member attached to the apparatus body and an upper clamp member pivotally attached to the lower clamp member so as to be openable and closable with respect to the lower clamp member, the coating clamp holding a coated portion of the optical fiber between the lower clamp member and the upper clamp member, or a fiber holder system including a holder mounting portion on which a fiber holder is mounted, the fiber holder serving as the coating clamp, the fiber holder having a base plate and a lid member pivotally attached to the base plate so as to be openable and closable with respect to the base plate, and the fiber holder holding a coated portion of the optical fiber between the base plate and the lid member is detachably placed; a pair of positioning grooves that are provided on the left and right sides of the heat fusion portion, the positioning grooves being disposed between the fiber mounting portions and the heat fusion portion; a pair of fiber clamp members that are connected to the cover members, the fiber clamp members pushing the optical fibers into the positioning grooves when the cover members are closed; a cover member detector that detects opening and closing of the cover members; a pair of finger detectors each of which is provided on a side of each fiber mounting portion opposite a side on which the heat fusion portion is provided and each of which detects fingers; a cover open and close power source that generates power to open and close the cover member; and a driving control device that controls driving of the cover open and close power source on the basis of detection signals from the pair of finger detectors; and an operation command input operating portion to which an operation start command is input by manual operation. When the pair of finger detectors detect fingers and then the pair of finger detectors do not detect fingers and the operation start command is input from the operation command input operating portion in a state where the cover member is open, an operation to close the cover member by driving the cover member with the cover open and close power source is performed, fusion splice is performed, connection portion inspection is performed, and an operation to open the cover member by driving the cover member with the cover open and close power source is performed after the connection portion inspection is completed.

According to the optical fiber fusion splicer according to the aspect of the invention described above, since the operation of opening and closing the cover member that forms a windshield cover can be performed automatically and reliably, it is possible to shorten the working time of fusion splice of optical fibers and improve workability.

DETAILED DESCRIPTION OF THE PREFERRED EMBODIMENTS

Hereinafter, an optical fiber fusion splicer (hereinafter, simply referred to as a fusion splicer) according to a first embodiment of the present invention will be described with reference to the drawings.

Figure 1:
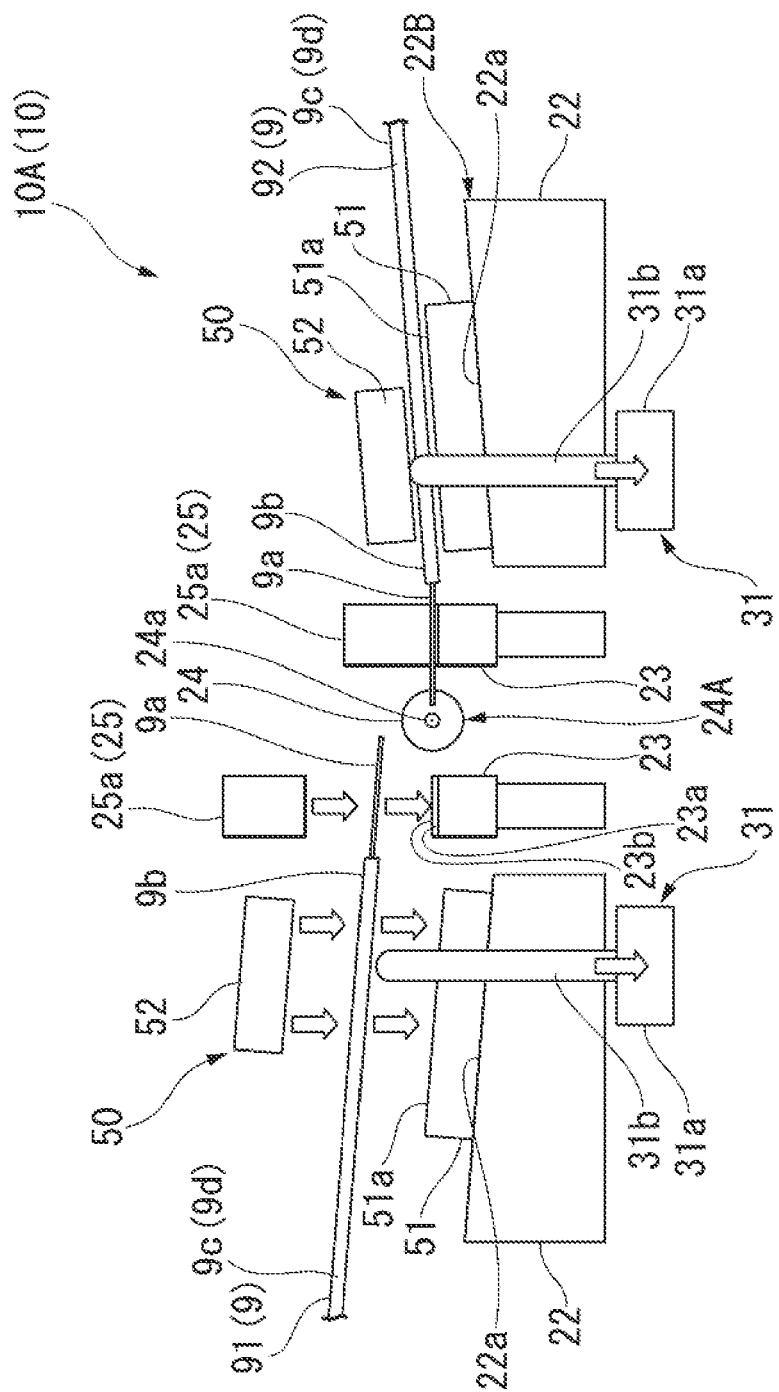
FIG. 1 is a front view schematically showing the configuration of an optical fiber fusion splicer according to an embodiment of the present invention, and is a diagram showing a fusion splicer having a configuration in which coating clamps are disposed on the left and right sides of a heat fusion portion.

FIG. 1 shows an example of the fusion splicer 10.

The fusion splicer 10 (denoted by the reference numeral 10A in the drawing) shown in FIG. 1 is an apparatus that fusion-splices a pair of optical fibers 9.

In FIG. 1, one of the pair of optical fibers 9 fusion-spliced by the fusion splicer 10A is denoted by the reference numeral 91, and the other one is denoted by the reference numeral 92.

The optical fiber 9 illustrated herein is a coated optical fiber, obtained by depositing a coating material 9c (coating) made of a synthetic resin on the outer periphery of an optical fiber glass portion 9a (bare optical fiber) and unifying them, such as an optical fiber core or an optical fiber stand.

As shown in FIGS. 1 and 3 to 6, on an apparatus body 20 having a box-shaped outer appearance, the fusion splicer 10A has: a pair of electrode rods 24 for performing heat fusion between the tips of the optical fibers 91 and 92; a discharge portion 24a that is a region (space) between the tips of a pair of electrode rods 24 facing each other; a pair of movable stages 22 provided on both sides of a heat fusion portion 24A; a pair of coating clamps 50 mounted on the respective movable stages 22; a pair of groove formed substrates 23 in which a positioning groove 23a used for positioning of the optical fibers 91 and 92 is formed; and a windshield cover 60.

The movable stage 22 functions as a clamp mount on which the coating clamp 50 (specifically, a lower clamp member 51 to be described later) is mounted.

As shown in FIGS. 3 to 6, a pair of electrode rods 24 are provided so as to be spaced apart from each other.

The discharge portion 24a forms the heat fusion portion 24A that performs heat fusion between the tips of the optical fibers 91 and 92 by discharge between the tapered tips of a pair of electrode rods 24 facing each other with the discharge portion 24a interposed therebetween.

The direction in which a pair of movable stages 22 face each other is perpendicular to a direction in which the pair of electrode rods 24 face each other.

In this specification, the fusion splicer 10A will be described on the assumption that the direction in which a pair of movable stages 22 face each other (a left and right direction in FIGS. 1 and 2, a depth direction of the paper in FIGS. 3 to 6, and a vertical direction in FIGS. 7 and 8) is a left and right direction and the direction in which a pair of electrode rods 24 face each other (a depth direction of the paper in FIGS. 1 and 2 and a left and right direction in FIGS. 3 to 8) is a front and rear direction.

Figure 3:
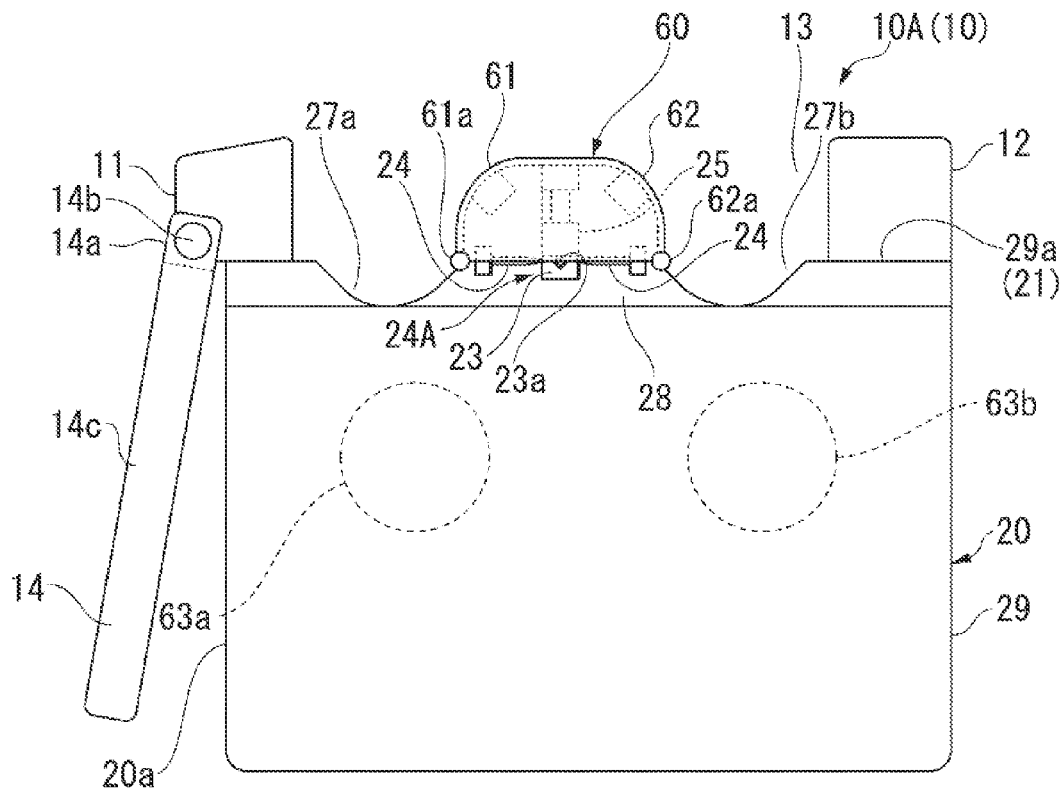
FIG. 3 is an entire side view (right side view) showing the optical fiber fusion splicer shown in FIG. 1, and is a diagram showing a state where a windshield cover is closed.
Figure 4:
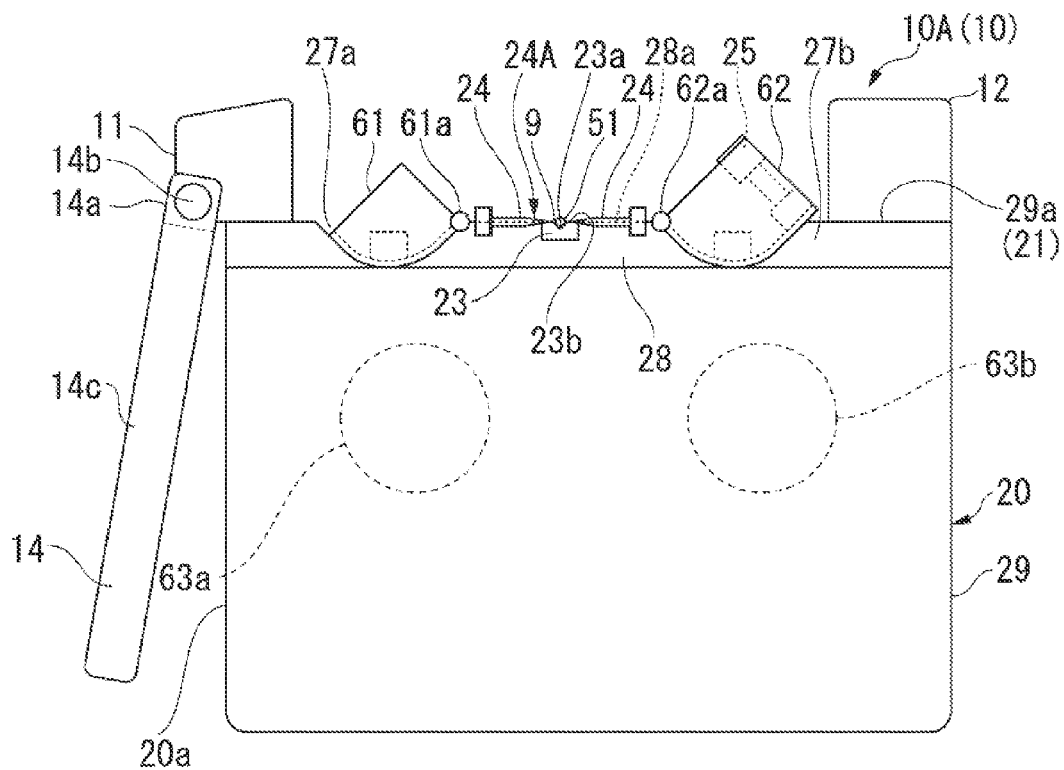
FIG. 4 is an entire side view (right side view) showing the optical fiber fusion splicer shown in FIG. 1, and is a diagram showing a state where the windshield cover is open.

In addition, this explanation will be given on the assumption that the switch board 11 side (left side in FIGS. 3 and 4), of the switch board 11 and a reinforcing sleeve heater 12 that are provided on the apparatus body 20 so as to be spaced apart from each other in the front and rear direction as shown in FIGS. 3 and 4, is the front of the fusion splicer 10 and the reinforcing sleeve heater 12 side (right side in FIGS. 3 and 4) is the back of the fusion splicer 10.

In FIGS. 5 to 8, the left side is the front of the fusion splicer 10 and the right side is the back of the fusion splicer 10.

In addition, FIGS. 1 to 6 and 9 to 11 will be described on the assumption that the upper side is the top and the lower side is the bottom, and FIGS. 7, 8, 12A, and 12B will be described on the assumption that the front side of the paper is the top and the depth side of the paper is the bottom.

The movable stage 22 can move in the left and right direction with respect to the apparatus body 20 by the driving force of a power source (power source for stages) (not shown) provided in the apparatus body 20.

In addition, as the power source for stages, a power source that is driven by the electromagnetic force and generates power is preferable. For example, an electric motor, an electromagnet, a solenoid, and the like can be appropriately adopted.

The coating clamp 50 has the lower clamp member 51 fixed on the movable stage 22 and an upper clamp member 52, which is provided so as to be openable and closable with respect to a top surface 51a of the lower clamp member 51 and which holds the optical fiber 9 together with the lower clamp member 51 so as to be fixed therebetween.

As a specific embodiment of the coating clamp 50, for example, a configuration can be mentioned in which the optical fiber 9 is held and fixed between the plate-like lower clamp member 51, which is fixed on the movable stage 22, and the plate-like upper clamp member 52, which is pivotally attached to the lower clamp member 51 and is provided so as to be openable and closable with respect to the top surface 51a of the lower clamp member.

As the coating clamp 50, it is possible to adopt a clamp in which holding the optical fiber 9 between the upper clamp member 52 and the lower clamp member 51 by opening and closing the upper clamp member 52 with respect to the lower clamp member 51 by the up-and-down movement with respect to the top surface 51a of the lower clamp member and releasing the holding can be switched.

The coating clamp 50 holds and fixes a coated portion 9d between the lower clamp member 51 and the upper clamp member 52, the coated portion 9d being a portion obtained by coating the outer periphery of the optical fiber glass portion 9a in the optical fiber 9 with the coating material 9c.

The optical fiber 9 is mounted in the fusion splicer 10A by being held and fixed to the coating clamp 50.

The coating clamp 50 functions as a fiber mounting unit to mount the optical fiber 9 in the fusion splicer 10A.

In the coating clamp 50 provided in the fusion splicer 10A according to the present embodiment, the worker can directly operate the upper clamp member 52 by fingers (manually) to open and close the upper clamp member 52 with respect to the lower clamp member 51.

In addition, the coating clamp 50 has an upper member holding portion (not shown).

The upper member holding portion maintains a held and fixed state of the optical fiber 9 by holding the upper clamp member 52 in a state where the optical fiber 9 is held.

As this upper member holding portion, for example, it is possible to appropriately adopt a configuration capable of holding the upper clamp member 52 just by manually closing the upper clamp member 52 with respect to the lower clamp member 51 and of releasing the holding manually, such as a configuration that performs magnetic adsorption of a metal portion of the upper clamp member 52 using a permanent magnet provided in the lower clamp member 51 or a configuration using an engaging claw with which manual engagement and release operations are possible.

In addition, as the configuration of the upper member holding portion, it is possible to adopt a conventional known configuration for the coating clamp of the fusion splicer.

Figure 6:
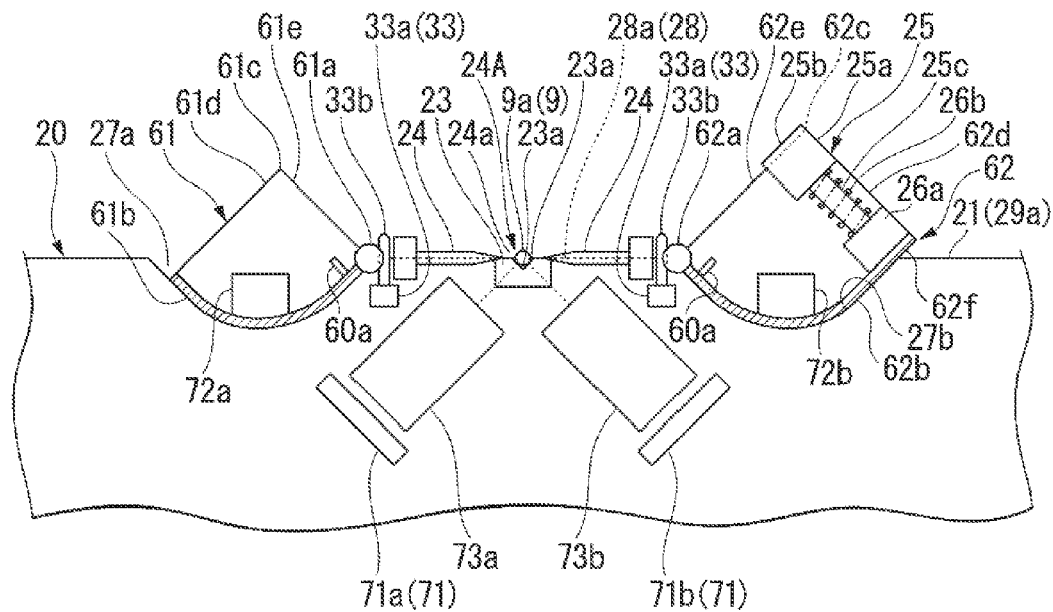
FIG. 6 is a cross-sectional side view (right side cross-sectional view) schematically showing a structure near the windshield cover of the optical fiber fusion splicer shown in FIG. 1, and is a diagram showing a state where the windshield cover is open.

In the work of fusion-splicing a pair of optical fibers 91 and 92 using the fusion splicer 10A, the optical fiber 9 (coated portion 9d) is interposed between the lower clamp member 51 and the upper clamp member 52 by manually opening and closing the upper clamp member 52 of the coating clamp 50 in a state where the windshield cover 60 is open as shown in FIGS. 4 and 6.

Here, as the optical fiber 9 held and fixed to the coating clamp 50, a fiber having the optical fiber glass portion 9a that is exposed by removing the coating material 9c from the distal end in advance is used.

In addition, the optical fiber 9 is held and fixed to the coating clamp 50 such that a protruding portion 9b, which protrudes toward the discharge portion 24a from the coating clamp 50, is secured.

As shown in FIG. 1, the groove formed substrate 23 of the fusion splicer 10A is provided between the discharge portion 24a and each of the movable stages 22 provided on the left and right sides of the discharge portion 24a.

When holding and fixing the optical fiber 9 to the coating clamp 50, the optical fiber glass portion 9a, from which a coat has been removed, in the protruding portion 9b protruding from the coating clamp is placed at the positioning groove 23a on the groove formed substrate 23.

In addition, the optical fiber 9 is held and fixed to the coating clamp while adjusting the length of the protruding portion 9b from the coating clamp, so that the tips of the optical fiber glass portions 9a of the respective optical fibers 9 are disposed opposite each other with a slight clearance therebetween when the optical fiber 9 is held and fixed to the coating clamp 50 on each of the left and right sides of the heat fusion portion 24A.

In addition, the length of each optical fiber glass portion 9a from which a coat has been removed is adjusted in advance so that the optical fiber glass portions 9a can be disposed at the positions where the tips can be fusion-spliced when moving the movable stage 22 forward from the standby position to the forward limit position (which will be described later).

The groove formed substrates 23 provided on the left and right sides of the heat fusion portion 24A function to align the tips of a pair of optical fibers 91 and 92 (specifically, tips of the optical fiber glass portions 9a), which are mounted in the fusion splicer 10A by being held and fixed to the coating clamp 50, on the same straight line (virtual straight line) in the left and right direction of the fusion splicer with high accuracy using the positioning groove 23a.

The positioning groove 23a provided in the groove formed substrate 23 is a groove formed so as to be recessed from a top surface 23b (top surface of the substrate) of the groove formed substrate 23.

The positioning groove 23a is formed so as to extend in the left and right direction of the splicer.

Figure 5:
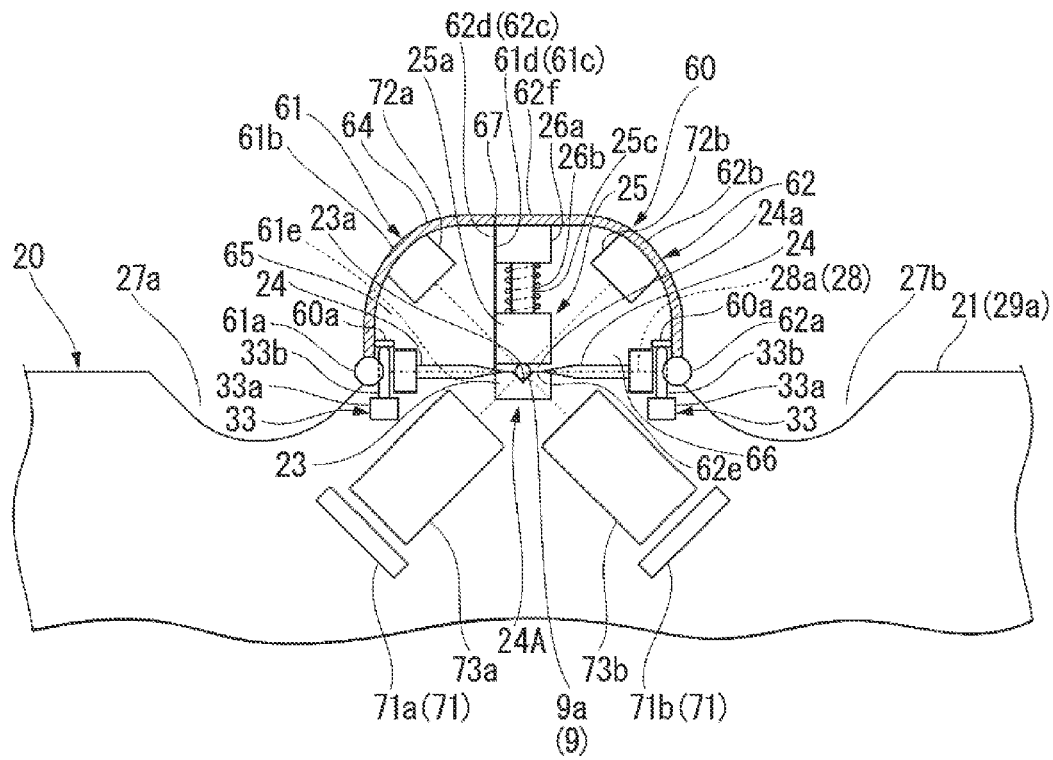
FIG. 5 is a cross-sectional side view (right side cross-sectional view) schematically showing a structure near the windshield cover of the optical fiber fusion splicer shown in FIG. 1, and is a diagram showing a state where the windshield cover is closed.

As shown in FIGS. 5 and 6, the positioning groove 23a of the groove formed substrate 23 of the fusion splicer 10A in the illustrated example is a V groove.

Here, any thing that enables accurate positioning of the optical fiber glass portion 9a, which is exposed in a distal end of the optical fiber 9, may be used as the positioning groove 23a without being limited to the V groove.

As the positioning groove 23a, for example, a round groove (groove having a semicircular cross section), a U groove, a trapezoidal groove, and the like may be adopted.

In addition, the groove formed substrate 23 of the fusion splicer 1OA is usually formed of ceramic in order to withstand the heat at the time of discharge heating.

In an apparatus having an optical fiber axis alignment mechanism, the groove formed substrate 23 on each of the left and right sides is fixed on each of the left and right optical fiber axis alignment mechanisms.

On the other hand, in the case of a fusion splicer with no optical fiber axis alignment mechanism, the groove formed substrate 23 may be directly fixed to the top surface 21 of the apparatus body 20.

As shown in FIGS. 3 to 6, the windshield cover 60 is formed by a pair of cover members 61 and 62 that are pivotally attached to the apparatus body 20 so as to be rotatable through rotating shafts 61a and 62a provided along the top surface 21 of the apparatus body 20.

The windshield cover 60 is opened and closed when the pair of cover members 61 and 62 rotate with respect to the apparatus body 20.

The first cover member 61 rotates with respect to the apparatus body 20 by the driving force of a power source 63a provided in the apparatus body.

The second cover member 62 rotates independently of the first cover member 61 by the driving force of another power source 63b.

The power sources 63a and 63b in the illustrated example are specifically electric motors.

However, the power sources 63a and 63b that drive the cover members 61 and 62 by rotating them with respect to the apparatus body 20 are not limited to the electric motor.

It is preferable that the power sources 63a and 63b generate power by being driven by electromagnetic force. For example, an electromagnet, a solenoid, and the like may also be adopted in addition to the electric motor described above.

In the fusion splicer 10A, the movable stage 22 moves in the left and right direction of the splicer. Accordingly, the movable stage 22 can move up to the standby position (backward limit position) and the forward limit position before the movable stage 22 is brought into contact with the groove formed substrate 23 and a fiber clamp member 25.

When moving the movable stage 22, the coating clamp 50 mounted by fixing the lower clamp member 51 to the movable stage 22 also moves together with the movable stage 22.

By the movement of the movable stage 22, the coating clamp 50 can move up to the standby position (backward limit position) and the forward limit position before the movable stage 22 is brought into contact with the groove formed substrate 23 and the fiber clamp member 25.

The work for holding and fixing the optical fiber 9 to the coating clamp 50 is performed in a state where the movable stage 22 is disposed at the standby position (position of the movable stage 22 shown in FIG. 1).

The fusion splicer 10A can make the tips of the optical fiber glass portions 9a of the optical fibers 91 and 92 butt against each other by moving a pair of movable stages 22 from the standby position to the forward limit position after holding and fixing the optical fibers 9 to the coating clamps 50 on the left and right sides of the heat fusion portion 24A.

In addition, for the fusion splicer 10A, for example, a configuration may be adopted in which the power sources 63a and 63b (cover open and close power source) that generate power to drive opening and closing of the windshield cover 60 and different power sources for stages from the power sources 63a and 63b are provided in the apparatus body 20. However, the present invention is not limited to this.

As the fusion splicer 10A, for example, a configuration may be adopted in which the power sources for windshield opening and closing 63a and 63b provided in the apparatus body 20 also serve as power sources for the left and right stages, respectively.

As shown in FIG. 1, the lower clamp member 51 of the coating clamp 50 is mounted on the movable stage 22 along the top surface 22a so as to be brought into contact with a top surface 22a of the movable stage 22.

The top surface 22a of the movable stage 22 in the example shown in the drawings is formed so as to be inclined downward from the opposite side to a side, on which the discharge portion 24a is provided, toward the discharge portion 24a in the left and right direction of the splicer.

The lower clamp member 51 and the upper clamp member 52 that form the coating clamp 50 have plate shapes, and are disposed so as to be inclined downward in a direction approaching the discharge portion 24a along the movable stage top surface 22a.

The fusion splicer 10A can place the optical fiber glass portion 9a of the tip of the protruding portion 9b, which protrudes from the coating clamp 50, of the optical fiber 9 at the positioning groove 23a on the groove formed substrate 23 so as to be pressed against the positioning groove 23a when holding and fixing the optical fiber 9 to the coating clamp 50.

As shown in FIG. 1, the fusion splicer 10A has a detector 31 (hereinafter, referred to as a clamp closing detector) that detects that the upper clamp member 52 in a state of being opened with respect to the lower clamp member 51 of the coating clamp 50 has been closed by the lower clamp member 51.

The clamp closing detector 31 (fiber mounting detector) has a detector body 31a fixed to the bottom side of the movable stage 22 and a sensor pin 31b protruding upward from the detector body 31a.

The sensor pin 31b is provided such that the distal end (upper end) protrudes above the top surface 51a of the lower clamp member 51.

The detector body 31a of the clamp closing detector 31 is disposed below the movable stage 22 on each of the left and right sides of the heat fusion portion 24A in order to avoid being wired to a movable portion.

When the initial position of the distal end of the sensor pin 31b is a position protruding above the top surface 51a of the lower clamp member, an operation of pushing the sensor pin 31b into the detector body 31a is possible.

The sensor pin 31b pushed into the detector body 31a returns to the initial position by a spring (not shown) provided in the detector body 31a when the force to push the sensor pin 31b into the detector body 31a is removed.

The distal end of the sensor pin 31b (sensor pin at the initial position) is located in a range where the upper clamp member 52, which is opened and closed with respect to the lower clamp member 51, moves.

The upper clamp member 52 of the coating clamp 50 can be opened with respect to the lower clamp member 51 up to the position where the upper clamp member 52 is not in contact with the distal end of the sensor pin 31b.

When placing the optical fiber 9 on the top surface 51a of the lower clamp member 51, the upper clamp member 52 is opened with respect to the lower clamp member 51 and is disposed at a position not in contact with the distal end of the sensor pin 31b so as to be spaced apart from the distal end of the sensor pin 31b.

Explanation will be given on the assumption that opening the upper clamp member 52 with respect to the lower clamp member 51 is making the upper clamp member 52 in an open state with an open angle of 90° or more when adopting the coating clamp 50 having a rotating shaft 55 shown in FIG. 11.

When the upper clamp member 52 is pivotally attached to the lower clamp member 51, the upper clamp member 52 maintains the open state by its own weight. Therefore, for example, a configuration in which the upper clamp member 52 can be opened with respect to the top surface 51a of the lower clamp member with an open angle of 90° or more can be appropriately adopted.

In the sensor pin 31b, the size of the distal end protruding upward from the top surface 51a of the lower clamp member is set such that the tip (upper end) is disposed at a position spaced apart from the upper clamp member 52 without being in contact with the upper clamp member 52 in a state of being opened with respect to the lower clamp member 51.

The distal end of the sensor pin 31b is disposed at a position where the upper clamp member 52, which has moved in a closing direction from a state opened with respect to the lower clamp member 51, can be brought into contact with the distal end of the sensor pin 31b in a state protruding from above.

The upper clamp member 52 presses the sensor pin 31b to push it into the detector body 31a in the process in which the upper clamp member 52 is opened and is then closed with respect to the lower clamp member 51.

When the sensor pin 31b is at the initial position, the detector body 31a is in a non-detected state where the pushing of the sensor pin 31b is not detected.

In the clamp closing detector 31, when the detector body 31a is switched from a non-detected state to a detected state by pushing of the sensor pin 31b, a detection signal that can be acquired from the detector body 31a transitions from a non-detected state to a detected state.

The fusion splicer 10A includes a driving control device that controls the driving of the power sources for windshield opening and closing 63a and 63b, power sources for stages, and all other power sources provided in the fusion splicer, and the detection signal acquired from the detector body 31a is input to the driving control device.

In the fusion splicer 10A, the detector body 31a of the clamp closing detector 31 is switched from a non-detected state to a detected state by pushing of the sensor pin 31b when the upper clamp member 52 in a state of being opened with respect to the lower clamp member 51 is closed with respect to the lower clamp member 51.

Accordingly, in the fusion splicer 10A, it is detected by the driving control device that the upper clamp member 52 in a state of being opened with respect to the lower clamp member 51 has been closed with respect to the lower clamp member 51 due to transition of the detection signal acquired from the detector body 31a from a non-detected state to a detected state.

For this reason, for example, when the optical fiber 9 is held and fixed to the coating clamp 50 (optical fiber is mounted in the fusion splicer) by closing the upper clamp member 52, which is in a state of being opened with respect to the lower clamp member 51, with respect to the lower clamp member 51, the detection signal acquired from the detector body 31a of the clamp closing detector 31 transitions from a non-detected state to a detected state.

Therefore, it is detected by the driving control device that holding and fixing of the optical fiber 9 by the coating clamp 50 has been completed.

On the other hand, it is detected by the driving control device that the upper clamp member 52 in a state of being closed with respect to the lower clamp member 51 has been opened with respect to the lower clamp member 51 due to transition of the detection signal acquired from the detector body 31a from a detected state to a non-detected state.

As the clamp closing detector 31, it is preferable that types of detection signals acquired from the detector body 31a be different from each other or the detection signals acquired from the detector body 31a be different as a detected state and a non-detected state, and the specific configuration is not particularly limited.

As the detector body 31a of the clamp closing detector 31, for example, a device that outputs an output signal at the time of non-detection when it is in a non-detected state and outputs an output signal at the time of detection, which is different from the output signal at the time of non-detection, when it is in a detected state (device capable of acquiring different detection signals in the detected state and the non-detected state) can be mentioned.

In addition, as other examples of the detector body 31a, a configuration to output a signal (output signal at the time of detection) only when it is in a detected state (state where there is no signal output is equivalent to "no detection of detection signal"), a configuration to output a signal (output signal at the time of non-detection) only when it is in a non-detected state (state where there is no signal output is equivalent to "no detection of detection signal"), and the like may be mentioned.

The configuration in which the presence and absence of a signal output are switched between the detected state and the non-detected state is an example of the configuration in which detection signals acquired from the detector body 31a are different between the detected state and the non-detected state.

In this configuration, the driving control device of the fusion splicer treats the state where there is no signal output as if a detection signal indicating non-detection has been acquired.

More specifically, as the detector body 31a, for example, a configuration in which the electric resistance or the output current value is switched between the detected state and the non-detected state, a configuration (switch) to open an electric circuit in one of the detected state and the non-detected state and close the electric circuit in the other state, a configuration to output radio signals having different frequencies or optical signals having different wavelengths in the detected state and the non-detected state, and the like can be adopted.

In the fusion splicer 10A shown in FIG. 1, when holding and fixing the optical fibers 9 to the coating clamps 50 provided on the left and right sides of the heat fusion portion 24A, if both detection signals acquired from the clamp closing detectors 31 (specifically, detector bodies 31a) provided on the left and right sides of the heat fusion portion 24A transition from a non-detected state to a detected state, the power sources for windshield opening and closing 63a and 63b are driven, and an operation to close the windshield cover 60 that has been in an open state (windshield cover closing operation) is automatically performed.

As shown in FIG. 5, when a pair of cover members 61 and 62 are closed with respect to each other, the optical fiber 9 (optical fiber glass portion 9a) placed on the positioning groove 23a of the groove formed substrate 23 is pinned toward the groove bottom of the positioning groove 23a by a pressing piece 25a provided at the tip of the fiber clamp member 25 attached to the inner side of one cover member (in the example shown in the drawings, the second cover member of reference numeral 62).

In this manner, the optical fiber glass portion 9a is positioned by the positioning groove 23a with high accuracy.

In addition, the fiber clamp member 25 is provided only in one cover member (in the example shown in the drawings, the second cover member 62), and is not provided in the first cover member of reference numeral 61.

This fusion splicer has a windshield cover detector 33, which detects an open or closed state of the windshield cover 60, on the apparatus body 20.

As shown in FIGS. 5 and 6, one windshield cover detector 33 (cover member detector) is disposed at a position near each of the rotating shafts 61a and 62a of a pair of cover members 61 and 62 in order to detect the open and closed state of the pair of cover members 61 and 62 of the windshield cover 60, and a total of two windshield cover detectors 33 are provided.

The windshield cover closing operation is completed when the two windshield cover detectors 33 detect that a pair of cover members 61 and 62 have been disposed at the closed positions where they are closed with respect to each other.

The windshield cover detector 33 has a detector body 33a fixed to an upper portion of the apparatus body 20 and a sensor pin 33b protruding upward from the detector body 33a.

The sensor pin 33b can be pushed into the detector body 33a.

The detector bodies 33a of the two windshield cover detectors 33 are provided at positions near the rotating shafts 61a and 62a of the cover members 61 and 62 so as to be fixed to the upper portion of the apparatus body 20.

The detector body 33a of each windshield cover detector 33 is fixed to a region, which is located between the rotating shafts 61a and 62a of a pair of cover members 61 and 62, of the upper portion of the apparatus body 20.

The sensor pin 33b of each windshield cover detector 33 is disposed at a position near the rotating shafts 61a and 62a so as to extend in a vertical direction, and is provided between the rotating shafts 61a and 62a.

The tip (upper end) of the sensor pin 33b of each windshield cover detector 33 is disposed above the rotating shafts 61a and 62a.

When the windshield cover 60 is closed, each windshield cover detector 33 detects that each of the cover members 61 and 62 has been disposed at the closed position due to pushing of the sensor pin 33b into the detector body 33a by a protruding piece 60a that protrudes from the inner surface at positions near the rotating shafts 61a and 62a in main wall portions 61b and 62b (which will be described later) that are included in the cover members 61 and 62 and have arch-shaped cross sections.

When the windshield cover 60 in an open state is closed, the sensor pin 33b of each windshield cover detector 33 is pushed into the detector body 33a since the protruding piece 60a of each of the cover members 61 and 62 comes in contact with the upper end of the sensor pin 33b and is pressed downward by the protruding piece 60a.

In addition, in this fusion splicer, when the cover members 61 and 62 disposed at the closed positions are opened by rotation, the protruding piece 60a of each of the cover members 61 and 62 is separated from the upper end of the sensor pin 33b.

Then, the windshield cover detector 33 changes to a non-detected state, and it is confirmed that the cover members 61 and 62 have moved (rotated in the case of the example shown in the drawings) in an open direction from the closed position.

When the cover member is opened from the closed state, the sensor pin 33b of the windshield cover detector 33 moves upward with respect to the detector body 33a, compared with a case where the cover member is disposed at the closed position, by the spring provided in the detector body 33a. As a result, the size protruding upward from the detector body 33a returns to that before being pushed into the detector body 33a by the protruding piece 60a of the cover member disposed at the closed position.

The two windshield cover detectors 33 can detect the opening and closing of the pair of cover members 61 and 62 of the windshield cover 60.

In addition, the windshield cover detector 33 is shown only in FIGS. 5 and 6, and is not shown in other drawings.

In addition, as the windshield cover detector, a configuration capable of detecting the open or closed state of the windshield cover 60 is preferable, and a known configuration used to detect the open or closed state of a windshield cover of a fusion splicer can be appropriately adopted.

As this windshield cover detector, for example, it is also possible to adopt a magnetic sensor that detects that a windshield cover has been closed in a non-contact manner (changes to a detected state) and changes to a non-detected state when the windshield cover is not in a closed state due to displacement of one or more cover members, which form the windshield cover, from the closed position to the open position.

In the case of this magnetic sensor, for example, a magnet or a magnetic material is provided in all cover members of the windshield cover, and a magnetic field change between when the windshield cover is closed and the windshield cover is not closed is detected by the magnetic sensor.

In addition, as the windshield cover detector, it is also possible to adopt a current sensor that has a current supply circuit provided in each cover member and that detects the opening and closing between the cover members by a current change between the current supply circuits according to the contact or separation of contact terminal portions provided in the current supply circuits of respective cover members.

In addition, as the windshield cover detector, it is also possible to adopt an encoder or an angle sensor that measures the rotation angle of a portion (rotating portion for detection) formed on the extension of the rotating shaft of the cover member or in the periphery.

In the case of a rotation angle measuring sensor, such as an encoder or an angle sensor, it is possible to detect not only that the cover member is disposed at the closed position but also that the cover member is disposed at the predetermined open position. In addition, it is also possible to detect that the cover member is at the open position and the closed position.

In addition, in order to detect that the cover member is disposed at the predetermined open position in addition to being able to detect that the cover member is disposed at the closed position, the windshield cover detector may also be provided at the open position.

The windshield cover closing operation is automatically started when both the detector bodies 31a of the clamp closing detectors 31 provided on the left and right sides of the heat fusion portion 24A are switched from non-detected state to detected state and both detection signals that the driving control device acquires from both detector bodies 31a transition to the detected state or when a waiting time set in advance (for example, several seconds) has passed after both detection signals from the detector bodies 31a on both sides transition to the detected state in a state where the windshield cover is open, that is, in a state where the windshield cover detector 33 has detected that the windshield cover is open.

In this fusion splicer 10A, when both detection signals that the driving control device acquires from the detector bodies 31a of the clamp closing detectors 31 transition from a non-detected state to a detected state, a fiber fusion and inspection operation (which will be described later) is started with the above as a trigger signal.

In the case of performing an operation of closing the windshield cover after the above-described waiting time has passed, it is possible to reduce a possibility that a hand will be pinched between the windshield covers, compared with a case where the windshield cover 60 is closed at the moment when both the detection signals from the detectors 31 provided on the left and right sides of the heat fusion portion 24A transition to the detected state.

A user can change the setting of the waiting time using software.

In addition, during the waiting time, it is possible to call attention to that the windshield cover will be closed, for example, by displaying a warning message on a monitor device, flashing a lamp such as an LED, or outputting alarm sound.

In addition, after the completion of the windshield cover closing operation, the fusion splicer 10A automatically performs an inspection operation before optical fiber connection and then automatically performs a fusion splicing operation to fusion-splice the optical fibers 91 and 92 (specifically, the optical fiber glass portions 9*a* exposed at the tips of the optical fibers 91 and 92).

In addition, the fusion splicer 10A performs a connection portion inspection operation automatically after the completion of the fusion splicing operation.

In the inspection operation before optical fiber connection, first, the movable stages 22 provided on the left and right sides of the heat fusion portion 24A are moved forward from the standby position toward the discharge portion 24*a*, so that the movable stages 22 are disposed at predetermined positions (inspection positions before connection) between the standby position and the forward limit position.

Then, distal ends of the optical fibers 91 and 92 are imaged by a camera 71 (refer to FIG. 5) provided in the apparatus body 20, the captured image is analyzed by an image processing apparatus, and the end surface angle or the end surface state of the tip of the optical fiber glass portion 9*a* of each of the optical fibers 91 and 92 is automatically calculated.

In the case of a fusion splicer having no movable V groove, the amount of axial deviation of a pair of optical fibers is also calculated.

If there is an error in the calculation result, the fusion splicer sends an alarm to the worker.

On the other hand, if the calculation result is normal, shift to the next fusion splicing operation is automatically performed with no alarm and without an inspection completion operation of the worker.

However, when the worker inspects the end surface state by visual observation, the captured image is displayed on a monitor device 14 (refer to FIG. 3), and the worker determines whether the end surface state of the tip of the optical fiber glass portion 9*a* of each of the optical fibers 91 and 92 is good or poor from the captured image displayed on the monitor device 14.

When performing an inspection before optical fiber connection additionally by visual observation of the worker, the inspection before optical fiber connection is ended by the worker's operation of pushing an inspection end button before connection (not shown) provided in the fusion splicer (for example, the switch board 11).

Here, an end command input unit of the inspection before connection that is provided in the fusion splicer in order to end the inspection operation before optical fiber connection by the operation of the worker is not limited to the inspection end button before connection that is operated by the pushing operation using the finger or the like of the worker.

As the end command input unit of the inspection before connection, for example, a dial type switch that can be manually operated so as to be rotated or an inspection end button displayed on the monitor device 14 may also be used.

After the end of the inspection operation before optical fiber connection, the fusion splicer 10A proceeds to the fusion splicing operation.

In the fusion splicing operation, discharge is started by applying a voltage between a pair of electrode rods 24 and the movable stages 22 provided on the left and right sides of the heat fusion portion 24A are moved forward from the inspection position before connection toward the forward limit position, thereby fusion-splicing the tips of the optical fibers 91 and 92 held and fixed to the left and right coating clamps 50 (specifically, tips of the optical fiber glass portions 9*a* exposed at their tips) while bring them close to each other.

In the connection portion inspection operation, as shown in FIG. 5, a fusion splice portion is imaged by the camera 71 provided in the apparatus body 20, the captured image is analyzed by the image processing apparatus, the connection loss of the connected optical fibers 91 and 92 is automatically calculated, and the abnormalities of the connection state are automatically determined.

If there is an error in the calculation result, the fusion splicer sends an alarm to the worker.

On the other hand, if the calculation result is normal, shift to the next step is automatically performed with no alarm and without an inspection completion operation of the worker.

However, when the worker inspects a connection portion by visual observation, the captured image is displayed on the monitor device 14 (refer to FIG. 3).

Then, the worker observes the state of the fusion splice portion of the optical fibers 91 and 92 from the captured image displayed on the monitor device 14.

In the connection portion inspection operation, the image captured by the camera 71 is continuously displayed until the subsequent operation (connection portion tensile test or removal of optical fibers from the fusion splicer) is performed on the monitor device 14.

After the connection portion inspection is completed, the fusion splicer 10A may perform a connection portion inspection completion notification operation to notify the worker of the completion of the connection portion inspection, for example, by the output of alarm sound, lighting of a lamp, or display on a monitor device.

However, when the worker does not inspect a connection portion by visual observation, the fusion splicer 10A performs automatically a windshield cover opening operation to open the windshield cover 60 by driving the power sources for windshield opening and closing 63*a* and 63*b* and connection portion tensile inspection after the completion of the connection portion inspection operation.

Figure 25A:
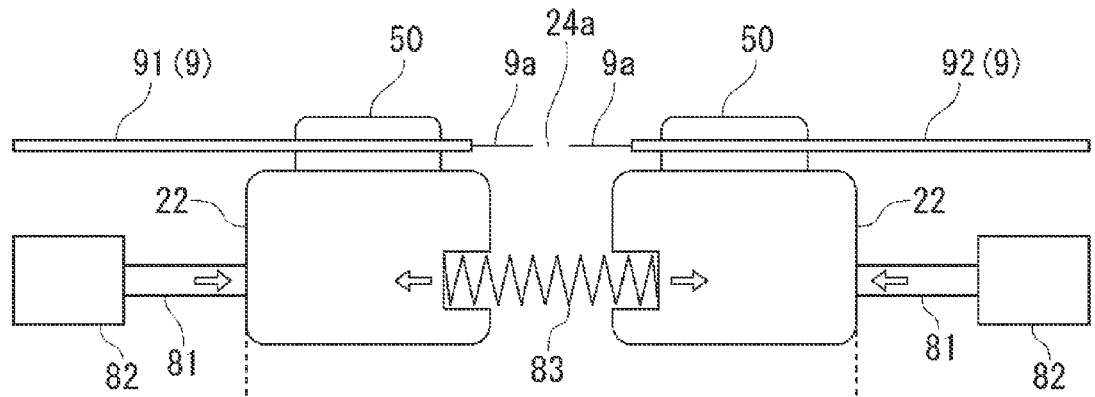
FIG. 25A is a diagram illustrating the relationship between a stage pressing member and a movable stage, and is a diagram illustrating a state where the holding and fixing of optical fibers in coating clamps on the left and right sides of a heat fusion portion are completed.
Figure 25B:
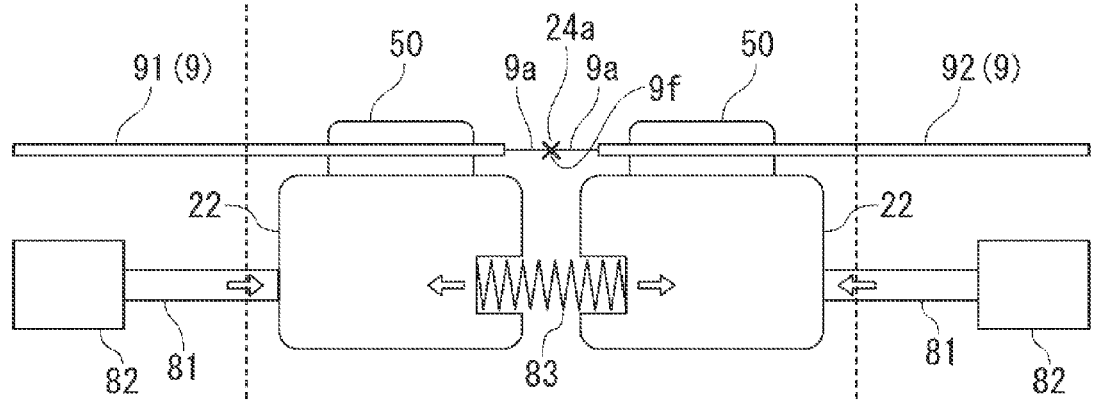
FIG. 25B is a diagram illustrating the relationship between a stage pressing member and a movable stage, and is a diagram illustrating a state where a fusion splicing operation is completed.
Figure 25C:
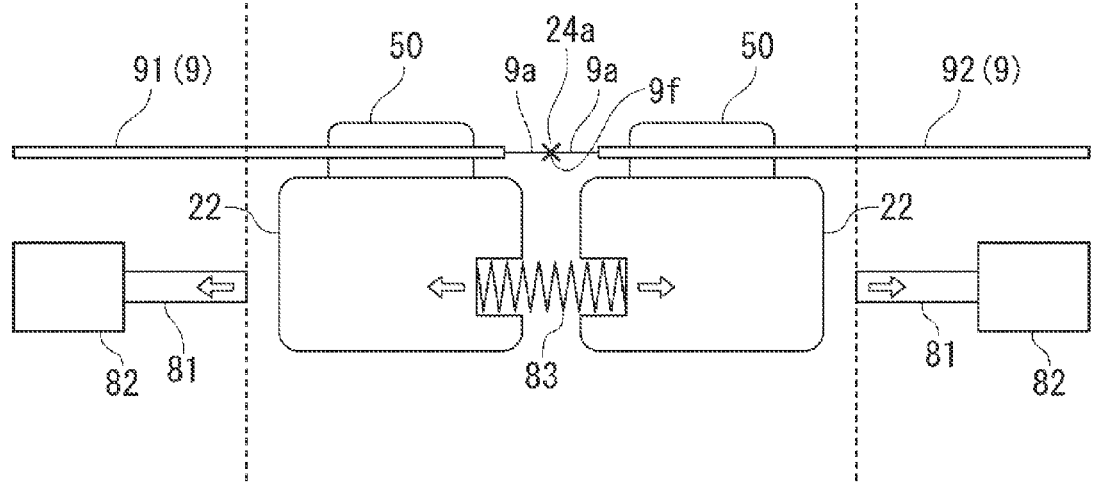
FIG. 25C is a diagram illustrating the relationship between a stage pressing member and a movable stage, and is a diagram illustrating the connection portion tensile inspection.

As shown in FIGS. 25A to 25C, the fusion splicer 10A has a stage pressing member 81, which is moved back and forth toward the discharge portion 24*a* by the power of a power source for stages (not shown), on the left and right sides of the heat fusion portion 24A.

The respective stage pressing members 81 are moved back and forth toward the discharge portion 24*a* since pressing member moving mechanisms 82 provided on the left and right sides of the heat fusion portion 24A are driven by the power of the power sources for stages.

In addition, the fusion splicer 10A has a structure of moving the movable stage 22 forward toward the forward limit position by pressing the movable stage 22 from the opposite side to a side, on which the forward limit position is present, by the stage pressing member 81 moved forward toward the discharge portion 24*a*.

In addition, the fusion splicer 10A has a spring 83 (hereinafter, also referred to as a stage biasing spring, the example shown in the drawings shows a compression coil spring), which is elastically biased in a direction of making a pair of movable stages 22 move away from each other, between a pair of movable stages 22 provided on the left and right sides of the heat fusion portion 24A.

FIG. 25A shows a state when holding and fixing of the optical fiber 9 has been completed in the coating clamps 50 provided on the left and right sides of the heat fusion portion 24A.

In this case, the movable stages 22 on the left and right sides are pressed against the stage pressing members 81 by the elastic biasing force of the stage biasing spring 83 and accordingly, each movable stage 22 is disposed at the standby position.

The position where the stage pressing member 81 is disposed at this time is also referred to as a pressing member standby position hereinbelow.

The movable stages 22 provided on the left and right sides of the heat fusion portion 24A are pressed by the stage pressing members 81 moved forward from the pressing member standby position.

As a result, the movable stages 22 move forward from the standby position toward the forward limit position while compressing the stage biasing spring 83.

Then, the movable stages 22 reach the state shown in FIG. 25B through the inspection operation before optical fiber connection and the fusion splicing operation.

FIG. 25B shows a state where the fusion splicing operation has been completed.

In FIG. 25B, in the optical fibers 91 and 92, the optical fiber glass portions 9a are fusion-spliced at a fusion splice portion 9f.

The connection portion inspection operation after the fusion splicing operation is performed in a state where the position of the stage pressing member 81 at the time of completion of the fusion splicing operation is maintained and the position of the movable stage 22 at the time of completion of the fusion splicing operation is maintained.

In the connection portion tensile inspection, as shown in FIG. 25C, the stage pressing members 81 are moved (moved back) toward the pressing member standby position by driving of the pressing member moving mechanism 82 after completion of connection portion inspection operation, so that the tensile load is applied to the fusion splice portion 9f by the elastic biasing force of the stage biasing spring 83.

In FIG. 25C, the stage pressing member 81 is disposed at the pressing member standby position.

In this connection portion tensile inspection, the stage pressing member is pulled away from the movable stage 22 by moving back, and only the elastic biasing force of the stage biasing spring is applied to the fusion splice portion 9f as a tensile load.

The start timing of the connection portion tensile inspection can be set independently of the start of the windshield cover opening operation.

In addition, the completion timing of the connection portion tensile inspection can be set independently of the completion timing of the windshield cover opening operation.

The connection portion tensile inspection may be completed before the start of the windshield cover opening operation, or may be completed after the completion of the opening operation.

After the connection portion tensile inspection is completed, the fusion splicer 10A may perform an inspection completion notification operation to notify the worker of the completion of the connection portion tensile inspection, for example, by the output of alarm sound, lighting of a lamp, or display on a monitor device.

If the notification of inspection completion is performed in a state where the windshield cover opening operation has been completed or if the windshield cover opening operation is completed after the inspection completion notification is performed, the worker opens the upper clamp member 52 of the coating clamp 50 with respect to the lower clamp member 51 and takes out the optical fibers 91 and 92 held and fixed to the coating clamp 50 together with the fusion splice portion 9f (fiber removal work).

In addition, it is preferable to perform the windshield cover opening operation when a predetermined waiting time set in advance has passed after notice informing the execution of the windshield cover opening operation, for example, by the output of alarm sound, lighting of a lamp, or display of a warning message on a monitor device.

In this manner, it is possible to avoid a situation where the fingers are pinched between the apparatus body 20 and the cover member that forms the windshield cover 60, for example.

After the completion of the fiber removal work by the worker, the movable stages 22 provided on the left and right sides of the heat fusion portion 24A are finally disposed at the standby positions by the elastic biasing force of the stage biasing spring 83.

In this case, the movable stages 22 are disposed at the standby positions since the movable stages 22 are in contact with and pressed against the stage pressing members 81 from the side, on which the discharge portion 24a is provided, by the elastic biasing force of the stage biasing spring 83.

The state of the fusion splicer 10A at this time is also referred to as a fiber set standby state.

When a power switch (not shown) is changed from ON state to OFF state, the fusion splicer 10A changes to a state where the movable stage 22 is disposed at the standby position and the windshield cover 60 is closed (hereinafter, also referred to as an operation standby initial state).

The fusion splicer 10A in the operation standby initial state changes to the fiber set standby state by turning on the power switch, which has been in the OFF state, so that the windshield cover 60 is opened.

In the fusion splicer 10A in the fiber set standby state, in order to hold and fix the optical fiber 9 to the coating clamp 50, when the upper clamp member 52 of the coating clamp 50 provided on each of the left and right sides of the heat fusion portion 24A is closed with respect to the lower clamp member 51 from the state where the upper clamp member 52 is opened with respect to the lower clamp member 51, both detection signals acquired from the detector bodies 31a of a pair of clamp closing detectors 31 provided on the left and right sides of the heat fusion portion 24A transition from a non-detected state to a detected state as described above. Thus, the windshield cover closing operation is performed.

The operation of the fusion splicer 10A until the fiber set standby state after the windshield cover closing operation and subsequent windshield cover opening operation and connection portion tensile inspection are completed is also referred to as a fiber fusion and inspection operation hereinbelow.

When fusion-splicing the optical fibers 9, the fusion splicer 10A performs the fiber fusion and inspection operation automatically by holding and fixing the optical fibers 9 by changing the upper clamp members 52 of the coating clamps 50 on the left and right sides from the state opened with respect to the lower clamp members 51 to the state closed with respect to the lower clamp members 51 in the fiber set standby state.

In the fusion splicer 10A in the initial state of operation standby, the power source is turned off in the initial state of operation standby when switching from an ON state to an OFF state is made by operating the power switch.

In addition, the fusion splicer 10A may also adopt a configuration in which the inspection completion notification operation is not performed.

For example, when the connection portion tensile inspection is completed simultaneously with the completion of the windshield cover opening operation or before the completion of the windshield cover opening operation, the fusion splicer 10A may not perform the inspection completion notification operation, and the worker may perform the fiber removal operation after the completion of the windshield cover opening operation.

In addition, for example, when the connection portion tensile inspection is completed when a predetermined time has passed after the windshield cover opening operation is completed, the fusion splicer 10A may not perform the inspection completion notification operation, and the worker may perform the fiber removal operation after the connection portion tensile inspection is completed from the completion of the windshield cover opening operation.

After the completion of the fiber removal work by the worker, the fusion splicer 10A finally disposes the movable stages 22, which are provided on the left and right sides of the heat fusion portion 24A, at the standby positions by driving (movement) of the stage pressing members 81 or the elastic biasing force of the stage biasing spring 83.

In addition, pressing member contact portions of the movable stages 22 are brought into contact with the stage pressing members 81 by the elastic biasing force of the stage biasing spring 83.

The state of the fusion splicer 10A at this time is also referred to as a fiber set standby state.

When a power switch (not shown) is changed from an ON state to an OFF state, the fusion splicer 10A changes to a state where the movable stage 22 is disposed at the standby position and the windshield cover 60 is closed (hereinafter, also referred to as an operation standby initial state).

The fusion splicer 10A in the operation standby initial state changes to the fiber set standby state by turning on the power switch, which has been in the OFF state, so that the windshield cover 60 is opened.

In the fusion splicer 10A in the fiber set standby state, in order to hold and fix the optical fiber 9 to the coating clamp 50, when the upper clamp member 52 of the coating clamp 50 provided on each of the left and right sides of the heat fusion portion 24A is closed with respect to the lower clamp member 51 from the state where the upper clamp member 52 is opened with respect to the lower clamp member 51, both detection signals acquired from the detector bodies 31a of a pair of clamp closing detectors 31 provided on the left and right sides of the heat fusion portion 24A transition from a non-detected state to a detected state as described above. Thus, the windshield cover closing operation is performed.

The operation of the fusion splicer 10A until the fiber set standby state after the windshield cover closing operation and subsequent windshield cover opening operation and connection portion tensile inspection are completed is also referred to as a fiber fusion and inspection operation hereinbelow.

When fusion-splicing the optical fibers 9, the fusion splicer 10A performs the fiber fusion and inspection operation automatically by holding and fixing the optical fibers 9 by changing the upper clamp members 52 of the coating clamps 50, which are provided on the left and right sides of the heat fusion portion 24A, from the state opened with respect to the lower clamp members 51 to the state closed with respect to the lower clamp members 51 in the fiber set standby state.

The fusion splicer 10A in the fiber set standby state changes to the operation standby initial state by operating the power switch, which has been in the ON state, to turn off the power switch.

The coating clamp 50 provided in the fusion splicer 10A is detachable from the movable stage 22.

On the movable stage 22 provided in the fusion splicer 10, a fiber holder 40 to which the optical fiber 9 is held and fixed can be placed in a state where the coating clamp 50 is detached.

That is, an upper portion of the movable stage 22 can be used as a holder mounting portion.

In addition, as the fusion splicer according to the embodiment of the present invention, it is also possible to adopt a configuration in which the movable stage 22 is dedicated to the mounting of the coating clamp 50 and is not used as a holder mounting portion to place the fiber holder 40 thereon.

Figure 2:
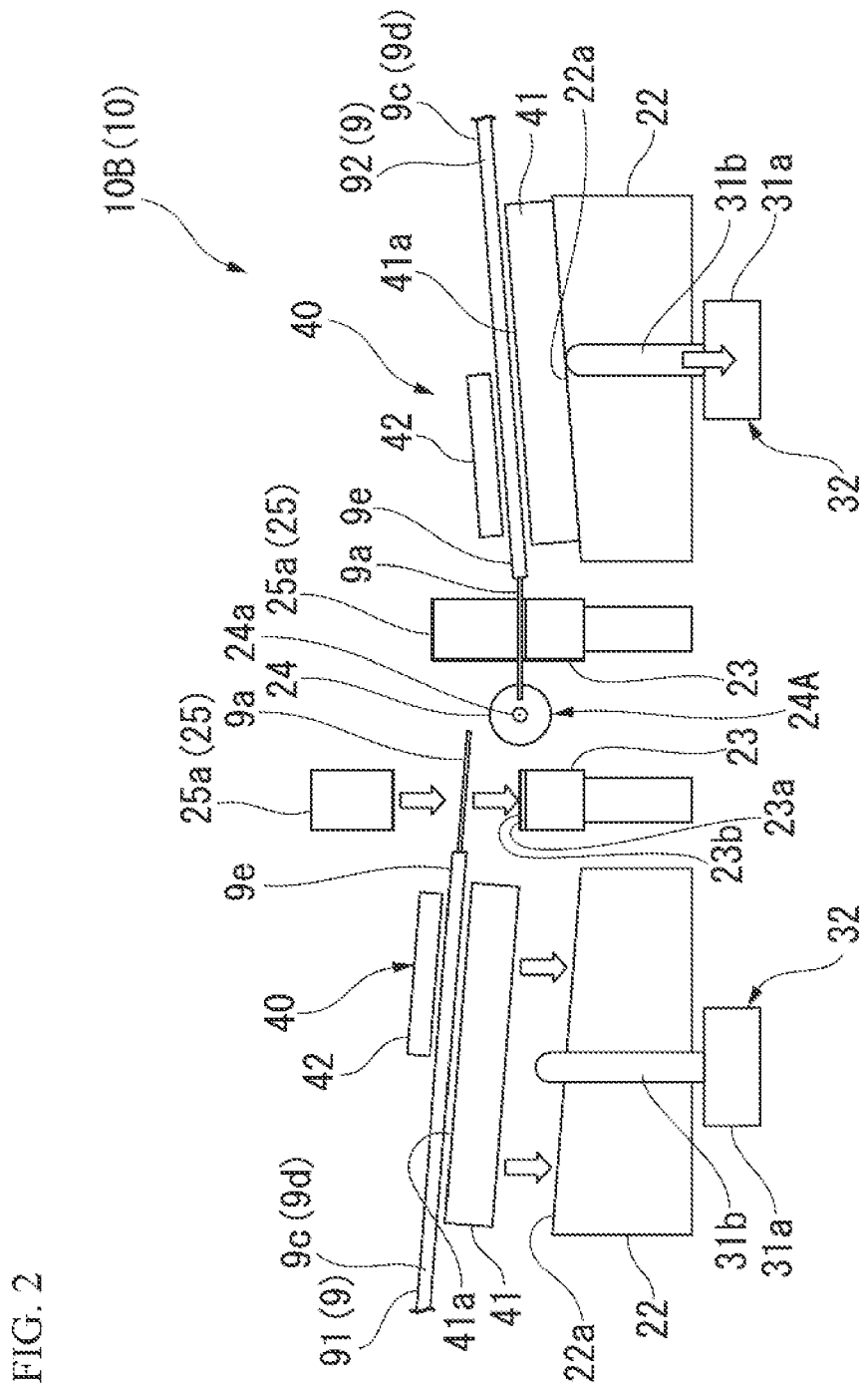
FIG. 2 is a front view schematically showing the configuration of an optical fiber fusion splicer according to an embodiment of the present invention, and is a diagram showing a fusion splicer having a configuration in which fiber holders are detachably disposed on movable stages disposed on the left and right sides of a heat fusion portion.

FIG. 2 is a fusion splicer 10 according to a second embodiment of the present invention, and shows a configuration in which the coating clamp 50 provided on the movable stage 22 of the fusion splicer 10A illustrated in FIG. 1 is omitted and the movable stage 22 is used as a holder mounting portion to place the fiber holder 40, which holds and fixes the optical fiber 9, thereon.

The fusion splicer 10 according to the second embodiment of the present invention shown in FIG. 2 is denoted by reference numeral 10B.

The fiber holder 40 is placed on the movable stage 22, and is provided so as to be detachable from the movable stage 22.

Figure 9:
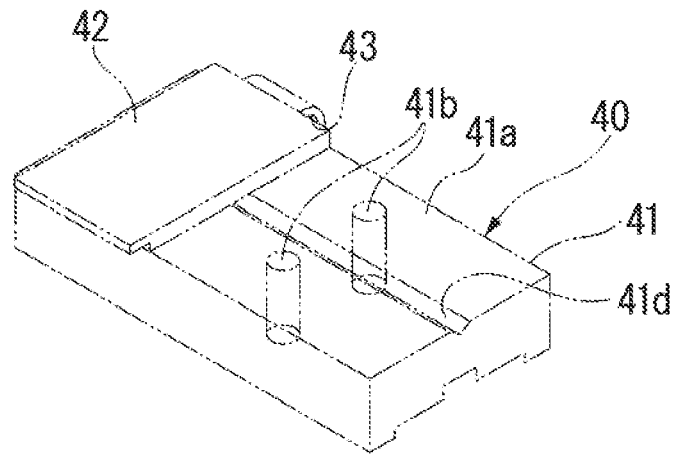
FIG. 9 is a perspective view schematically showing a specific example of a movable unit in which a fiber mounting detector and a positioning pin are attached to a movable stage of the optical fiber fusion splicer shown in FIG. 2.
Figure 9:
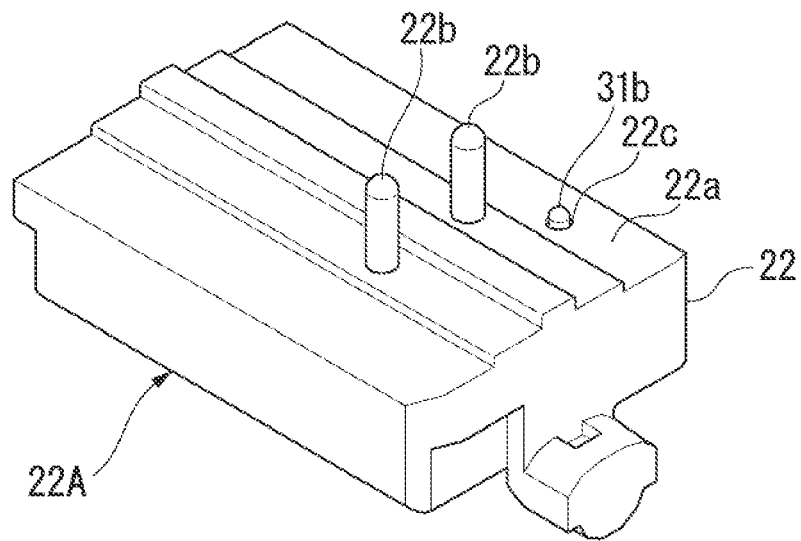

As shown in FIGS. 2 and 9, the fiber holder 40 is configured to hold and fix the optical fiber 9 by pinching the optical fiber 9 between a base plate 41 and a cover plate 42 that is provided so as to be openable and closable in a state pivotally attached to the base plate 41, and is placed on the movable stage 22 that is provided in the fusion splicer 10B in a state where the optical fiber 9 is held.

The fiber holder 40 illustrated in FIGS. 2 and 9 has a configuration in which the cover plate 42 is pivotally attached to one end of the rectangular plate-like base plate 41 in the longitudinal direction.

The cover plate 42 can be opened and closed with respect to a base plate top surface 41a that is one surface of the base plate 41 in the thickness direction.

Figure 8:
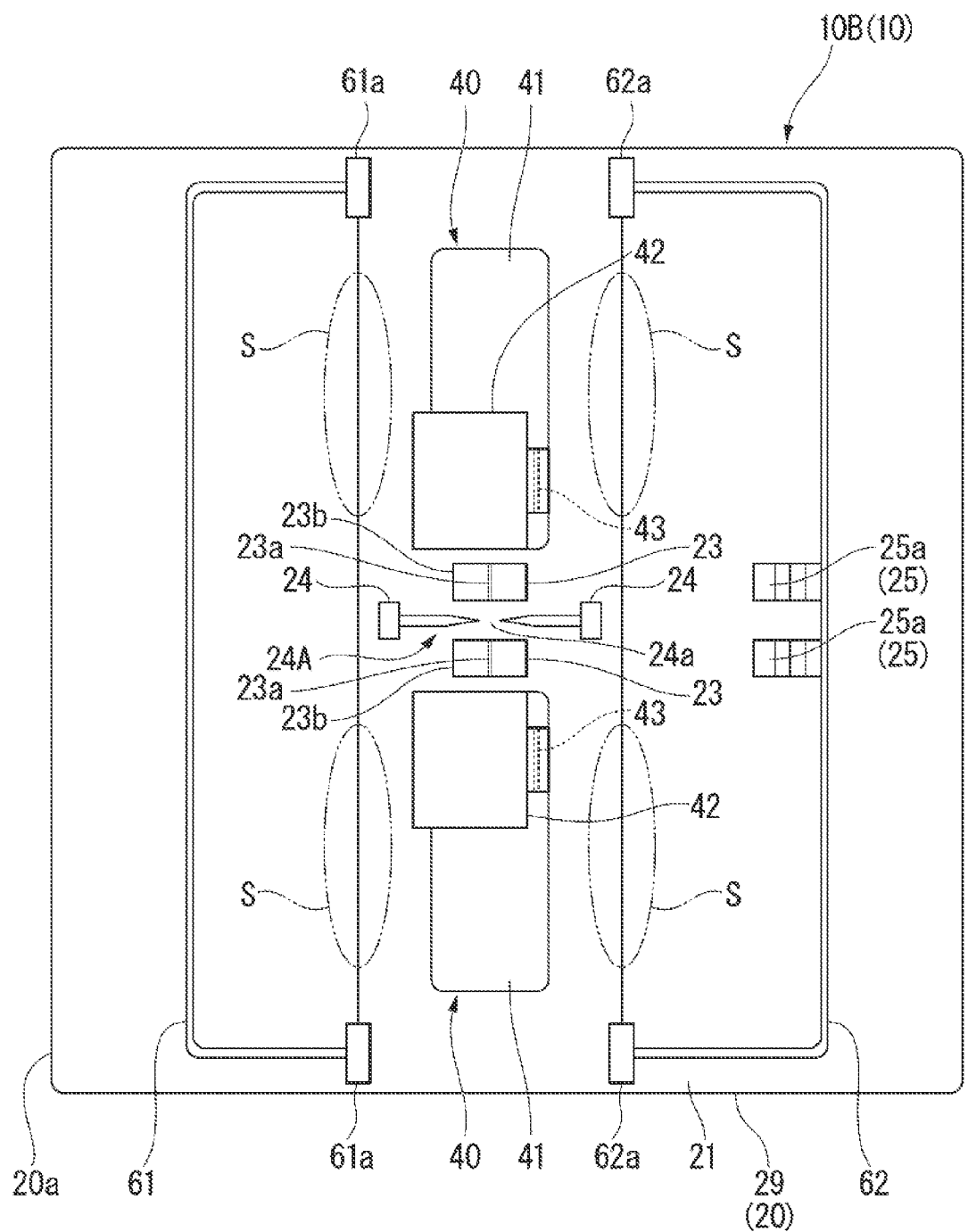
FIG. 8 is a plan view schematically showing the optical fiber fusion splicer shown in FIG. 2, and is a diagram showing a state where the windshield cover is open.

As shown in FIGS. 8 and 9, the cover plate 42 is pivotally attached to the base plate 41 through a rotating shaft 43 that is provided at one end of the rectangular plate-like base plate 41 in the width direction (left and right direction in FIG. 8) along the longitudinal direction of the base plate 41.

As shown in FIG. 2, the optical fiber 9 is fixed to the fiber holder 40 so that a protruding portion 9e obtained by making the distal side of the optical fiber 9 protrude from the fiber holder 40 is secured.

In addition, the optical fiber glass portion 9a (bare optical fiber) is exposed by removing the coat of the distal end of the protruding portion 9e, the optical fiber 9 being held and fixed to the fiber holder 40.

The fiber holder 40 holds and fixes the coated portion 9d of the optical fiber 9 by pinching it between the base plate 41 and the cover plate 42.

When fusion-splicing the optical fibers 91 and 92 held and fixed to the fiber holder 40 using the fusion splicer 10B, the fiber holder 40 which holds and fixes the optical fiber 9 is placed on the movable stage 22 in a state where the windshield cover 60 is open (for example, refer to FIG. 4 and the like).

That is, the fiber holder 40 which holds and fixes the optical fiber 9 is placed on each of the pair of movable stages 22.

The optical fiber 9 is mounted in the fusion splicer 10B by placing the fiber holder 40, to which the optical fiber 9 is held and fixed, on the movable stage 22.

The movable stage 22 functions as a fiber mounting portion to mount the optical fiber 9 in the fusion splicer 10B.

As shown in FIG. 2, in the fusion splicer 10B, the length of the protruding portion 9e protruding from the fiber holder 40 and the length of the optical fiber glass portion 9a after coat removal at the tip of the protruding portion 9e can be adjusted using a coat removal tool dedicated to a fiber holder or a cutting machine dedicated to a fiber holder so that the optical fiber glass portion 9a after performing coat removal in advance is placed at the positioning groove 23a on the groove formed substrate 23 and the tips of the optical fiber glass portions 9a of the optical fibers 9 held and fixed to the fiber holder 40 are disposed opposite each other with a slight gap therebetween in the protruding portion 9e protruding from the fiber holder 40 when the fiber holder 40 which holds and fixes the optical fiber 9 is placed on the movable stage 22 provided on each of the left and right sides of the heat fusion portion 24A.

In addition, the coat removal length of each optical fiber glass portion 9a is adjusted in advance so that the optical fiber glass portions 9a can be disposed at the positions where the tips can be fusion-spliced until the movable stage 22 moves forward from the standby position and reaches the forward limit position.

The arrangement of the fiber holder 40, which holds and fixes the optical fiber 9, onto the movable stage 22 is performed in a state where the movable stage 22 is disposed at the standby position (position of the movable stage 22 shown in FIGS. 1 and 2).

The fiber holder 40 to which the optical fiber 9 is held and fixed is placed on the movable stage 22 by placing the base plate 41 on the top surface 22a of the movable stage 22 so that the surface of the fiber holder 40 opposite the other surface, on which the cover plate 42 on the base plate 41 provided such that the left and right direction of the splicer becomes a longitudinal direction is provided, and the top surface 22a of the movable stage 22 are in contact with each other.

The top surface 22a of the movable stage 22 can be used as a holder mounting surface for placing the fiber holder 40 (specifically, the base plate 41) thereon.

FIG. 9 shows a specific example of the movable stage 22.

As shown in FIG. 9, the movable stage 22 is formed in a plate shape.

In addition, FIG. 9 shows a movable unit 22A having a configuration in which two positioning pins 22b protruding above the movable stage top surface 22a and a detector 32 (holder mounting detector), which detects that the fiber holder 40 has been placed on the top surface 22a of the movable stage, are fixed to the movable stage 22.

Figure 11:
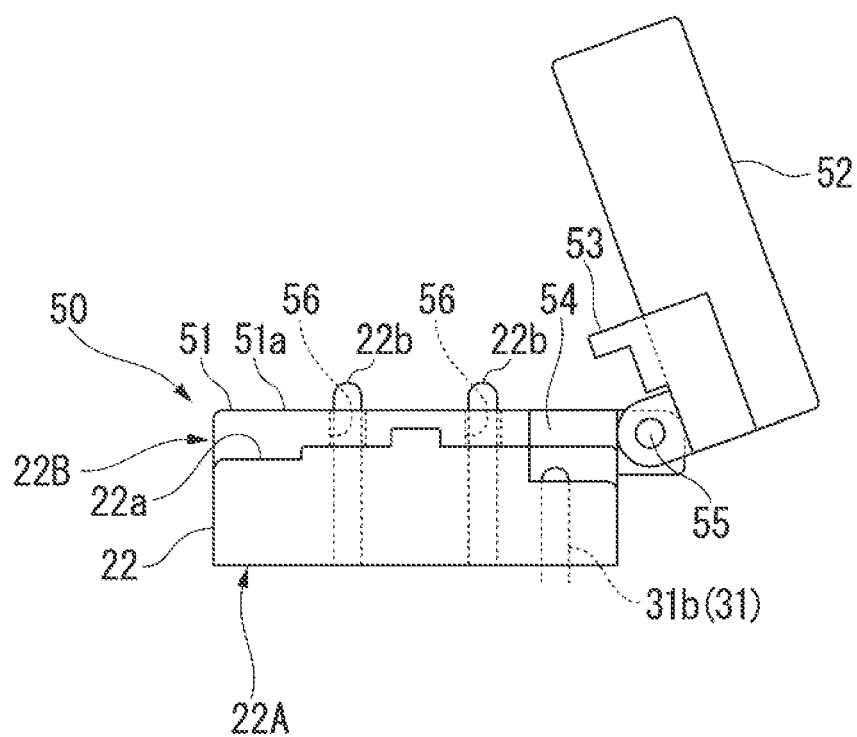
FIG. 11 is a side view (right side view) illustrating a movable stage with a clamp in the optical fiber fusion splicer shown in FIG. 10.

The positioning pins 22b provided in the movable unit 22A are shown only in FIGS. 9 and 11, and are not shown in other drawings excluding FIGS. 9 and 11.

As shown in FIG. 9, when placing the fiber holder 40 on the movable stage 22, two positioning pins 22b are inserted and fitted in pin fitting holes 41b, which are formed at two locations of the base plate 41 of the fiber holder 40. Thus, the two positioning pins 22b have a function of stably maintaining a state where the fiber holder 40 is placed in a predetermined direction at a predetermined position on the movable stage 22.

In the fiber holder 40 placed on the movable stage 22, the pin fitting hole 41b is formed at two locations of the base plate 41.

The fiber holder 40 shown in FIG. 9 illustrates a configuration in which the pin fitting hole 41b is a through hole passing through the base plate 41 in the thickness direction.

Here, as the pin fitting hole 41b, a configuration is preferable which can place the base plate 41 of the fiber holder 40 on the top surface 22a of the movable stage 22 so as to be brought into contact with the top surface 22a by opening the bottom surface of the base plate 41, which is an opposite surface to the base plate top surface 41a of the base plate 41, and housing the positioning pin 22b protruding above the movable stage 22.

In addition, the pin fitting hole 41b may be a non-through hole that is not open to the base plate top surface 41a.

In addition, the two positioning pins 22b of the movable unit 22A can be inserted into and removed from the two pin fitting holes 41b of the base plate 41.

Accordingly, the fiber holder 40 placed on the movable stage 22 by insertion and fitting of the two positioning pins 22b of the movable unit 22A into the two pin fitting holes 41b of the base plate 41 can be detached from the movable stage 22 by moving it upward with respect to the movable stage 22 along the two positioning pins 22b of the movable unit 22A.

Next, the holder mounting detector 32 will be described.

As shown in FIG. 2, the detector 32 is disposed such that the distal end of the sensor pin 31b of the clamp closing detector 31 of the fusion splicer 10A illustrated in FIG. 1 slightly protrudes above the movable stage top surface 22a. Except for the position of the distal end of the sensor pin 31b, the detector 32 has the same configuration as the clamp closing detector 31 described above.

Also for the holder mounting detector 32 (fiber mounting detector), a detector body is denoted by reference numeral 31a and a sensor pin is denoted by reference numeral 31b similar to the clamp closing detector 31 for the sake of explanation.

In addition, the fusion splicer 10B is different from the fusion splicer 10A shown in FIG. 1 only in that the movable stage 22 is used as a holder mounting portion and the holder mounting detector 32 is used instead of the clamp closing detector 31. Except for these differences, for example, the relationship between the detector 32 and the driving control device and the like are the same as those in the fusion splicer 10A shown in FIG. 1.

As shown in FIG. 2, the detector 32 has the detector body 31a fixed to the bottom side of the movable stage 22 and the sensor pin 31b protruding upward from the detector body 31a.

As shown in FIGS. 2 and 9, the sensor pin 31b is inserted through a vertical through hole 22c passing through the movable stage 22 up and down, and its distal end (upper end) protrudes above the movable stage top surface 22a.

The position of the sensor pin 31b of the detector 32 at this time is an initial position.

Figure 12A:
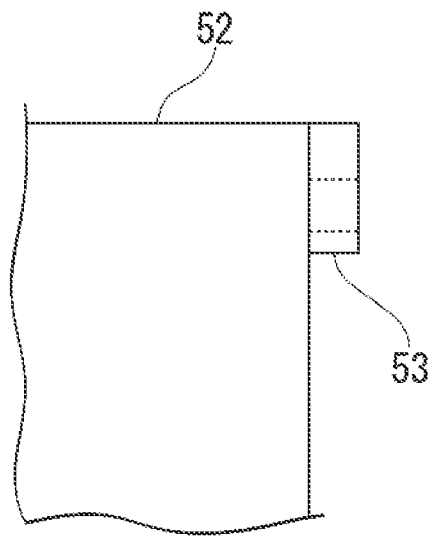
FIG. 12A is a diagram illustrating the movable stage with a clamp shown in FIG. 11, and is a plan view of a position near the extension lever of the upper clamp member.
Figure 12B:
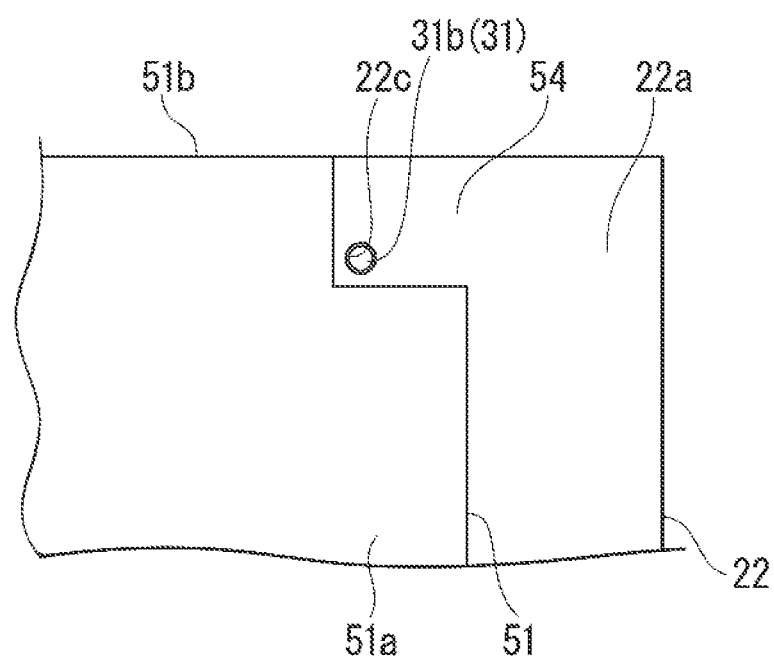
FIG. 12B is a diagram illustrating the movable stage with a clamp shown in FIG. 11, and is a plan view showing the vicinity of a notch portion of a lower clamp member.

As shown in FIGS. 9 and 12B, the upper end of the vertical through hole 22c is open to the movable stage top surface 22a.

As shown in FIG. 2, when the initial position of the holder mounting detector 32 is a position where the distal end of the sensor pin 31b slightly protrudes above the movable stage top surface 22a, the detector body 31a is in a non-detected state.

When placing the fiber holder 40 on the movable stage 22, the sensor pin 31b of the holder mounting detector 32 that is pressed against the base plate 41 lowered from above the movable stage 22 is pushed into the detector body 31a.

Then, when the base plate 41 is placed so as to be in contact with the movable stage 22, the detector body 31a of the holder mounting detector 32 is switched from a non-detected state to a detected state, and each detection signal acquired from the detector body 31a transitions from the non-detected state to the detected state.

The fusion splicer 10B can detect that the fiber holder 40 has been placed on the movable stage 22 when both detection signals acquired from the detector bodies 31a of the holder mounting detectors 32 provided on the left and right sides of the heat fusion portion 24A transition from a non-detected state to a detected state and both are detected.

In addition, in the fusion splicer 10B, when the fiber holder 40 placed on the movable stage 22 is removed from the movable stage 22, the sensor pin 31b pushed into the detector body 31a is restored to the initial position.

Accordingly, the detector body 31a is switched from a detected state to a non-detected state.

Then, each detection signal acquired from the detector body 31a of the holder mounting detector 32 is switched from a detected state to a non-detected state.

In the fusion splicer 10B, since both detection signals acquired from the detector bodies 31a provided on the left and right sides of the heat fusion portion 24A transition from a detected state to a non-detected state, both the detector bodies 31a are switched to a non-detected state.

As a result, it is possible to detect that the fiber holder 40 placed on the movable stage 22 has been removed.

Similar to the fusion splicer 10A described above, the fusion splicer 10B executes the windshield cover closing operation automatically when the fiber holder 40, to which the optical fiber 9 is held and fixed, is placed on each of the movable stages 22 provided on the left and right sides of the heat fusion portion 24A in the fiber set standby state.

Then, similar to the fusion splicer 10A described above, the fusion splicer 10B executes the fiber fusion and inspection operation automatically after the windshield cover closing operation.

The windshield cover closing operation of the fusion splicer 10B is automatically started when both the detector bodies 31a provided on the left and right sides of the heat fusion portion 24A are switched from a non-detected state to a detected state and both detection signals that the driving control device acquires from both the detector bodies 31a are switched to the detected state or when the waiting time (for example, several seconds) set in advance has passed from that point in time.

In the fusion splicer 10B, when both detection signals that the driving control device acquires from the detector bodies 31a provided on the left and right sides of the heat fusion portion 24A transition from a non-detected state to a detected state, the fiber fusion and inspection operation is automatically started with the above as a trigger signal.

In addition, in the case of the fusion splicer 10B the cover plate 42 of the fiber holder 40 can be opened instead of the coating clamp 50 to perform fiber removal work after the windshield cover opening operation.

After transporting the fusion-spliced optical fiber 9 for the next step, the worker performs holder removal work for removing the fiber holder 40 from each movable stage 22.

In the fusion splicer 10B, by performing the fiber fusion and inspection operation, the windshield cover 60 and the movable stages 22 provided on the left and right sides of the heat fusion portion 24A are finally in the fiber set standby state as in the fusion splicer 10A, that is, a state where the windshield cover 60 is open and the movable stages 22 provided on the left and right sides of the heat fusion portion 24A are disposed at the standby positions.

Compared with the fusion splicer 10A described with reference to FIG. 1 and the like, the fusion splicer 10B is different from the fusion splicer 10A only in that the movable stage 22 is used as a holder mounting portion by omitting the coating clamp 50 provided on the movable stage 22 and the holder mounting detector 32 is used instead of the clamp closing detector 31, and other configurations are the same as those in the fusion splicer 10A described above.

Similar to the fusion splicer 10A, the fusion splicer 10B changes to the fiber set standby state when the power switch (not shown) is changed from OFF state to ON state.

The fusion splicer 10B in the fiber set standby state changes to the operation standby initial state when switching from ON state to OFF state is made by operating the power switch, and the power source is turned off.

In addition, in the windshield cover closing operation of the fusion splicer 10 (common to the fusion splicers 10A and 10B), for example, a pair of cover members 61 and 62 are driven to rotate independently but driven to rotate at the same fixed speed.

However, the windshield cover closing operation of the fusion splicer 10 is not limited to this.

In the windshield cover closing operation, for example, it is also possible to drive only the second cover member 62, to which the fiber clamp member 25 is connected, at high speed at the start of closing and at a speed, which is lower than that that at the start of closing, at the end of closing.

As an example of the windshield cover closing operation, the moving speed of the fiber clamp member 25 (moving speed of the distal end of the pressing piece 25a) according to the rotation of the second cover member 62 may be set to approximately 50 cm/s at the start of closing of the second cover member 62, and a closing end section in which the fiber clamp member 25 moves at a speed of approximately 1 cm/s is secured.

Securing the closing end section, in which the fiber clamp member 25 moves at a lower speed (for example, approximately 1 cm/s) than the speed at the start of closing, on the movement path of the fiber clamp member 25 in the windshield cover closing operation contributes effectively to suppressing (or eliminating) the vibration generated when closing the cover members with respect to each other.

Driving the second cover member 62 at high speed at the start of closing and at a speed, which is lower than that at the start of closing, at the end of closing is effective for preventing damage to the optical fiber glass portion 9a and securing the strength of a fusion splice portion.

When a fusion splicer having a conventional configuration, such as the fusion splicer disclosed in Japanese Patent No. 3761192 described above, is used, a windshield cover and a clamp arm are usually interlocked with each other.

Therefore, when the windshield cover is quickly closed, the fiber clamp member collides with the optical fiber at high speed.

Figure 22:
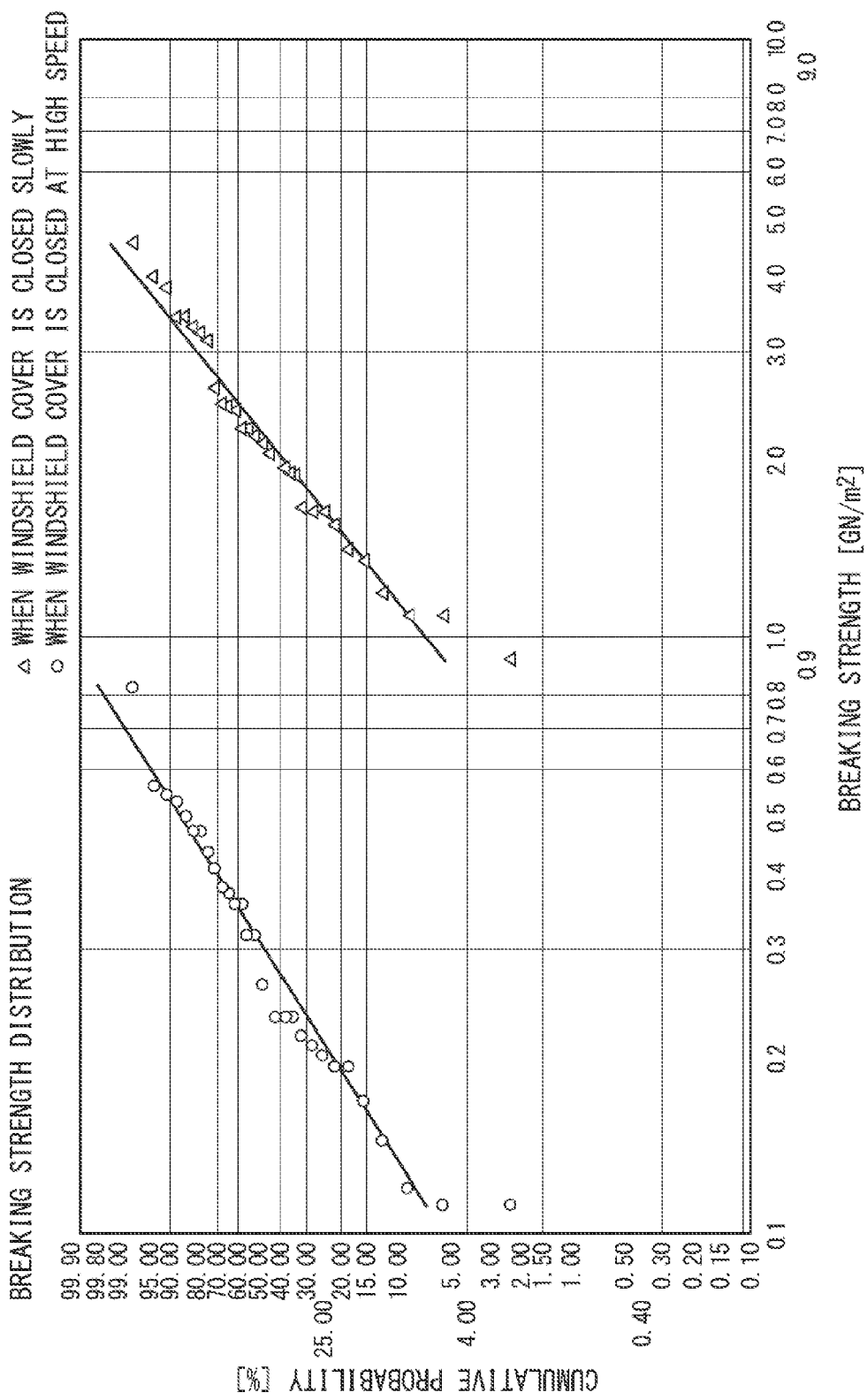
FIG. 22 is a graph showing the damage to the optical fiber according to the closing operation of the windshield cover.

The graph of FIG. 22 shows the comparison of the tensile breaking strength of optical fiber between the case where one optical fiber is placed on the V groove formed in the optical fiber fusion splicer equivalent to Japanese Patent No. 3761192 and the windshield cover is closed at high speed and the case where the windshield cover is closed slowly.

Since the glass portion of the optical fiber is damaged by the fiber clamp member, the strength of the optical fiber is reduced from the initial strength of approximately 7 $GN/m^2$, but damage to the optical fiber when the windshield cover is closed at high speed is larger.

In addition, this experiment is data showing only damage given to the optical fiber by the fiber clamp member, and damage at the time of coat removal, cutting, and fusion splice is added in practice.

Therefore, the strength after fusion splice is further reduced.

In contrast, as described above, in the windshield cover closing operation, for example, when a configuration is used in which the second cover member 62 to which the fiber clamp member 25 is connected is driven at high speed at the start of closing and at a speed, which is lower than that at the start of closing, at the end of closing, the lowering speed of the fiber clamp member 25 is reduced. Accordingly, it is possible to reduce damage to the optical fiber even if a special mechanism is not provided.

In the movable unit 22A illustrated in FIG. 9, the coating clamp 50 can be detachably mounted on the movable stage 22.

FIGS. 11, 12A, and 12B show an example of a movable stage with a clamp 22B in which the coating clamp 50 is mounted on the movable stage 22 of the movable unit 22A.

Figure 10:
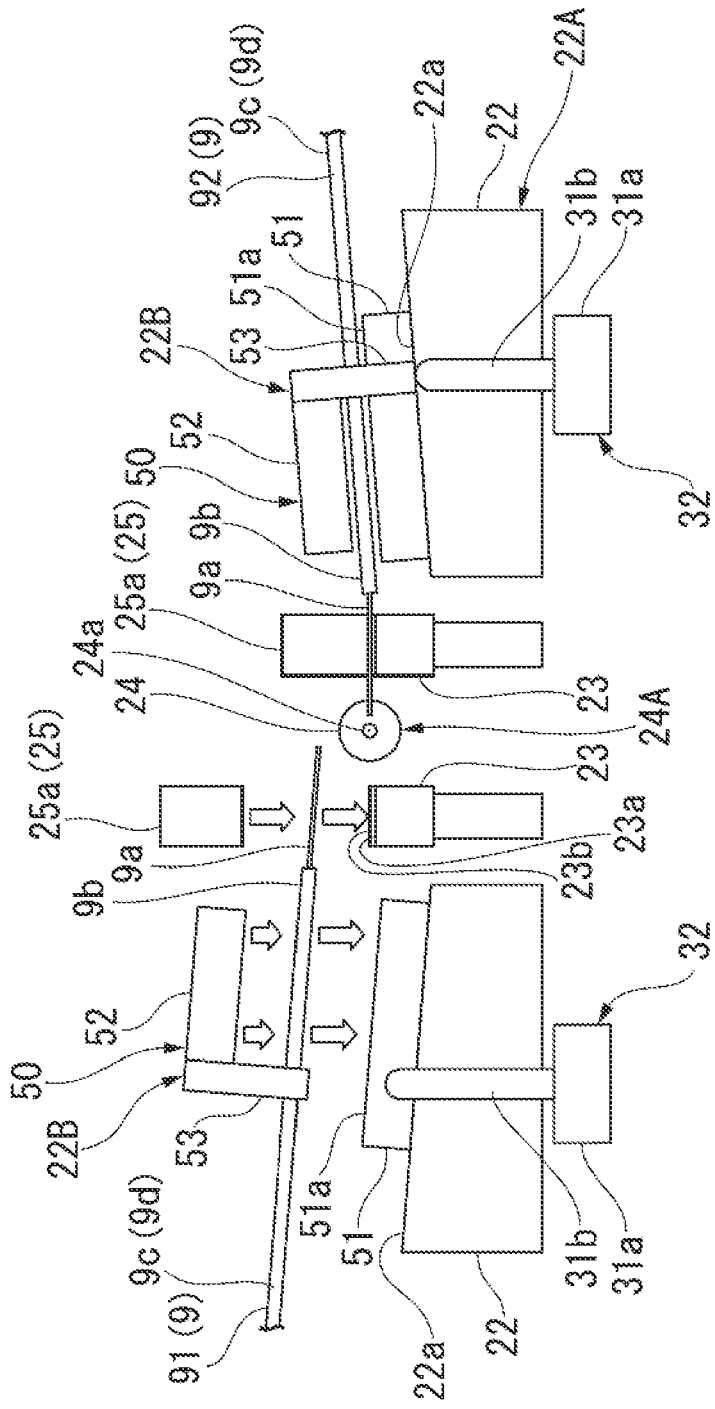
FIG. 10 is a front view schematically showing an example of an optical fiber fusion splicer having a configuration in which a movable stage with a clamp is assembled by mounting a coating clamp, which has an upper clamp member provided such that an extension lever protrudes, on each of movable stages on both sides of the optical fiber fusion splicer shown in FIG. 2.

In addition, FIG. 10 shows an example of a fusion splicer 10B in which the movable stage with a clamp 22B is assembled by mounting the coating clamp 50 on each of the movable stages 22 of the movable units 22A provided on the left and right sides of the heat fusion portion 24A in FIG. 2.

In this case, a pin fitting hole 56 into which the positioning pin 22b of the movable unit 22A can be inserted and fitted from the bottom side of the lower clamp member 51 is formed at two locations of the lower clamp member 51 that forms the coating clamp 50.

The coating clamp 50 can be mounted on the movable stage 22 by inserting and fitting the positioning pin 22b of the movable unit 22A into each of the pin fitting holes 56 at two locations of the lower clamp member 51.

The coating clamp 50 can be attached to and detached from the movable stage 22 by sliding the lower clamp member 51 along the positioning pins 22b inserted and fitted into the pin fitting holes 56 at the two locations.

The pin fitting hole 56 of the lower clamp member 51 that forms the coating clamp 50 in the example shown in the drawings is a through hole passing through the plate-like lower clamp member 51 in the thickness direction.

Here, as the pin fitting hole 56, a configuration is preferable which can place the base plate 51 on the top surface 22a of the movable stage 22 so as to be brought into contact with the top surface 22a by detachably housing the positioning pin 22b, which protrudes above the movable stage 22, from an opening that is open to the bottom surface of the lower clamp member 51, which is an opposite surface to the top surface 51a of the lower clamp member 51.

In this regard, the pin fitting hole 56 may be a non-through hole that is not open to the lower clamp member top surface 51a.

In the movable stage with a clamp 22B illustrated in FIGS. 10 to 12B, an extension lever 53, which protrudes from the upper clamp member 52 toward the surface closed with respect to the lower clamp member 51, is attached to the upper clamp member 52 of the coating clamp 50.

When closing the upper clamp member 52, which is in a state of being opened with respect to the lower clamp member 51 of the coating clamp 50, with respect to the lower clamp member 51, the sensor pin 31b of the detector 32 is pressed toward the detector body 31a by the protruding end of the extension lever 53.

The detector body 31a is switched from a non-detected state to a detected state when the sensor pin 31b is pushed into the detector body 31a.

In addition, by opening the upper clamp member 52 with respect to the lower clamp member 51, the upper clamp member 52 is disposed at a position spaced apart from the distal end of the sensor pin 31b without being in contact with the distal end of the sensor pin 31b at the initial position.

As shown in FIGS. 11, 12A, and 12B, a notch portion 54 is formed in the lower clamp member 51, which forms the movable stage with a clamp 22B, so that the distal end (upper end) of the sensor pin 31b protruding toward the movable stage 22 is exposed.

The notch portion 54 is formed in a valley shape that is recessed from an end surface 51b (end surface on the side of the rotating shaft 55) of the lower clamp member 51 present at the position near the rotating shaft 55 that pivotally attaches the upper clamp member 52 to the lower clamp member 51.

On the other hand, the extension lever 53 is provided so as to protrude toward the rotating shaft 55 side of the upper clamp member 52, so that the extension lever 53 can be inserted into the notch portion 54 of the lower clamp member 51 to press the distal end of the sensor pin 31b downward when closing the upper clamp member 52 with respect to the lower clamp member 51.

Having this configuration results in the extension lever 53 protruding from the upper clamp member 52 hardly being an obstacle when inserting the optical fiber 9 between the lower clamp member 51 and the upper clamp member 52 in a state of being opened with respect to the lower clamp member 51.

When the coating clamp 50 is mounted on the movable stage 22 or when the movable stage 22 is used as a holder mounting portion, the movable unit 22A can be used as is without changing the design of the detector 32 and the installation position of the movable unit 22A with respect to the movable stage 22.

The detector 32 of the movable unit 22A can be used as a clamp closing detector when the movable stage with a clamp 22B is used, and can be used as a holder mounting detector when the movable stage 22 is used as a holder mounting portion without attaching the coating clamp 50.

As shown in FIGS. 5 and 6, the fiber clamp member 25 that presses the optical fiber glass portion 9a, which is the distal end of the optical fiber 9 placed in the positioning groove 23a on the groove formed substrate 23, toward the groove bottom of the positioning groove 23a from above is attached to the inner side of one (in the example shown in the drawings, the second cover member 62) of the pair of cover members 61 and 62 that form the windshield cover 60.

The fiber clamp member 25 pushes the optical fiber glass portion 9a, which is provided in the distal end of the optical fiber 9 placed in the positioning groove 23a, into the groove formed substrate 23 by pressing the optical fiber glass portion 9a toward the groove bottom of the positioning groove 23a from above when closing the pair of cover members 61 and 62 with respect to each other.

In addition, of the pair of cover members 61 and 62, the cover member 61 in which no fiber clamp member 25 is provided is also referred to as a first cover member and the cover member 62 in which the fiber clamp member 25 is provided is also referred to as a second cover member hereinbelow.

Figure 7:
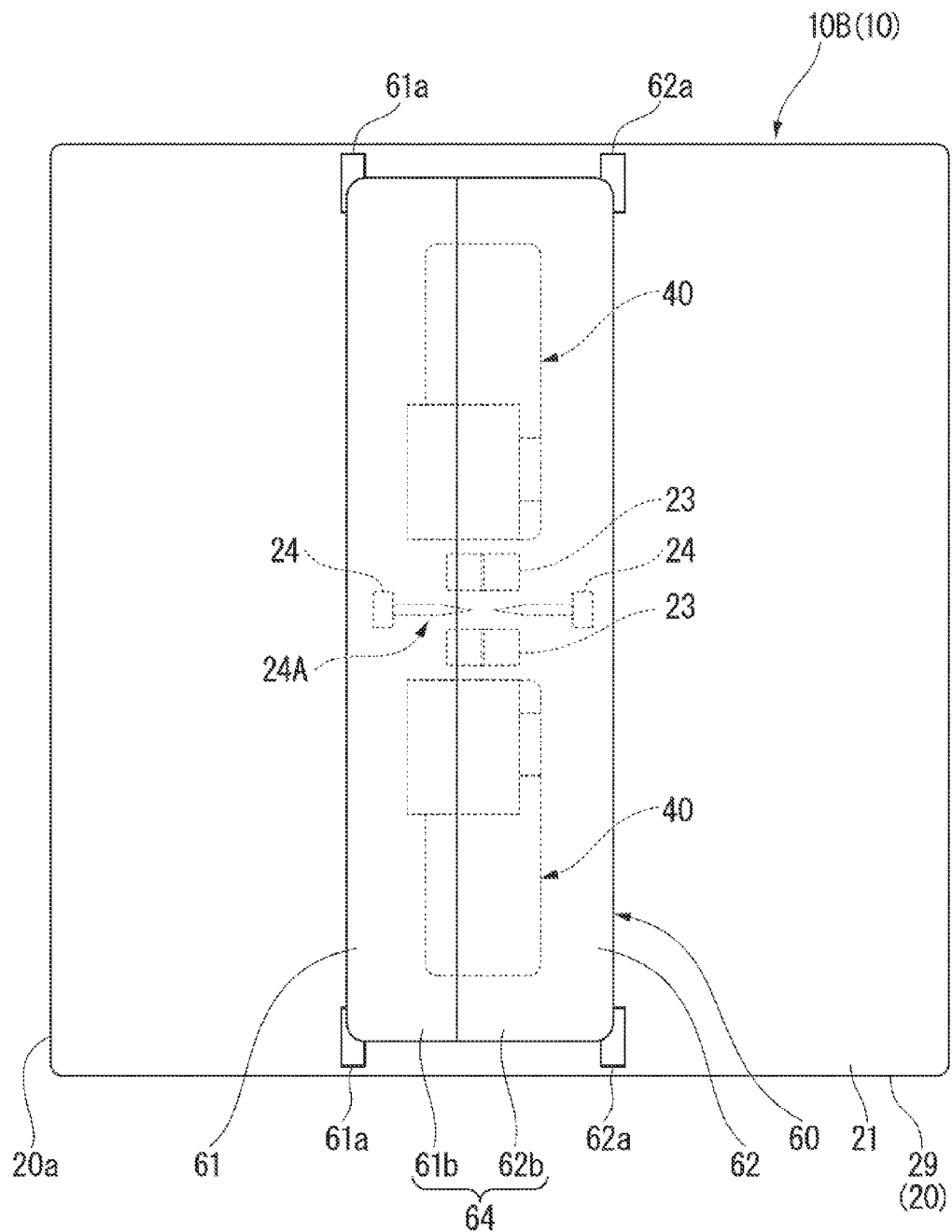
FIG. 7 is a plan view schematically showing the optical fiber fusion splicer shown in FIG. 2, and is a diagram showing a state where the windshield cover is closed.

As shown in FIGS. 5 and 7, the windshield cover 60 is formed in a container shape that houses and cover the pair of electrode rods 24, the discharge portion 24a, the groove formed substrates 23 and the fiber clamp members 25 provided on the left and right sides of the discharge portion 24a, and the fiber holder 40 placed on the movable stage 22 provided on the left and right sides of the discharge portion 24a by closing the pair of cover members 61 and 62 with respect to each other.

As shown in FIGS. 5 and 7, the windshield cover 60 in a closed state prevents the wind of outside from entering the inside of the windshield cover 60, so that the wind does not affect the fusion splice of the optical fiber 9 in the discharge portion 24a.

A pair of cover members 61 and 62 are formed in a long and thin shape extending in the left and right direction of the splicer.

A pair of cover members 61 and 62 are provided at two locations of the apparatus body 20 in the front and rear direction.

The windshield cover 60 has a halved structure formed by a pair of front and rear cover members 61 and 62.

As shown in FIGS. 5 and 7, the windshield cover 60 in a closed state has a configuration divided into two front and rear members from a central portion in the front and rear direction (left and right direction in FIGS. 5 and 7), that is, the windshield cover 60 in a closed state is divided into the first cover member 61 on the front side from the central portion in the front and rear direction and the second cover member 62 on the back side.

An interface 67 between the pair of cover members 61 and 62 closed with respect to each other is present in the central portion of the windshield cover 60, which is in a closed state, in the front and rear direction.

In the windshield cover 60 in the example shown in the drawings, the interface 67 extends along the virtual vertical plane perpendicular to the front and rear direction.

In the state closed as shown in FIGS. 5 and 7, the windshield cover 60 has a main cover wall portion 64, which extends in the left and right direction of the splicer so as to have an arch-shaped cross section, and a cover end wall portion 65 having a surface, which protrudes so as to be perpendicular to the extension direction of the main cover wall portion 64, on both ends in the extension direction of the main cover wall portion 64.

The cover end wall portions 65 provided on both ends in the extension direction of the main cover wall portion 64 block both ends in the extension direction of a recessed portion 66 that is a groove-shaped region along the main cover wall portion 64 on the inner peripheral side of the main cover wall portion 64 having an arch-shaped cross section.

The first cover member 61 has a main wall portion 61b, which extends so as to have an arch-shaped cross section, and an end wall portion 61c having a surface, which protrudes so as to be perpendicular to the extension direction of the main wall portion 61b, on both ends in the extension direction of the main wall portion 61b.

The second cover member 62 has a main wall portion 62b, which extends so as to have an arch-shaped cross section, and an end wall portion 62c having a surface, which protrudes so as to be perpendicular to the extension direction of the main wall portion 62b, on both ends in the extension direction of the main wall portion 62b.

In the windshield cover 60 in a state of being closed as shown in FIGS. 5 and 7, one-side end surfaces of the pair of cover members 61 and 62 and the end surfaces of the end wall portions 61c and 62c are closed with respect to each other through the cross-sectional central portions of the arch-shaped main wall portions 61b and 62b.

The cover members 61 and 62 have close alignment end surfaces 61d and 62d that form the interface 67 when closed with respect to each other in a state where the windshield cover 60 is closed.

In addition, due to the cover members 61 and 62 being closed with respect to each other, the main cover wall portion 64 is formed by the main wall portions 61b and 62b of the cover members 61 and 62, and the cover end wall portion 65 is formed by the end wall portions 61c and 62c of the cover members 61 and 62.

In addition, as shown in FIG. 5, the cover members 61 and 62 have main body contact surfaces 61e and 62e that are virtual surfaces in contact with the top surface 21 of the apparatus body in a state where the windshield cover 60 is closed.

The sides (ends) of the cover members 61 and 62 opposite the close alignment end surfaces (ends) 61d and 62d in the main wall portions 61b and 62b are pivotally attached to the apparatus body 20 through the rotating shafts 61a and 62a.

The cover members 61 and 62 are rotating cover members that are rotatably attached to the apparatus body 20 through the rotating shafts 61a and 62a.

As shown in FIGS. 5 to 8, the rotating shafts 61a and 62a of the cover members 61 and 62 are provided at positions shifted from the discharge portion 24a in the front and rear direction of the splicer.

The cover members 61 and 62 are pivotally attached by the rotating shafts 61a and 62a so as to be rotatable with respect to the apparatus body 20 with the axis of rotation in the left and right direction of the splicer as the starting point.

In addition, the rotating shafts 61a and 62a are attached to the apparatus body 20 along the top surface 21.

The axis of rotation of the cover members 61 and 62 with respect to the apparatus body 20 is located so as to match the apparatus body top surface 21 in the vertical direction (vertical direction in FIG. 5) of the splicer or to be slightly shifted with respect to the apparatus body top surface 21.

As shown in FIGS. 5 and 7, in a state where the windshield cover 60 is closed, the main body contact surfaces 61e and 62e of the cover members 61 and 62 are in contact with the apparatus body top surface 21 between the interface 67 and the rotating shafts 61a and 62a.

When the windshield cover 60 is in a closed state, the cover members 61 and 62 are located between the rotating shafts 61a and 62a and the interface 67 in the front and rear direction of the splicer.

As shown in FIGS. 7 and 8, a pair of cover members 61 and 62 that form the windshield cover 60 are formed in a long and thin shape extending in the left and right direction of the splicer.

As shown in FIG. 8, the fiber clamp member 25 is provided at two locations in the longitudinal direction of the second cover member 62.

The two fiber clamp members 25 are provided at positions corresponding to the groove formed substrates 23, which are provided on the left and right sides of the discharge portion 24a, when closing a pair of cover members 61 and 62 with respect to each other.

That is, when closing a pair of cover members 61 and 62 with respect to each other, the optical fiber glass portion 9a placed in the positioning groove 23a of each of the groove formed substrates 23, which are provided on the left and right sides of the discharge portion 24a, can be pushed toward the groove bottom of the positioning groove 23a by the fiber clamp member 25.

As shown in FIGS. 5 and 6, the sizes of the pair of cover members 61 and 62 in the example shown in the drawings are not the same but are different.

As shown in FIG. 5, the interface 67 of the windshield cover 60 in a closed state is at a position shifted to the rotating shaft 61a side of the first cover member 61 from the middle position between 61a and 62a, which are rotating shafts of a pair of cover members 61 and 62, in the front and rear direction of the splicer.

The first cover member 61 is formed such that the size in the front and rear direction in a state where the windshield cover 60 is closed is smaller than that of the second cover member 62.

In addition, when closing a pair of cover members 61 and 62 with respect to each other, an end (hereinafter, a close alignment side end 2f) of the main wall portion 62b of the second cover member 62 on the close alignment end surface 62d side is disposed above the discharge portion 24a, the groove formed substrates 23 on both sides, and the fiber holder 40.

The fiber clamp members 25, which are provided at two locations in the longitudinal direction of the second cover member 62, are provided on the inner surface side of the close alignment side end 62f of the main wall portion 62b of the second cover member 62.

Accordingly, when the windshield cover 60 is closed, the fusion splicer 10 can push each optical fiber glass portion 9a, which is placed in the positioning groove 23a of the groove formed substrate 23, toward the groove bottom of the positioning groove 23a using the fiber clamp member 25 provided at two locations in the longitudinal direction of the second cover member 62.

In addition, since the shapes of the close alignment end surfaces 61d and 62d correspond to each other, a pair of cover members 61 and 62 when the windshield cover 60 is closed are closed with respect to each other without a gap.

Preferably, when the windshield cover 60 is closed, the fiber clamp member 25 of the second cover member 62 that is provided in the main wall portion 62b is disposed above at least the groove formed substrate 23 among the discharge portion 24a, the groove formed substrates 23 provided on the left and right sides of the heat fusion portion 24A, and the fiber holders 40 provided on the left and right sides of the heat fusion portion 24A.

For this reason, as a pair of cover members 61 and 62, for example, it is possible to adopt a configuration in which, when the windshield cover 60 is closed, the fiber clamp member 25 provided in the main wall portion 62b of the second cover member 62 is disposed only above the groove formed substrate 23, which is provided on each of the left and right sides of the heat fusion portion 24A, and the main wall portion 61b of the first cover member 61 is disposed above the discharge portion 24a and the fiber holder 40.

As shown in FIG. 5 and FIG. 6, the fiber clamp member 25 in the example shown in the drawings has the pressing piece 25a that is in contact with the optical fiber glass portion 9a of the optical fiber 9, which is placed in the positioning groove 23a, in a protruding state, a fiber pressing surface 25b that is provided at the tip of the pressing piece 25a and is in contact with the optical fiber glass portion 9a in a protruding state, and a shaft portion 25c extending from the side of the pressing piece 25a opposite a side on which the fiber pressing surface 25b is provided.

In this fiber clamp member 25, a rear end of the shaft portion 25c opposite an end on which the pressing piece 25a is provided is attached to a clamp support member 26a fixed to the inner surface of the close alignment side end 62f.

The rear end of the shaft portion 25c of the fiber clamp member 25 is supported by the clamp support member 26a so as to be movable in a tangential direction of the rotation trajectory having the rotating shaft 62a (rotating shaft of the second cover member) of the clamp support member 26a as the center.

Here, the shaft portion 25c is held by the clamp support member 26a so as not to fall off from the clamp support member 26a.

In addition, in the fiber clamp member 25, a spring 26b is provided between the pressing piece 25a and the clamp support member 26a.

When the second cover member 62 is closed, the spring 26b is elastically biased in a direction of pressing the groove formed substrate 23.

In addition, the spring 26b in the example shown in the drawings is specifically a coil spring, and is fitted over the shaft portion 25c of the fiber clamp member 25.

Accordingly, in the fusion splicer 10, when the windshield cover 60 is closed, it is possible to push the optical fiber glass portion 9a, which is placed in the positioning groove 23a of each of the groove formed substrates 23 provided on the left and right sides of the heat fusion portion 24A, toward the groove bottom of the positioning groove 23a with the appropriate pressure using the fiber clamp member 25 provided at two locations in the longitudinal direction of the second cover member 62.

As shown in FIGS. 5 and 6, the camera 71 that images an optical fiber disposed in the discharge portion 24a (or near the discharge portion 24a) is embedded in the apparatus body 20 of the fusion splicer 10.

In addition, light sources for imaging 72a and 72b that emit light to the discharge portion 24a (or the vicinity of the discharge portion 24a) at the time of imaging using the camera 71 are disposed inside a pair of cover members 61 and 62.

The camera 71 is disposed at two locations of the apparatus body 20 that are shifted from each other in the front and rear direction.

The first camera located on the front side between the cameras 71 at two locations is denoted by reference numeral 71a in drawings, and the second camera located on the back side is denoted by reference numeral 71b in drawings.

In addition, in the apparatus body 20, lenses 73a and 73b are disposed on the discharge portion 24a side of the cameras 71a and 71b.

The cameras 71a and 71b image the optical fiber 9, which is disposed in the discharge portion 24a (or including the vicinity), through light transmissive portions and the lenses 73a and 73b provided in the apparatus body 20.

The fusion splicer 10 illuminates the optical fiber 9 from two directions using the two light sources for imaging 72a and 72b, and performs two-axis imaging (two-axis observation) of the optical fiber 9 from the respective directions using the two lenses 73a and 73b and the two cameras 71a and 71b.

As shown in FIG. 5, in the fusion splicer 10, when the windshield cover 60 is closed, the light source for imaging 72a provided inside the first cover member 61 and the second camera 71b are disposed opposite each other with the discharge portion 24a interposed therebetween.

In addition, the light source for imaging 72b provided inside the second cover member 62 and the first camera 71a are disposed opposite each other with the discharge portion 24a interposed therebetween.

As the light sources for imaging 72a and 72b, for example, light emitting diodes and the like can be appropriately used.

In addition, it is preferable that the light sources for imaging 72a and 72b be turned on at least when imaging the optical fiber with the camera 71.

For this reason, the light sources for imaging 72a and 72b may be turned on only when imaging the optical fiber with the camera 71 and be turned off otherwise, for example.

As shown in FIGS. 3 and 4, the fusion splicer 10 includes the switch board 11, which is provided on the apparatus body 20, and the reinforcing sleeve heater 12.

The switch board 11 is disposed at the front end of the top surface 21 of the apparatus body 20 so as to extend along the left and right direction (depth direction of the paper in FIGS. 3 and 4) of the splicer.

Operation switches (not shown) are attached to the switch board 11.

The reinforcing sleeve heater 12 is disposed at the rear end of the top surface 21 of the apparatus body 20 so as to extend along the left and right direction of the splicer.

The reinforcing sleeve heater 12 is an apparatus that coats a fusion splice portion, which is obtained by fusion-splicing the optical fibers 91 and 92, with a heat-shrinkable reinforcing sleeve, which is shrunk by heating, so that the reinforcing sleeve is formed integrally with the fusion splice portion.

Due to having the reinforcing sleeve heater 12 on the apparatus body 20, the work of taking out the fusion splice portion of the optical fibers 91 and 92 from the discharge portion 24a between the pair of electrode rods 24 and transferring it to the reinforcing sleeve heater 12 can be smoothly and efficiently performed.

In addition, as shown in FIGS. 3 and 4, the fusion splicer 10 has a monitor device 14 for displaying an image captured by the camera 71.

The monitor device 14 is formed in a panel shape.

As the monitor device 14, for example, a liquid crystal display device can be appropriately used.

In the monitor device 14, mounting arms 14a protruding from both sides are provided on the left and right sides (FIGS. 3 and 4) of the switch board 11 on the apparatus body 20, and each of them is attached so as to be rotatable through a hinge pin 14b with the axis of rotation in the left and right direction of the splicer as the axis.

The monitor device 14 can change the direction with respect to the apparatus body 20 by rotation around the hinge pin 14b. However, in view of the operability of the fusion splicer 10 and the like, the monitor device 14 is basically used in a state disposed along the front surface 20a of the apparatus body 20 (solid lines in FIGS. 3 and 4).

The direction of the monitor device 14 in this case is also referred to as a direction at the time of use.

In addition, the monitor device 14 shown in FIGS. 3 and 4 has a display surface 14c on the opposite side to a surface on the side where the apparatus body 20 is disposed.

The fusion splicer 10 has a portability allowing the worker to carry it. Accordingly, the fusion splicer 10 can be appropriately used in the work of connecting communication cables (optical fiber cables) and the like, for example.

Here, the fusion splicer 10 according to the embodiment of the present invention can be widely applied as a fusion splicer used for fusion splice of optical fibers, and is not limited to the apparatus having a portability and the apparatus used for the work of connecting communication cables (optical fiber cables).

In addition, the angle adjustment range of the monitor device 14 with respect to the apparatus body 20 can be appropriately set. For example, the angle adjustment may be made to be possible from the above-described direction at the time of use to a direction in which the display surface 14c disposed on the apparatus body top surface 21 faces the apparatus body top surface 21.

As shown in FIGS. 3 and 4, on both sides of the apparatus body top surface 21 in the front and rear direction with a central portion of the apparatus body top surface 21 in the front and rear direction interposed therebetween, cover member housing grooves 27a and 27b recessed from the apparatus body top surface 21 are formed so as to extend in the left and right direction of the splicer.

In the fusion splicer 10, the pair of electrode rods 24, the discharge portion 24a, the groove formed substrates 23 provided on the left and right sides of the heat fusion portion 24A, the movable stages 22 provided on the left and right sides of the heat fusion portion 24A, and the rotating shafts 61a and 62a of the pair of cover members 61 and 62 that form the windshield cover 60 are provided in a central mount 28 provided between the cover member housing grooves 27a and 27b.

The rotating shafts 61a and 62a included in the cover members 61 and 62 are disposed at boundaries (boundary positions or positions near the boundary positions) between the top surface 28a (part of the apparatus body top surface 21) of the central mount 28 and the cover member housing grooves 27a and 27b.

In this configuration, the radius of rotation (radius of rotation of a portion whose distance from the axis of rotation is largest) of the cover members 61 and 62 can be suppressed, compared with a case where the rotating shafts of the cover members 61 and 62 are at positions largely distant from the boundaries between the central mount top surface 28a and the cover member housing grooves 27a and 27b.

Due to having this configuration, the cover members 61 and 62 can be miniaturized and the radius of rotation can be reduced.

In addition, the top surface 23b of the groove formed substrate 23 of the fusion splicer 10 generally matches the extension surface of the central mount top surface 28a.

The rotating shafts 61a and 62a of a pair of cover members 61 and 62 are disposed on the same plane generally matching the groove formed substrate top surface 23b.

In addition, the rotating shafts 61a and 62a of the cover members 61 and 62 are disposed so as to be located on substantially the same plane as the optical fiber 9 (specifically, the optical fiber glass portion 9a) disposed in the positioning groove 23a of the groove formed substrate 23.

Due to having this configuration, it is possible to prevent or suppress a situation where the fiber clamp member 25, which presses the optical fiber 9 on the positioning groove 23a of the groove formed substrate 23, gives torsional stress to the optical fiber 9 when closing the windshield cover 60 that is in an open state.

If the axis of rotation of the fiber clamp member 25 (axis of rotation of the second cover member 62) and the optical fiber 9 on the positioning groove 23a of the groove formed substrate 23 are on the same plane perpendicular to the left and right direction of the splicer, the fiber clamp member 25 lowers perpendicular to the optical fiber 9. Therefore, it is possible to suppress the occurrence of torsional stress with respect to the optical fiber 9.

In addition, the axis of rotation of the fiber clamp member 25 and the groove formed substrate top surface 23b do not need to match exactly each other.

If the axis of rotation of the fiber clamp member 25 and the groove formed substrate top surface 23b match each other to some extent, it is possible to prevent the occurrence of torsional stress with respect to the optical fiber 9.

The cover member housing groove 27a (first cover member housing groove) in which the first cover member 61 is housed is formed between the switch board 11 and the central mount 28.

The cover member housing groove 27b (second cover member housing groove) in which the second cover member 62 is housed is formed between the reinforcing sleeve heater 12 and the central mount 28.

In the fusion splicer 10, the cover members 61 and 62 after rotating the first and second cover members 61 and 62 shown in FIG. 3 from the close alignment state in a direction of being away from each other by the driving force of the power sources 63a and 63b can be housed in the cover member housing grooves 27a and 27b of the apparatus body 20 (refer to FIG. 4).

Since the fusion splicer 10 has a configuration in which the cover members 61 and 62 are housed in the cover member housing grooves 27a and 27b, it is possible to perform rotational opening and closing of the cover members 61 and 62 in an angle range exceeding 90° (angle range exceeding 90° from the closed position).

In addition, the cover member housing grooves 27a and 27b are formed in a top plate 29a (refer to FIGS. 3 to 6) of the apparatus body 20.

Therefore, the cover members 61 and 62 do not enter the inside of a housing 29 (refer to FIGS. 3 and 4) of the apparatus body 20 including the top plate 29a.

FIGS. 5 and 6 are diagrams illustrating a specific example of a fusion splicer in which the cover member housing grooves 27a and 27b are formed at the upper end of the apparatus body 20.

In FIGS. 5 and 6, the first cover member housing groove 27a is formed at a position, which is shifted to the back side from the switch board 11, between the switch board 11 and the central mount 28.

In addition, the second cover member housing groove 27b is formed at a position, which is shifted to the front side from the reinforcing sleeve heater 12, between the reinforcing sleeve heater 12 and the central mount 28.

For this reason, a part of the apparatus body top surface 21 is present between the first cover member housing groove 27a and the switch board 11 and between the second cover member housing groove 27b and the reinforcing sleeve heater 12.

FIGS. 5 and 6 illustrate a configuration in which the cover members 61 and 62 can be housed in the cover member housing grooves 27a and 27b by rotating the cover members 61 and 62 by approximately 135° from the closed position.

FIGS. 3 and 4 also illustrate a configuration in which the cover members 61 and 62 can be rotated by approximately 135° from the closed position.

By allowing the cover members 61 and 62 to rotate in the angle range exceeding 90° from the closed position, the opening area when opening the windshield cover 60 is increased. As a result, attaching and detaching of the fiber holder with respect to the movable stage 22, opening and closing of the coating clamp, and the like can easily performed.

By allowing rotational opening and closing of the cover members 61 and 62 in the angle range exceeding 90° from the closed position, for example, as shown in FIG. 8, it is possible to easily secure space S (hereinafter, referred to as finger space) by which the fingers of a hand can be put between the fiber holder 40 (fiber holder 40 to which the optical fiber 9 is held and fixed), which is placed on the movable stage 22, and each of the cover members 61 and 62 in an open state provided on both sides of the fiber holder 40.

In addition, due to having this configuration, it is possible to easily perform an operation of attaching and detaching the fiber holder 40 to and from the movable stage 22 (specifically, an operation of moving the fiber holder 40 up and down with respect to the movable stage 22) by holding the fiber holder 40 from both sides with the fingers inserted into the finger space S on both sides of the fiber holder 40.

In addition, when the coating clamp 50 is provided on the movable stage 22, it is possible to easily perform an operation of opening and closing the upper clamp member 52 with respect to the lower clamp member 51 with the fingers inserted into the finger space S secured between the coating clamp 50 and each of the cover members 61 and 62 in the open state provided on both sides of the coating clamp 50.

In addition, in FIGS. 3 to 6, the first cover member 61 is formed such that the radius of rotation (radius of rotation of a portion whose distance from the axis of rotation is largest) is smaller than the distance between the rotating shaft 61a of the first cover member and the switch board 11.

The second cover member 62 is formed such that the radius of rotation (radius of rotation of a portion whose distance from the axis of rotation is largest) is smaller than the distance between the rotating shaft 62a of the second cover member and the reinforcing sleeve heater 12.

For this reason, the cover members 61 and 62 do not protrude outward from the apparatus body 20 in plan view of the fusion splicer 10 both while the cover members 61 and 62 are being rotated from the closed position to the limit position in the opening direction and when the cover members 61 and 62 reach the limit position in the opening direction.

Incidentally, the windshield cover of the fusion splicer disclosed in Japanese Patent No. 4382694 described above protrudes to the outside of the apparatus (for example, the front side) so as to be opened.

The optical fiber fusion splicing work is accompanied by wiring work. Accordingly, in a state where the windshield cover is open, there is a risk of the optical fiber being broken since the optical fiber is hooked to a portion of the windshield cover protruding to the outside of the apparatus.

On the other hand, Japanese Unexamined Patent Application, First Publication No. H11-90625 discloses an invention proposed in order that the windshield cover does not protrude to the outside of the apparatus.

Japanese Unexamined Patent Application, First Publication No. H11-90625 discloses a mechanism that prevents the protrusion of the windshield cover to the outside by dividing the windshield cover into two parts and sliding and retracting each windshield cover or rotating and retracting the windshield cover with the rotating shaft (51) inside the apparatus as the center.

However, there is the following problem in this mechanism.

(1) In the case of the structure of retracting the windshield cover by sliding it back and forth, a retraction location is required on the top surface of the fusion splicer.

Since a fusion splicer for construction applications used to connect communication cables is designed to have a small size, it is difficult to secure the retraction location.

If the amount of sliding is small, the opening area in a state where the windshield cover is open is reduced. This causes a problem in the operation of opening and closing the coating clamp lever with fingers or in the operation of mounting the fiber holder with fingers.

(2) In the case of the structure of retreating the windshield cover by rotating it, the windshield cover is housed into the apparatus by providing the rotating shaft (51) inside the apparatus.

However, since the fusion splicer for construction applications used to connect communication cables is designed to have a small size and the internal structure is jammed, it is not easy to increase the rotation angle, and it is difficult to open the windshield cover at an angle exceeding 90° from the position at the time of close alignment.

For this reason, also in a state where the windshield cover is open, the opening area is reduced. This causes a problem in the operation of opening and closing the coating clamp lever with fingers or in the operation of mounting the fiber holder with fingers.

(3) In the structure disclosed in FIG. 2 of Japanese Unexamined Patent Application, First Publication No. H11-90625, a fiber holder mounting base (39) is not housed in a windshield cover.

This is a result of measures taken so that the windshield cover, which is opened by only approximately 45°, does not interrupt fiber holder mounting.

In this structure, however, since it is difficult to maintain the sealability of the windshield cover, resistance to wind is reduced.

In addition, since this is a structure where the windshield cover is housed inside the apparatus, the sealability of the apparatus is lowered and accordingly resistance to wind is reduced.

On the other hand, there is also a proposal to reduce the size of the windshield cover without dividing it.

The above-described Japanese Unexamined Patent Application, First Publication No. 2003-167151 discloses an invention to realize the miniaturization of the windshield cover by disposing the fiber clamp member on the inner side of the windshield cover.

However, Japanese Unexamined Patent Application, First Publication No. 2003-167151 discloses a configuration in which no clamp arm is provided.

In addition, the above-described Japanese Patent No. 4382694 discloses a technique for reducing the size of the windshield cover by disposing a light source for illumination instead of an illumination light reflecting mirror provided on the inner side of the windshield cover and eliminating two light sources for illumination on the outer side of the electrode rod.

In the two cases described above, the volume of protrusion to the outside of the apparatus is only reduced, but protrusion is not eliminated fundamentally.

As described above, there is no appropriate techniques in the conventional art that can sufficiently ensure the sealability in a state where the windshield cover is closed, can easily secure the opening area at the time of opening, and can eliminate the protrusion to the outside of the apparatus.

In contrast, in the fusion splicer 10 according to the embodiment of the present invention, the cover member housing grooves 27a and 27b in which the cover members 61 and 62 operated to be opened can be housed are formed on the apparatus body top surface 21.

Accordingly, even if the cover members 61 and 62 are made small in order to prevent the protrusion to the outside of the apparatus, it is possible to sufficiently secure the opening area when opening the windshield cover.

In addition, in the fusion splicer according to the embodiment of the present invention, it is possible to easily prevent the protrusion to the outside of the apparatus, by reducing the size of the cover members 61 and 62 in a range in which the fiber clamp member 25, the light sources for imaging 72a and 72b, the fiber holder 40, and the coating clamp 50 can be housed.

In addition, when the windshield cover is closed, the windshield cover 60 that houses (in the example shown in the drawings, also houses the light sources for imaging 72a and 72b) the pair of electrode rods 24, the discharge portion 24a, and the groove formed substrates 23 and the fiber clamp members 25 provided on the left and right sides of the discharge portion 24a, and the fiber holders 40 or the coating clamps 50 disposed on the movable stages 22 on the left and right sides of the discharge portion 24a is advantageous in preventing the wind from entering the inside of the windshield cover from the outside compared with a windshield cover having a configuration in which a fiber holder or a coating clamp is not housed.

In addition, the windshield cover 60 can reliably prevent the wind from affecting fusion splice between the optical fibers 91 and 92 in the discharge portion 24a.

In addition, many conventional fusion splicers commercially available are optical fiber fusion splicers designed such that the liquid crystal monitor is invisible in a state where the windshield cover is open.

The fusion splicer disclosed in Japanese Patent No. 4382694 is set such that the liquid crystal monitor is rotated to an easily viewable position, but the operator cannot see the liquid crystal monitor when the windshield cover is open.

In contrast, the cover members 61 and 62 of the windshield cover 60 of the fusion splicer 10 according to the embodiment of the present invention are reduced in size so as not to protrude outward from the apparatus body 20 when opening the windshield cover 60.

For this reason, since the cover members 61 and 62 of the windshield cover 60 are not disposed at positions blocking the monitor device 14 provided on the outer side of the apparatus body 20 regardless of whether the windshield cover 60 is in an open state or in a closed state, the cover members 61 and 62 of the windshield cover 60 do not affect the visibility of the monitor device 14.

In addition, as shown in FIGS. 3 and 4, the windshield cover 60 is disposed in a recessed portion 13 between the switch board 11 and the reinforcing sleeve heater 12, and the windshield cover 60 does not protrude from the recessed portion 13.

For this reason, when the fusion splicer 10 is dropped upside down, it is possible to reduce the probability that the windshield cover 60 with low strength will be broken.

Figure 13:
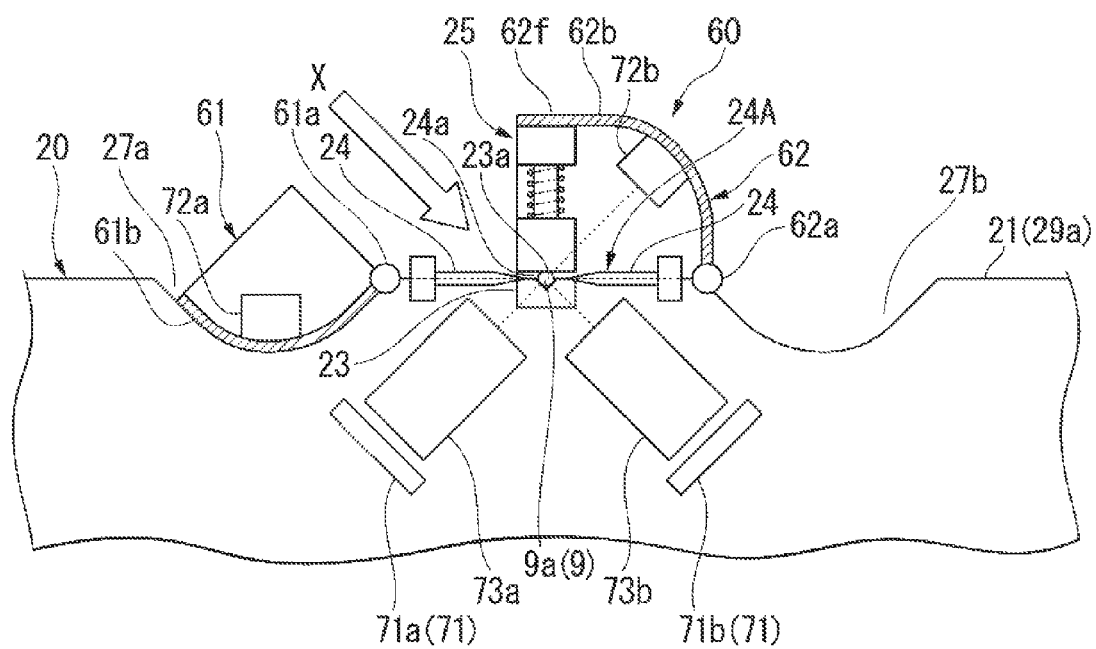
FIG. 13 is a diagram showing a windshield cover of the optical fiber fusion splicer shown in FIG. 1, and is a right side view showing a state where only one of a pair of cover members is manually opened.

FIG. 13 shows a state when only the first cover member 61 to which the fiber clamp member 25 is not attached is manually opened from a state in which a pair of cover members 61 and 62, which form the windshield cover 60, are closed with respect to each other.

The operation of manually opening one of the cover members 61 and 62 closed with respect to each other is performed in a state where all power sources of the fusion splicer are stopped by operating a pause button (not shown), which is provided in the apparatus body 20, before the completion of inspection operation before optical fiber connection after the windshield cover closing operation, for example.

In addition, the fusion splicer 10 performs the inspection operation before optical fiber connection and subsequent operations by operating an operation resume button (not shown) after stopping all power sources of the fusion splicer by operating the pause button.

Here, the inspection operation before optical fiber connection based on the operation of the operation resume button is performed when both of the two windshield cover detectors 33 (refer to FIG. 5) detect that a pair of cover members 61 and 62 are disposed at the closed position.

When one or both of the two windshield cover detectors 33 do not detect that a pair of cover members 61 and 62 are disposed at the closed position, the inspection operation before optical fiber connection is not performed even if the operation resume button is operated.

The pair of cover members 61 and 62 can be driven to be rotated and opened and closed in synchronization with each other by the power generated by the power sources for windshield opening and closing 63a and 63b (refer to FIGS. 3 and 4).

The fusion splicer 10 has power transmission systems for transmitting power for rotation and opening and closing from the power sources for windshield opening and closing 63a and 63b to the cover members 61 and 62.

Here, since two power transmission systems of the cover members 61 and 62 are independent of each other, the two power sources for windshield opening and closing 63a and 63b are also independent of each other.

Therefore, when an operation to rotate the first cover member 61 is manually performed in a state where the driving for rotating the cover members 61 and 62 is stopped, it is possible to maintain the second cover member 62 in a stopped state without the second cover member 62 being interlocked with the operation to rotate the first cover member 61.

As shown in FIG. 13, in the fusion splicer 10, the holding state of the optical fiber by the fiber clamp member 25 can be visually checked from the direction of arrow X by manually opening only the first cover member 61 without the fiber clamp member 25 attachment, from the state where a pair of cover members 61 and 62 of the windshield cover 60 are closed with respect to each other.

In addition, in the fusion splicer 10, space (opening) for manually adjusting the position of the fiber clamp member 25 or the distal end of the optical fiber 9 by allowing the worker to insert the fingers between a pair of cover members 61 and 62 can be secured by manually opening only the first cover member 61 from the state where a pair of cover members 61 and 62 of the windshield cover 60 are closed with respect to each other.

In this manner, in the fusion splicer 10, the position of the fiber clamp member 25 or the distal end of the optical fiber 9 can easily be manually adjusted.

Incidentally, when fusion-splicing optical fibers using a fusion splicer having a windshield cover that can be opened and closed and that covers a pair of electrode rods, positioning grooves and fiber clamp members, and fiber holders or coating clamps placed on holder mounting portions, it is necessary to visually check whether or not the optical fiber is correctly held by the positioning grooves and the fiber clamp members in a state where the windshield cover is closed.

In particular, when there is strong bending (warpage) in the coat of the optical fiber, the optical fiber may jump out from the positioning groove, and the optical fiber may not be held correctly by the fiber clamp member.

In this case, it is possible to manually press down the fiber clamp member with fingers in a state where the optical fiber is pressed against the positioning groove.

However, for example, when the fiber clamp member attached to the windshield cover is interlocked with opening and closing of the windshield cover as in the fusion splicer disclosed in Japanese Patent No. 4382694, Japanese Patent No. 3761192, and Japanese Unexamined Patent Application, First Publication No. 2003-167151, this operation cannot be performed.

For example, as can be seen with reference to FIGS. 1 to 4 in Japanese Patent No. 3761192, a configuration is disclosed in which the windshield cover and the clamp arm are mechanically connected so as to be interlocked with each other.

In the technique disclosed in Japanese Patent No. 3761192, if a mechanism to disconnect the connection of the clamp arm from the outside of the windshield cover is added and the windshield cover is opened after the disconnection, the state where the optical fiber is held by the fiber clamp member can be checked.

In addition, if there is a problem in the holding state of the optical fiber, it can be returned to the original state as long as the holding state of the optical fiber is fixed by manually operating the fiber clamp member and the clamp arm is again interlocked after closing the windshield cover.

However, when adopting the above-described calibration, there are the following problems.

A mechanism capable of performing connection and disconnection of the windshield cover and the clamp arm from the outside of the windshield cover is required.

When fixing the holding state by closing the clamp arm in a state where the clamp arm is detached and re-connecting the clamp arm by closing the windshield cover later, the holding state of the optical fiber by the fiber clamp member may become worse again due to vibration of re-connection.

In contrast, in the fusion splicer 10 according to the embodiment of the present invention, it is possible to open and close other cover members manually without opening and closing a cover member, to which the fiber clamp member 25 is attached, when stopping the driving of the cover member.

In addition, in the fusion splicer of the present invention, manual opening and closing of other cover members can be realized by the configuration using only the power transmission system without providing a special mechanism, such as a mechanism capable of performing connection and disconnection of the windshield cover and the clamp arm from the outside of the windshield cover, in the windshield cover.

Therefore, a plurality of components are not necessary in the windshield cover, or there is no problem in reducing the size of the windshield cover.

In addition, since the connection and disconnection of the clamp arm with respect to the windshield cover are not necessary, the fusion splicer 10 can maintain the holding state of the optical fiber even after fixing the holding state of the optical fiber.

In addition, as the fusion splicer according to the embodiment of the present invention, it is possible to adopt not only the configuration in which the fiber clamp member is directly connected to the inside of the rotating cover member (for example, FIGS. 5 and 6 and the like) but also the configuration in which the fiber clamp member is attached to the rotating cover member and is mechanically connected to the clamp arm provided inside the rotating cover member so that opening and closing of the rotating cover member are interlocked with the clamp arm.

FIGS. 14 to 18B are diagrams illustrating a windshield cover 60A of another aspect.

In addition, FIGS. 14 to 18B will be described on the assumption that the left side is the front, right side is the back, upper side is the top, and lower side is the bottom.

As shown in FIGS. 14 to 17, the windshield cover 60A has a pair of cover members 61 and 62 (rotating cover members) and two cover members 68 (hereinafter, referred to as fixed cover members), which are fixed to the apparatus body 20 and house rear ends of a pair of electrode rods 24, and is configured to include a total of four cover members.

A pair of fixed cover members 68 are provided on both sides of the discharge portion 24a in the front and rear direction with the discharge portion 24a interposed therebetween.

In FIGS. 14 to 17, the fixed cover member 68 on the front side (left side in FIGS. 14 to 17) of the discharge portion 24a is also referred to as a first fixed cover member 681 hereinbelow, and the fixed cover member 68 on the back side (right side in FIGS. 14 to 17) of the discharge portion 24a is also referred to as a second fixed cover member 682 hereinbelow.

As shown in FIGS. 14 to 18B, each of the fixed cover members 681 and 682 has an inside cover portion 68a, which is disposed on the apparatus body top surface 21, and a fixed cover body 68b, which is provided so as to protrude to the side of the inside cover portion 68a opposite a side on which the discharge portion 24a is provided.

Notch portions for fixed covers 61g and 62g formed in recessed shapes, which are recessed from the side of a main body bonding surface 62e, are formed in central portions of main wall portions 61b and 62b, which form the cover members 61 and 62, in the longitudinal direction.

In addition, the cover members 61 and 62 are denoted by reference numerals 61A and 62A in the drawings.

Figure 14:
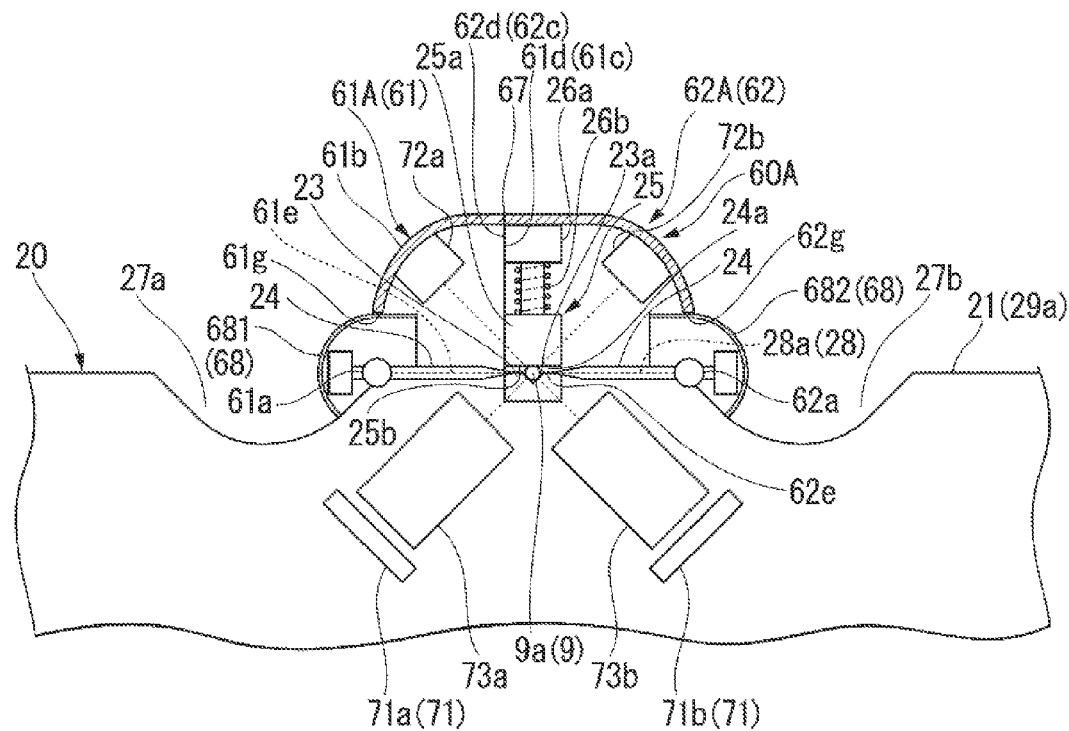
FIG. 14 is a cross-sectional side view (right side cross-sectional view) schematically illustrating an example of a windshield cover in which a fixed cover member is provided, and is a diagram showing a state where the windshield cover is closed.
Figure 15:
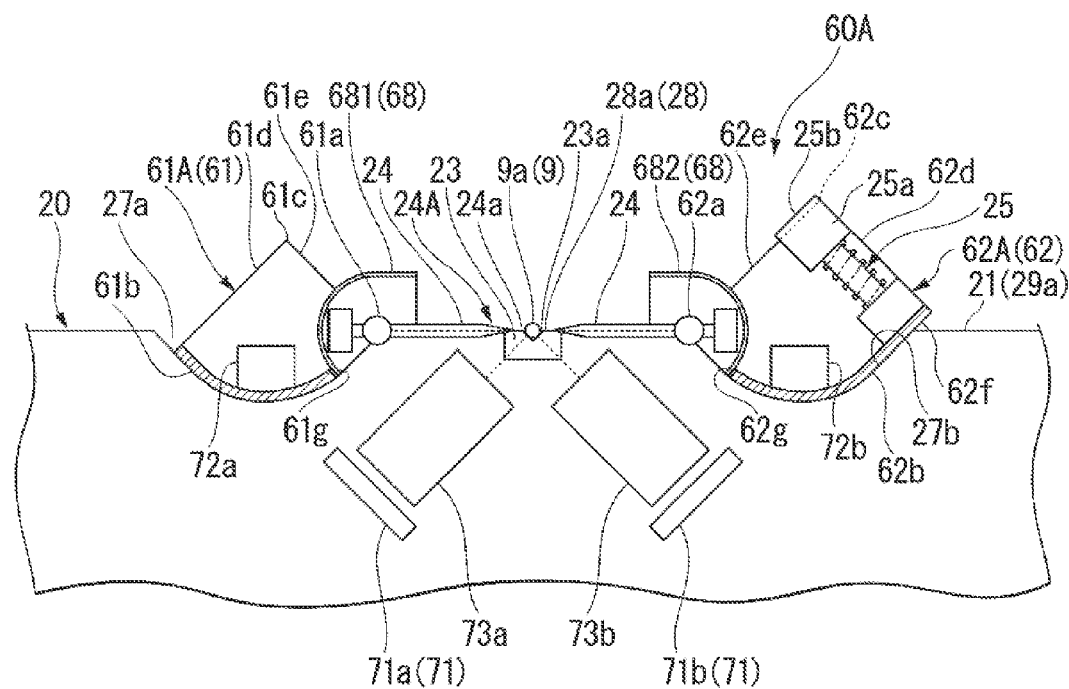
FIG. 15 is a cross-sectional side view (right side cross-sectional view) schematically illustrating an example of a windshield cover in which a fixed cover member is provided, and is a diagram showing a state where the windshield cover is open.

As shown in FIGS. 14 and 15, the fixed cover members 681 and 682 are provided so as to be fixed to the boundary between the central mount top surface 28a of the upper end of the apparatus body 20 and the inner surfaces of the cover member housing grooves 27a and 27b provided on both sides of the central mount top surface 28a in the front and rear direction.

Figure 16:
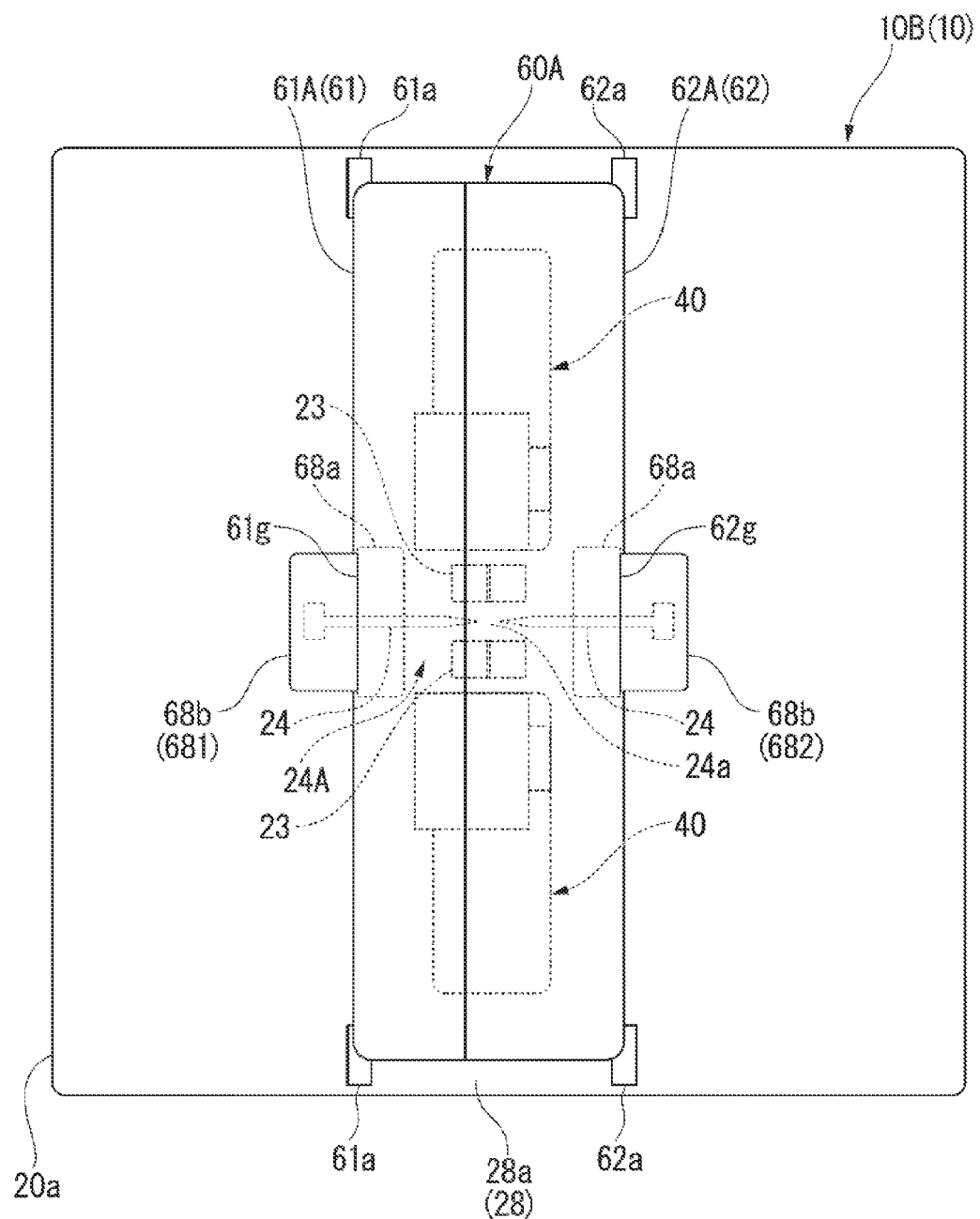
FIG. 16 is a plan view schematically showing the windshield cover shown in FIG. 14.
Figure 17:
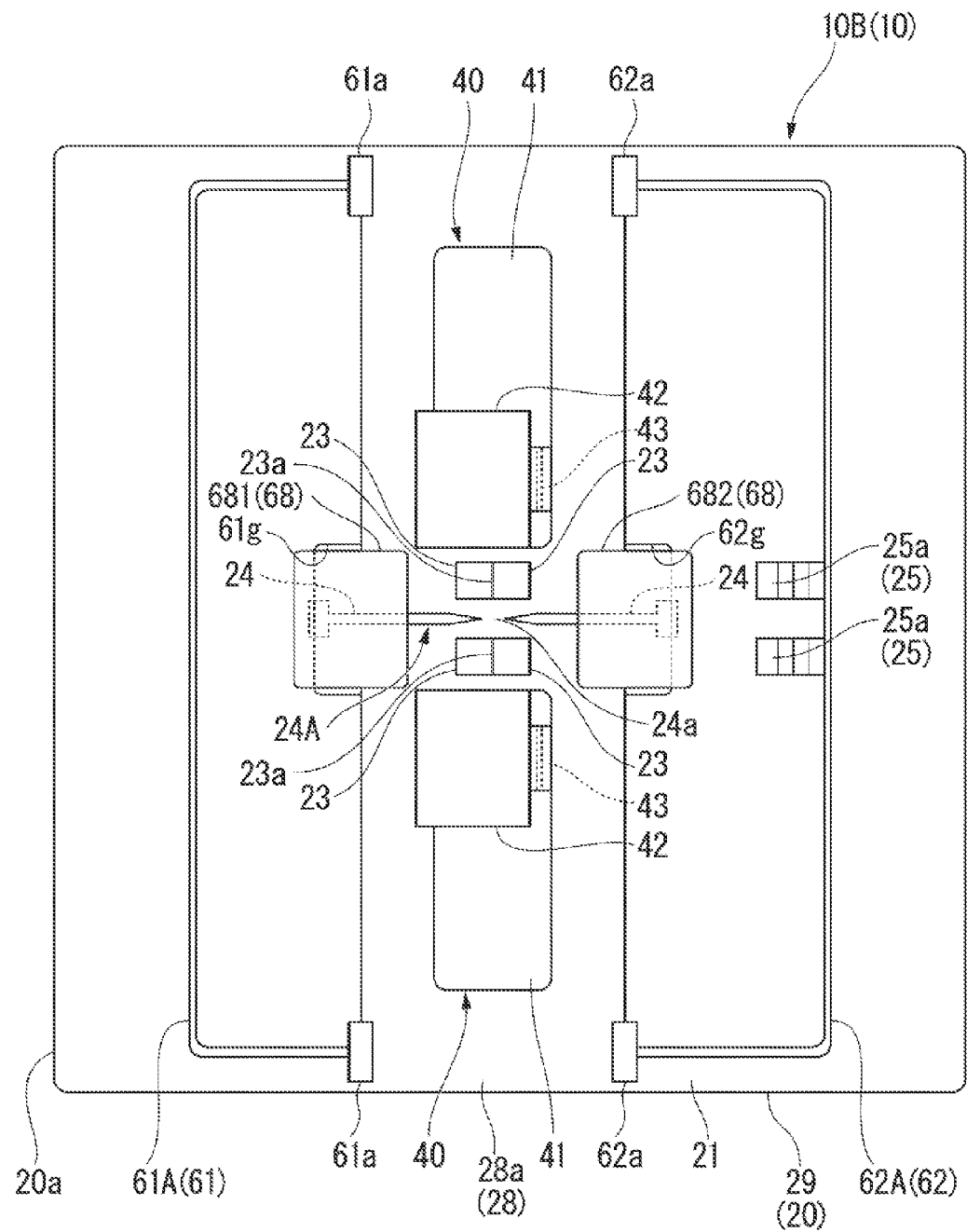
FIG. 17 is a plan view schematically showing the windshield cover shown in FIG. 15.

As shown in FIGS. 14 and 16, the inside cover portion 68a is located inside the windshield cover 60A in a state where the cover members 61A and 62A, which form the windshield cover 60A, are closed with respect to each other.

Figure 18A:
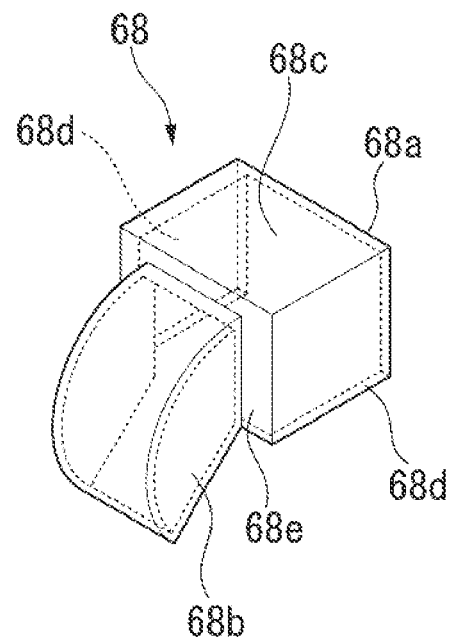
FIG. 18A is a diagram showing the fixed cover member of the windshield cover shown in FIGS. 14 and 15, and is a perspective view seen from the main body side of the fixed cover.
Figure 18B:
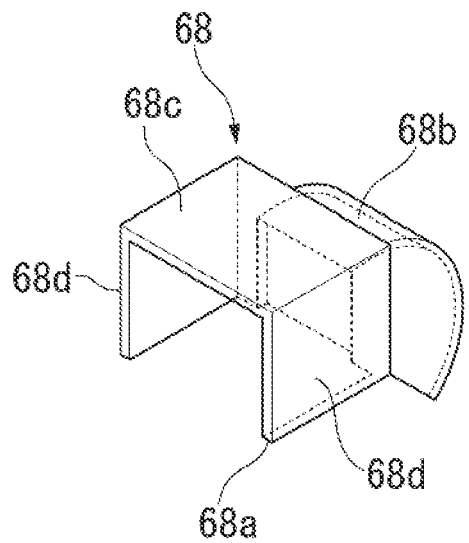
FIG. 18B is a diagram showing the fixed cover member of the windshield cover shown in FIGS. 14 and 15, and is a perspective view seen from the inside cover portion side.

As shown in FIGS. 18A and 18B, the inside cover portion 68a is formed such that the cross section when a pair of leg portions 68d extend from both sides of a top plate 68c to the one side has approximately a U shape.

In addition, the inside cover portion 68a is provided on the apparatus body 20 such that the opposite side to the top plate 68c is brought into contact with the top surface 28a of the central mount 28 of the apparatus body 20.

The fixed cover member 68 is fixed to the central mount 28 such that the axial direction of an inside hole surrounded by the inside cover portion 68a and the central mount top surface 28a matches the front and rear direction of the splicer.

The fixed cover body 68b that forms the first fixed cover member 681 has an approximately arch-shaped cross section (including a U shape, a V shape, and the like in addition to an arc shape) along the movement (rotation) trajectory of the notch portion for fixed covers 61g of the first cover member 61.

Specifically, the fixed cover body 68b is formed so as to extend corresponding to the shape of the movement trajectory of the notch portion for fixed covers 61g according to the rotation around the rotating shaft 61a of the cover member 61A.

The fixed cover body 68b that forms the second fixed cover member 682 has an approximately arch-shaped cross section (including a U shape, a V shape, and the like in addition to an arc shape) along the movement (rotation) trajectory of the notch portion for fixed covers 62g of the second cover member 62.

In addition, the fixed cover body 68b is formed so as to extend corresponding to the shape of the movement trajectory of the notch portion for fixed covers 62g according to the rotation around the rotating shaft 62a of the cover member 62A.

The fixed cover body 68b that forms each fixed cover member 68 extends from the inner periphery of an inner peripheral rib portion 68e provided so as to protrude along the end of the inside cover portion 68a opposite the side on which the discharge portion 24a is provided.

In addition, the end surface of the fixed cover body 68b opposite a side on which the inside cover portion 68a is provided is in contact with the upper end of the inner surface of each of the cover member housing grooves 27a and 27b.

The cover members 61A and 62A are disposed such that the inner peripheral surfaces of the notch portions for fixed covers 61g and 62g can always be disposed adjacent to the outside surfaces of the fixed cover bodies 68b of the fixed cover members 681 and 682 or can always move in a state of being in contact with the outside surfaces of the fixed cover bodies 68b of the fixed cover members 681 and 682 even if the cover members 61A and 62A are opened and closed due to being driven to rotate.

For this reason, it is possible to efficiently suppress the wind or dust entering the inside of the windshield cover 60 in a state where the windshield cover is closed.

In addition, in a closed state, a portion of the windshield cover 60A located near the notch portions for fixed covers 61g and 62g is disposed adjacent to the inner peripheral rib portion 68e of the inside cover portion 68a or so as to be in surface contact with the inner peripheral rib portion 68e of the inside cover portion 68a. Therefore, it is possible to more efficiently suppress the wind or dust entering the inside of the windshield cover 60 from the outside.

In the fusion splicer 10 according to the present invention, the cover members 61 and 62 can be quickly and securely opened and closed with appropriate force by automatically performing an operation of opening and closing the cover members 61 and 62 that form the windshield cover 60.

As a result, it is possible to shorten the working time of fusion splice of optical fibers and improve the workability.

In addition, in the fusion splicer 10, the protrusion of the cover members 61 and 62 from the apparatus body 20 to the outside (outside in plan view) is eliminated by reducing the size of the cover members 61 and 62. Therefore, even if the work is automated, there is no problem that the optical fiber will be damaged due to being hooked to the cover member.

Therefore, the cover members 61 and 62 can be opened and closed quickly and securely.

In addition, in the fusion splicer 10, it is possible to shorten the working time and improve the workability, for example, compared with a configuration in which the windshield cover is driven with an open and close button.

While the present invention has been described on the basis of the best mode, the present invention is not limited to the embodiments described above, and various modifications may be made without deviating from the scope of the present invention.

The windshield cover is not limited to having a configuration in which both of a pair of cover members are rotating cover members pivotally attached to the upper end of the apparatus body through the rotating shaft.

Figure 19:
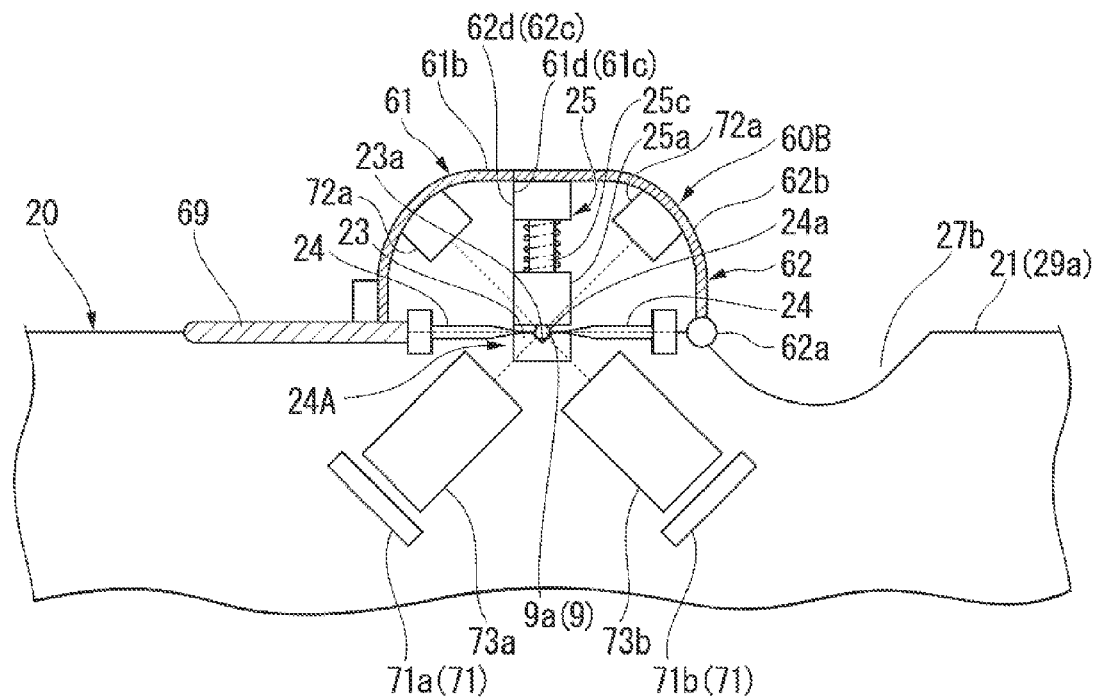
FIG. 19 is a cross-sectional side view (right side cross-sectional view) showing an example of a fusion splicer having a windshield cover configured to include a rotating cover member and a slide cover member, and shows a state where the rotating cover member and the slide cover member are closed with respect to each other.
Figure 20:
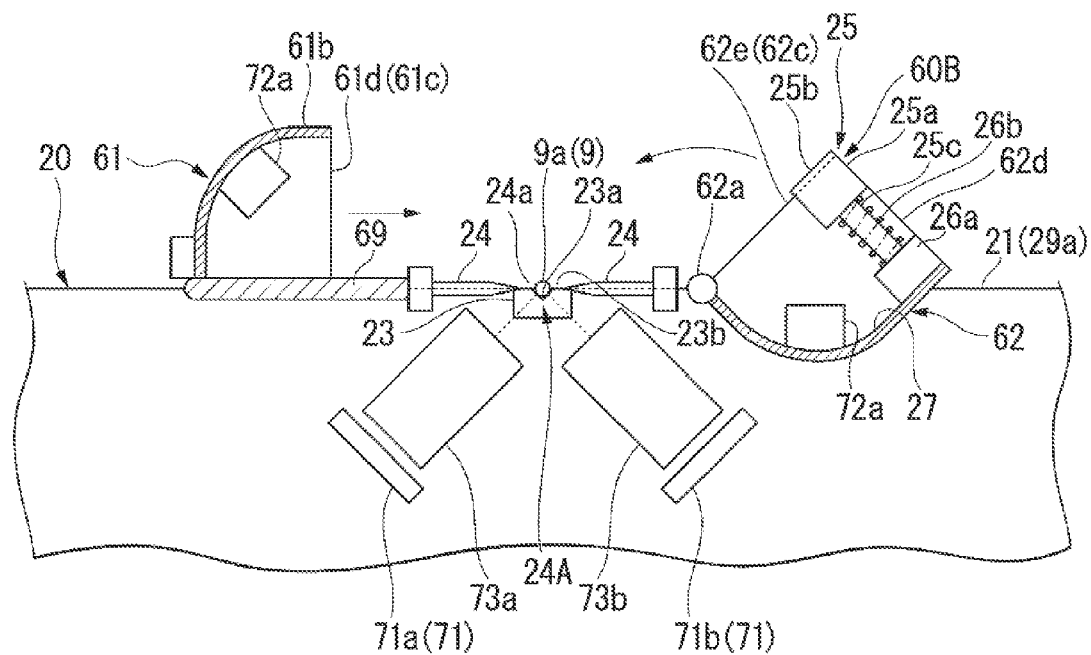
FIG. 20 is a cross-sectional side view (right side cross-sectional view) showing an example of a fusion splicer having a windshield cover configured to include a rotating cover member and a slide cover member, and shows a state where the slide cover member is opened with respect to the rotating cover member.

As a fusion splicer, for example, as shown in FIGS. 19 and 20, the fusion splicer 10 according to the embodiment described above can be changed to have a configuration in which the first cover member 61 in which the fiber clamp member 25 is not provided, between a pair of cover members 61 and 62 (rotating cover members), is opened and closed by sliding it in the front and rear direction of the splicer with respect to the apparatus body 20 using a slide mechanism 69 provided on the apparatus body 20.

In addition, for the second cover member 62, there is no change from the fusion splicer 10 according to the embodiment described above.

The cover member that slides along the top surface of the apparatus body 20 by the slide mechanism 69 is also referred to as a slide cover member hereinbelow.

In a configuration shown in FIGS. 19 and 20, a mechanism (slide mechanism 69) that opens and closes the first cover member 61, which forms the windshield cover 60B, by moving it and a mechanism that opens and closes the second cover member 62 are independent of each other.

For this reason, in the configuration shown in FIGS. 19 and 20, an operation of opening and closing the first cover member 61 can be performed in a state where the second cover member 62 is disposed at the closed position (position of the second cover member 62 in FIGS. 19 and 20).

Figure 21:
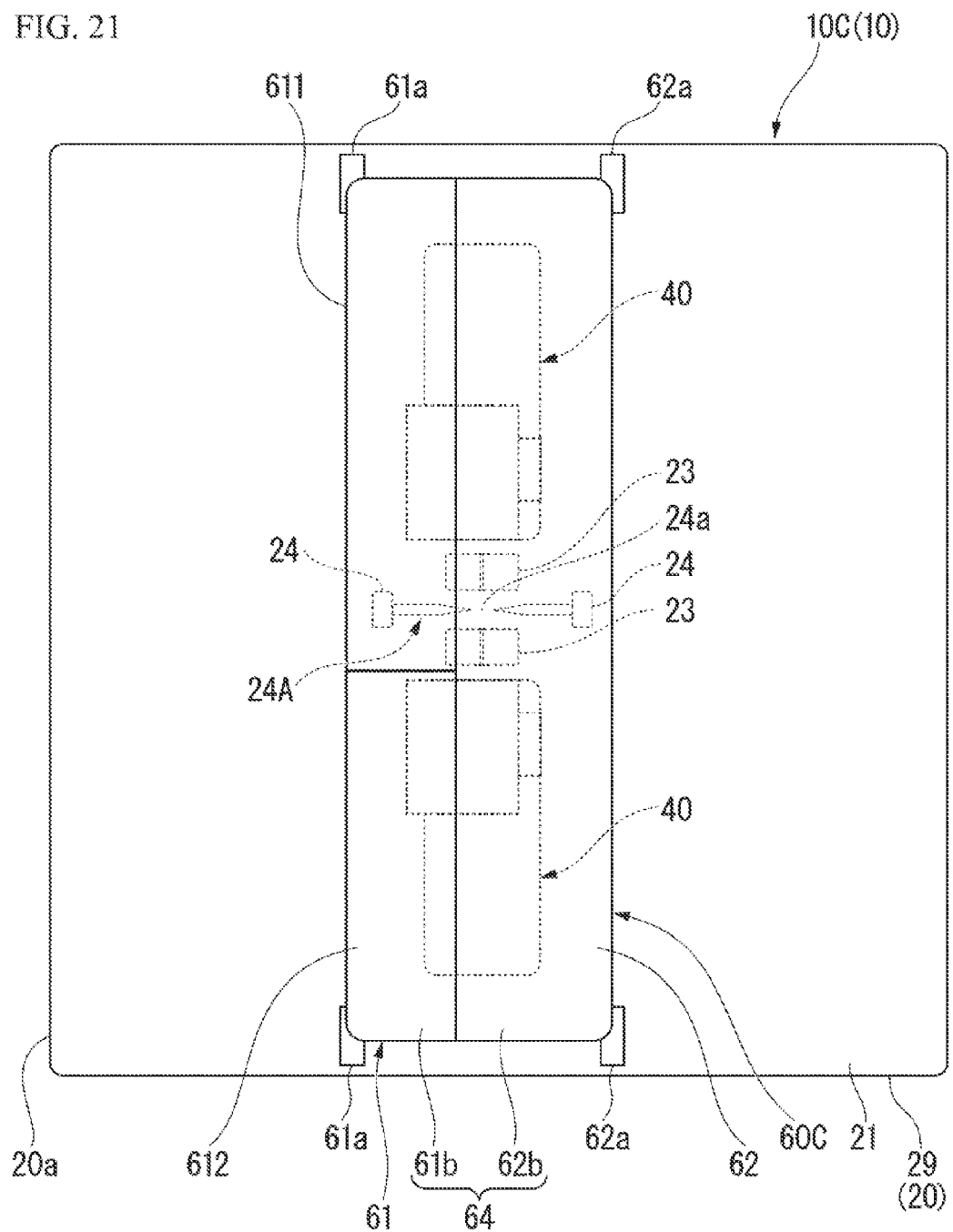
FIG. 21 is a plan view schematically showing an example of a fusion splicer having a windshield cover configured to be divided into three cover members.

In addition, as a windshield cover, a three-division configuration may also be adopted as shown in FIG. 21.

A windshield cover 60C illustrated in FIG. 21 is configured to include two divided cover members 611 and 612, which are obtained by dividing the first cover member 61 of the windshield cover 60 of the fusion splicer 10 shown in FIGS. 1 to 13 into two parts in the longitudinal direction, and a second cover member 62 (rotating cover member).

The two divided cover members 611 and 612 are rotating cover members that are pivotally attached to the apparatus body 20 through the same axis of rotation as in the first cover member 61 of the windshield cover 60 of the fusion splicer 10 shown in FIGS. 1 to 13.

In addition, the two divided cover members 611 and 612 are opened and closed from being rotated by the power transmission system provided corresponding to each of the divided cover members 611 and 612.

Of the two divided cover members 611 and 612, the divided cover member of reference numeral 611 can cover either a pair of fiber clamp members 25 provided in the second cover member 62 or the fiber holder 40 (or a coating clamp when a coating clamp is provided), which is disposed on each of the movable stages 22 provided on the left and right sides of the heat fusion portion 24A, when disposed at the closed position.

This divided cover member 611 is also referred to as a main divided cover member hereinbelow.

In a fusion splicer 10C illustrated in FIG. 21, a pair of fiber clamp members 25 can be exposed to the inner side of the second cover member 62 and the positioning groove 23a, which is provided on each of the left and right sides of the heat fusion portion 24A, by opening only the main divided cover member 611 with fingers in a state where the windshield cover 60C is closed.

Therefore, it is possible to insert the fingers between the main divided cover member 611 and the second cover member 62.

In addition, in the fusion splicer 10C, when opening the main divided cover member 611 of the two divided cover members 611 and 612 with respect to the second cover member 62, it is not necessary to open the remaining divided cover member 612.

For this reason, it is possible to reduce the risk of dust entering the inside of the windshield cover.

In addition, as the fusion splicer according to the present invention, a configuration to open and close a slide cover member by sliding it in the front and rear direction with respect to the apparatus body top surface 21 can also be adopted by providing the slide mechanism 69 capable of moving one or both of the two divided cover members 611 and 612 of the windshield cover 60C illustrated in FIG. 21 from the closed position to the front side (left side in FIG. 21) of the splicer.

As the windshield cover, it is possible to adopt a configuration formed by a plurality of cover members (movable cover member) that are opened and closed by respective power sources, and the sizes and/or shapes of a plurality of cover members may be the same or may be different.

The windshield cover may be divided into four or more cover members.

Here, in this windshield cover, a configuration is adopted in which one or more cover members of the plurality of cover members that form the windshield cover are rotating cover members, which are opened and closed by being rotated around the rotating shaft disposed along the apparatus body top surface, and the fiber clamp member 25 is provided in this rotating cover member so as to correspond to the positioning groove of the fusion splicer.

Although the rotating cover member with a fiber clamp member is, for example, a configuration in which a pair of fiber clamp members 25 are attached (mechanically connected) corresponding to positioning grooves provided on the left and right sides of the fusion splicer, it is also possible to adopt a configuration in which two fiber clamp members, each of which corresponds to only one of the two positioning grooves provided on the left and right sides of the heat fusion portion 24A (which pushes the optical fiber), are provided in two rotating cover members so as to correspond to each positioning groove.

Cover members other than the rotating cover member with a fiber clamp member do not necessarily need to be rotating cover members. For example, cover members other than the rotating cover member with a fiber clamp member may be slide cover members that are slide by a slide mechanism provided on the apparatus body.

In addition, a windshield cover having a plurality of movable cover members may include one or more fixed cover members.

In this case, as the windshield cover, for example, a configuration is adopted in which a movable cover member, such as a rotating cover member or a slide cover member, is opened and closed by sliding on the fixed cover member surface.

A windshield cover divided into a plurality of cover members can adopt a configuration including one or more rotating cover members, and can also adopt a configuration further including one or more fixed cover members.

As the windshield cover of the fusion splicer according to the embodiment of the present invention, a configuration formed by only one cover member can also be adopted without being limited to the configuration formed by a plurality of cover members.

However, a configuration formed by a plurality of cover members including a plurality of movable cover members is more advantageous in terms of suppression of the vibration caused by opening and closing of the windshield cover (in particular, at the time of closing operation).

Figure 23:
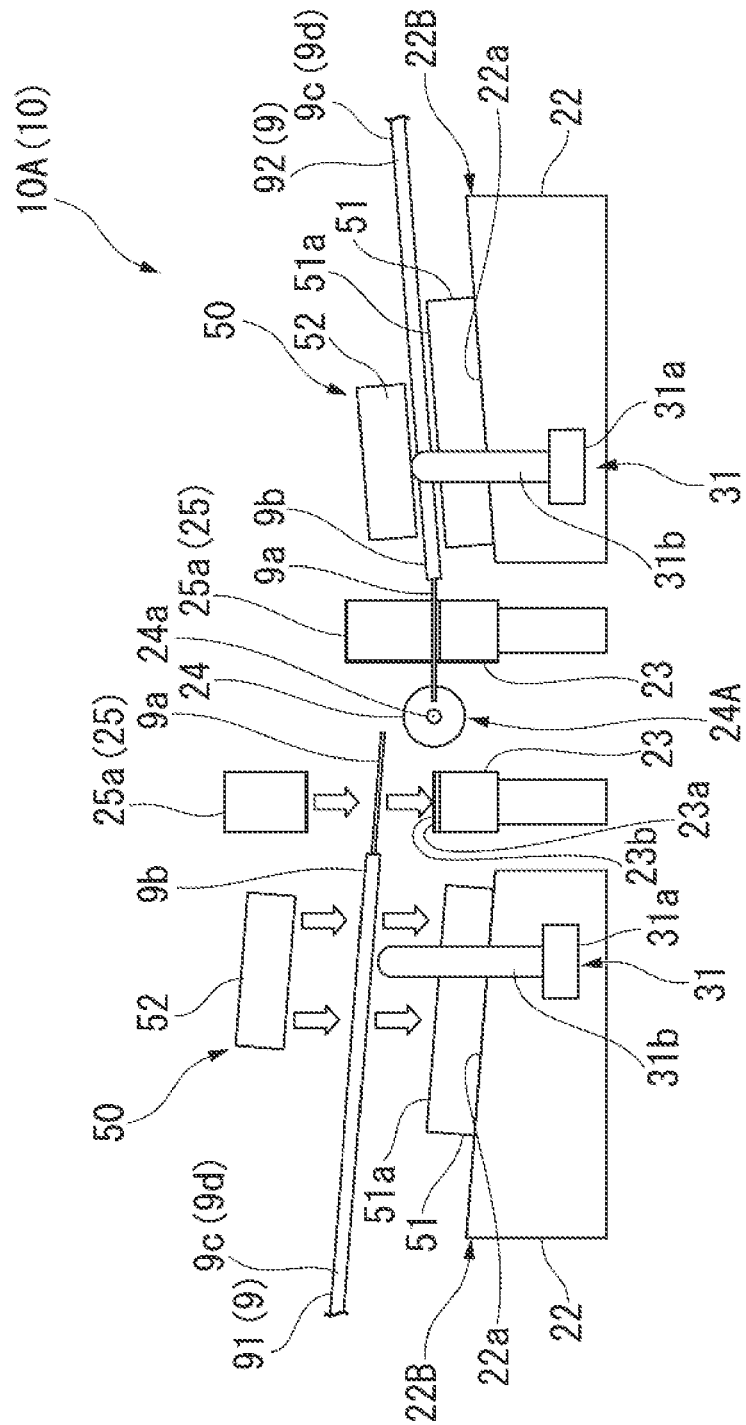
FIG. 23 is another aspect of the optical fiber fusion splicer shown in FIG. 1, and is a front view schematically illustrating an aspect in which the detector body of a fiber mounting detector is embedded in a movable stage.
Figure 24:
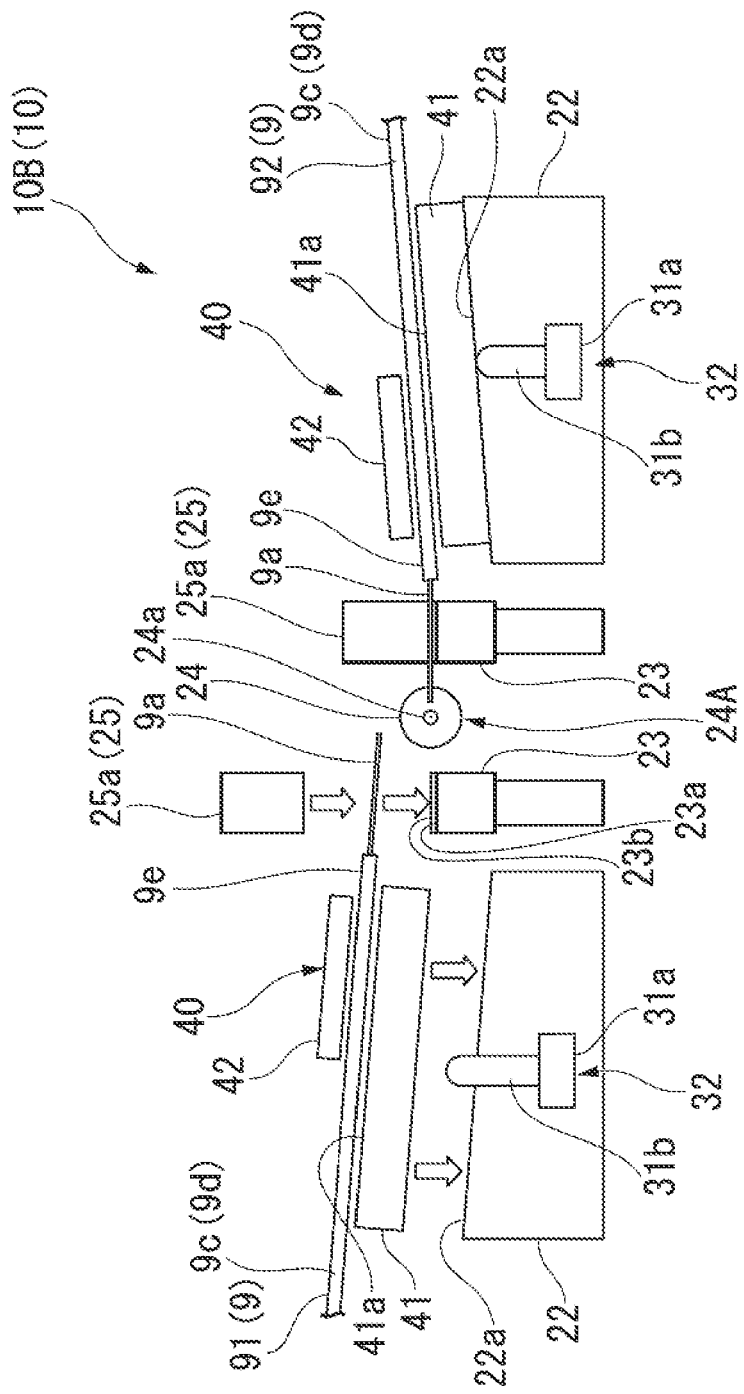
FIG. 24 is another aspect of the optical fiber fusion splicer shown in FIG. 2, and is a front view schematically illustrating an aspect in which the detector body of a fiber mounting detector is embedded in a movable stage.

As shown in FIGS. 23 and 24, the detector body 31a of each of the detectors 31 and 32 attached to the movable stage 22 may be embedded in the movable stage 22.

In this case, the detector body 31a can be protected against being in contact with a member around the movable stage 22 due to the movement of the movable stage 22.

Therefore, it is possible to stably maintain the detection accuracy and increase the lifespan.

The configuration in which the detector body 31a of the fiber mounting detector (fiber mounting work detector) is embedded in the movable stage 22 can be widely applied to the fusion splicer according to the embodiment of the present invention. For example, the configuration can also be applied to the fusion splicer illustrated in FIG. 10.

The fiber mounting detector of the fusion splicer according to the embodiment of the present invention is not limited to the clamp closing detector and the holder mounting detector.

Figure 26:
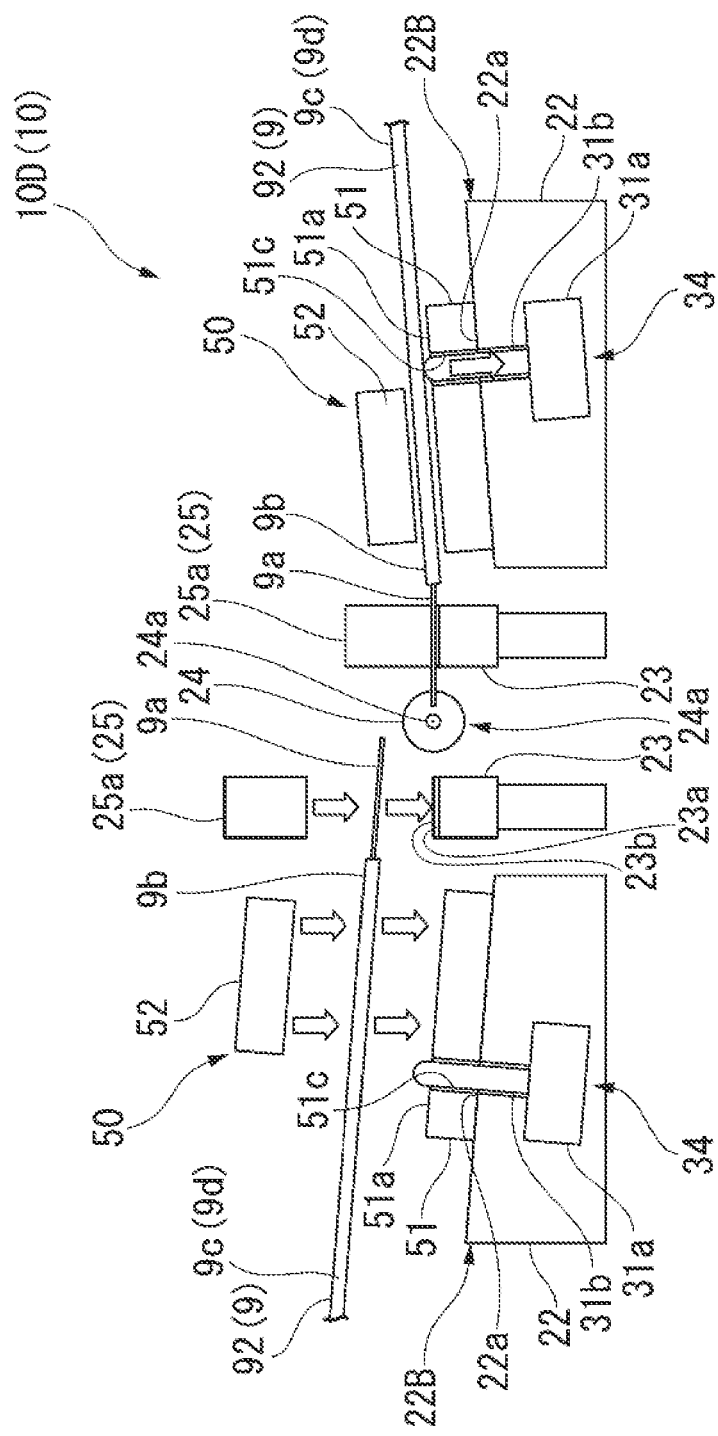
FIG. 26 is a diagram showing an example of the fusion splicer according to the embodiment of the present invention, and is a front view schematically showing a fusion splicer having a configuration in which a fiber detector for clamps, which detects the optical fiber placed on the lower clamp member of the coating clamp, is provided in each of movable stages disposed on the left and right sides of a heat fusion portion.

As the fiber mounting detector, for example, as shown in FIG. 26, it is also possible to adopt a fiber detector for clamps 34 that detects that the optical fiber 9 has been placed on the lower clamp member 51 of the coating clamp 50.

Figure 27:
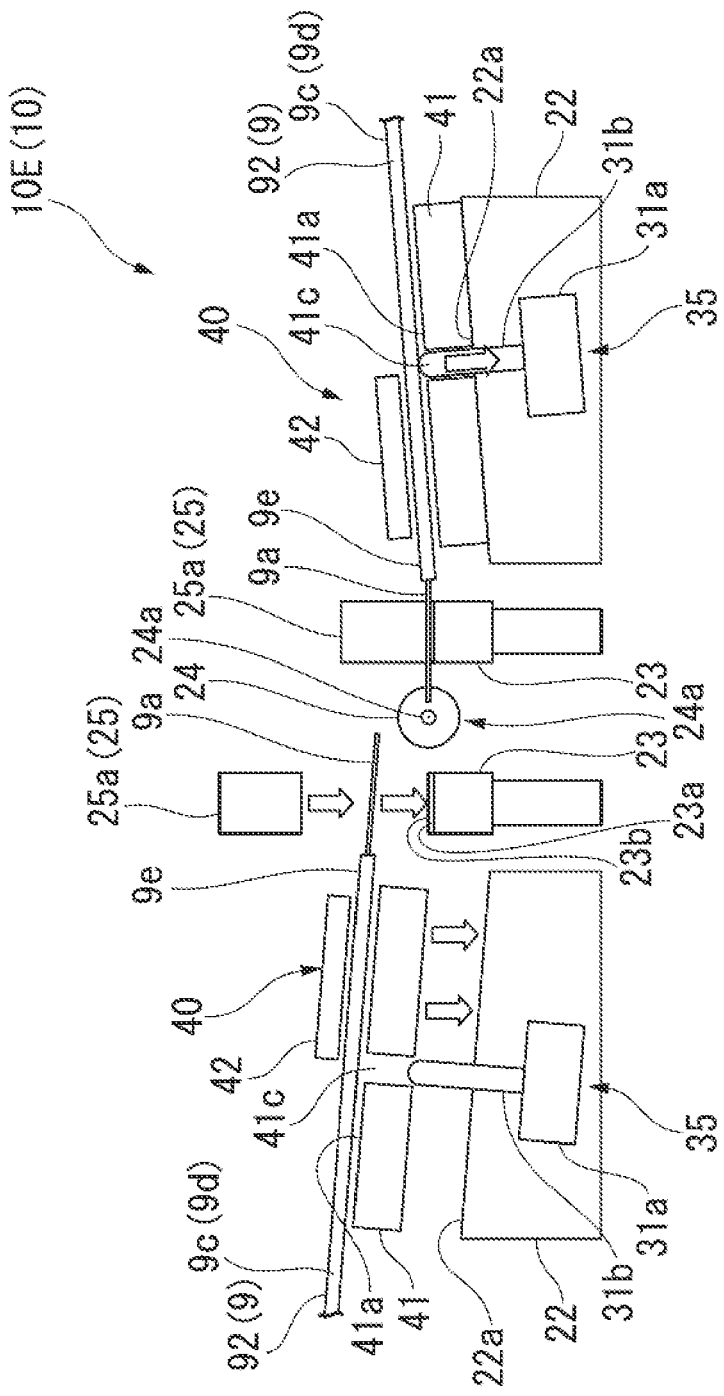
FIG. 27 is a diagram showing an example of the fusion splicer according to the embodiment of the present invention, and is a front view schematically showing a fusion splicer having a configuration in which a fiber detector for holders, which detects the optical fiber held and fixed to the fiber holder, is provided in each of movable stages on the left and right sides of a heat fusion portion.

In addition, as the fiber mounting detector, for example, as shown in FIG. 27, it is also possible to adopt a detector (hereinafter, also referred to as a fiber detector for holders 35) that detects that the optical fiber 9 held and fixed to the fiber holder 40 has been disposed at a predetermined position on the movable stage 22 (holder mounting portion).

In the fiber detector for clamps 34 shown in FIG. 26, the sensor pin 31b of the detector 31 in FIG. 23 protrudes above the top surface 51a of the lower clamp member 51 through a sensor pin hole 51c that passes through the plate-like lower clamp member 51 in the thickness direction.

FIG. 26 illustrates a fusion splicer 10D having a configuration in which the fiber detector for clamps 34 is provided instead of the clamp closing detector 31 of the fusion splicer 10A shown in FIG. 1.

In FIG. 26, the sensor pin 31b protrudes to a region where the optical fiber 9 is disposed (hereinafter, also referred to as a fiber mounting region) on the lower clamp member top surface 51a, that is, a region on the lower clamp member top surface 51a where the optical fiber 9 is disposed for positioning by the positioning groove 23a of the groove formed substrate 23.

For example, the lower clamp member 51 of the coating clamp 50 has fiber positioning portions (not shown), such as a plurality of protruding pieces protruding above the top surface 51a and a groove formed on the top surface 51a, and the optical fiber 9 is disposed in the fiber mounting region of the top surface 51a by the fiber positioning portion.

In addition, in the fiber detector for clamps 34, when the optical fiber 9 is placed on the lower clamp member top surface 51a, each detection signal acquired from the detector body 31a transitions from a non-detected state to a detected state due to the sensor pin 31b pressed by the mounting of the optical fiber 9 being pushed into the detector body 31a.

Then, the fiber detector for clamps 34 detects that the optical fiber 9 has been placed in the fiber mounting region on the lower clamp member top surface 51a.

In a fiber detector for holders 35 shown in FIG. 27, the sensor pin 31b of the detector 32 in FIG. 24 protrudes above the top surface 22a of the movable stage 22.

FIG. 27 illustrates a fusion splicer 10E having a configuration in which the fiber detector for holders 35 is provided instead of the holder mounting detector 32 of the fusion splicer 10B shown in FIG. 2.

A portion of the sensor pin 31b protruding to the movable stage 22 can be inserted into a sensor pin hole 41c passing through the base plate 41 of the fiber holder 40 in the thickness (plate thickness) direction.

The fiber holder 40 holds and fixes the optical fiber 9 so as to be positioned in the fiber mounting region of a base plate top surface 41a by using a fiber housing groove 41d (refer to FIG. 9) formed on the top surface 41a of the base plate 41.

The fiber mounting region is open at the upper end of the sensor pin hole 41c.

In the fiber detector for holders 35, when the fiber holder 40 is placed on the movable stage 22, the sensor pin 31b inserted into the sensor pin hole 41c of the base plate 41 is pressed downward by the optical fiber 9, which is held and fixed by the fiber holder 40, and is pushed into the detector body 31a.

Then, each detection signal acquired from the detector body 31a transitions from a non-detected state to a detected state.

Accordingly, the fiber detector for holders 35 detects that the optical fiber 9 held and fixed by the fiber holder 40 has been disposed at a predetermined position on the movable stage 22.

In the fusion splicer 10D, the fiber detector for clamps 34 is provided as a fiber mounting detector in the movable stage 22 provided on each of the left and right sides of the heat fusion portion 24A.

In the fusion splicer 10E, the fiber detector for holders 35 is provided as a fiber mounting detector in the movable stage 22 provided on each of the left and right sides of the heat fusion portion 24A.

In both the fusion splicer 10D and the fusion splicer 10E described above, in the fiber set standby state, both detection signals that the driving control device acquires from a pair of detector bodies 31a transition from a non-detected state to a detected state.

This serves as a trigger signal to start the fiber fusion and inspection operation.

In addition, in the fusion splicer 10D having the fiber detector for clamps 34, each detection signal acquired from the detector body 31a of the fiber detector for clamps 34 transitions from a detected state to a non-detected state when the optical fiber 9 held and fixed by the coating clamp 50 is detached from the coating clamp 50.

In addition, in the fusion splicer 10E having a configuration in which the fiber detector for holders 35 is provided, each detection signal acquired from the detector body 31a of the fiber detector for clamps 35 transitions from a detected state to a non-detected state by removing the fiber holder 40 placed on the movable stage 22 from the movable stage 22.

In addition, although the configuration in which the detector body 31a of the fiber detector for clamps 34 is embedded in the movable stage 22 and the configuration in which the detector body 31a of the fiber detector for holders 35 is embedded in the movable stage 22 have been illustrated in the examples shown in the drawings, the position of the detector body 31a of each of the detectors 34 and 35 attached to the movable stage 22 is not limited to this, and can be appropriately changed.

Figure 28:
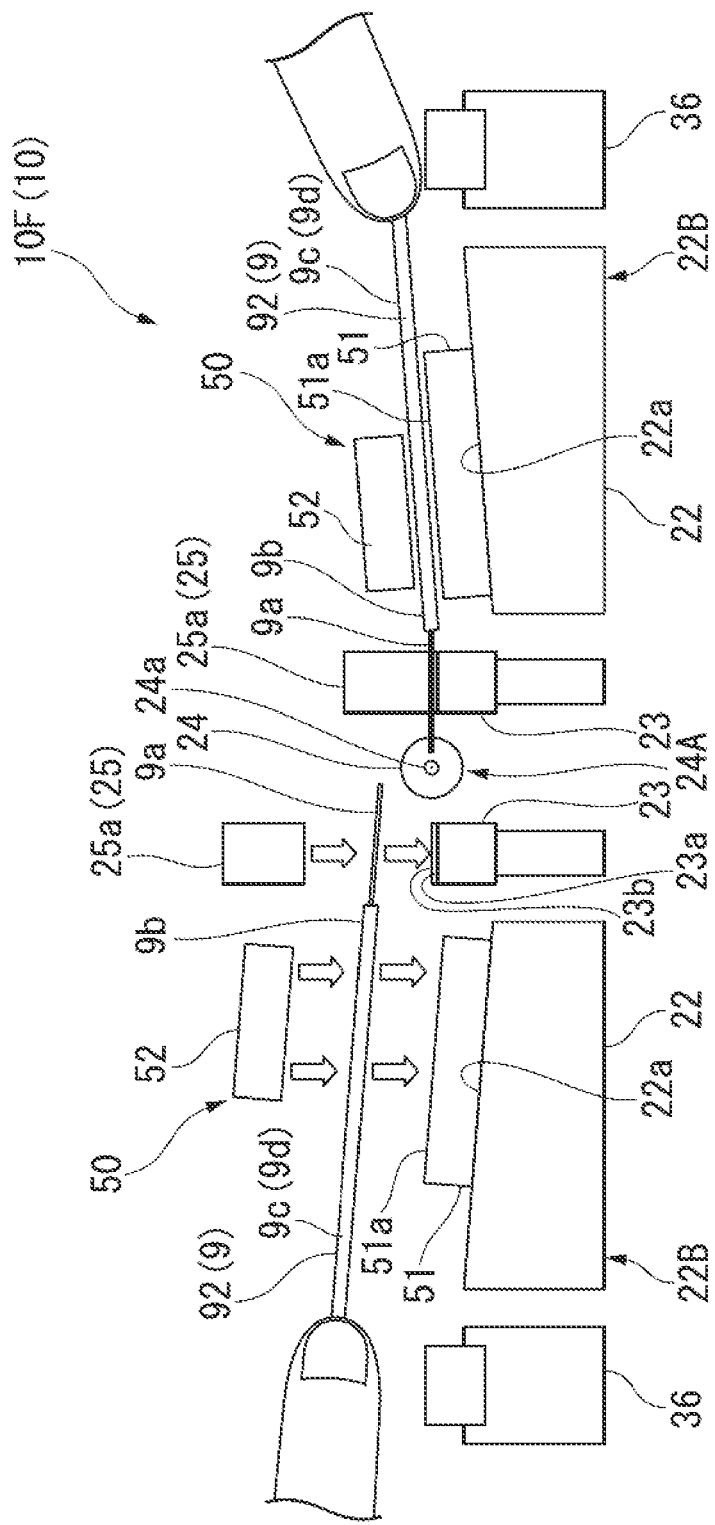
FIG. 28 is a diagram showing an example of the fusion splicer according to the embodiment of the present invention, and is a front view schematically showing a fusion splicer having a configuration in which coating clamps and finger detectors are provided on the left and right sides of a heat fusion portion.
Figure 29:
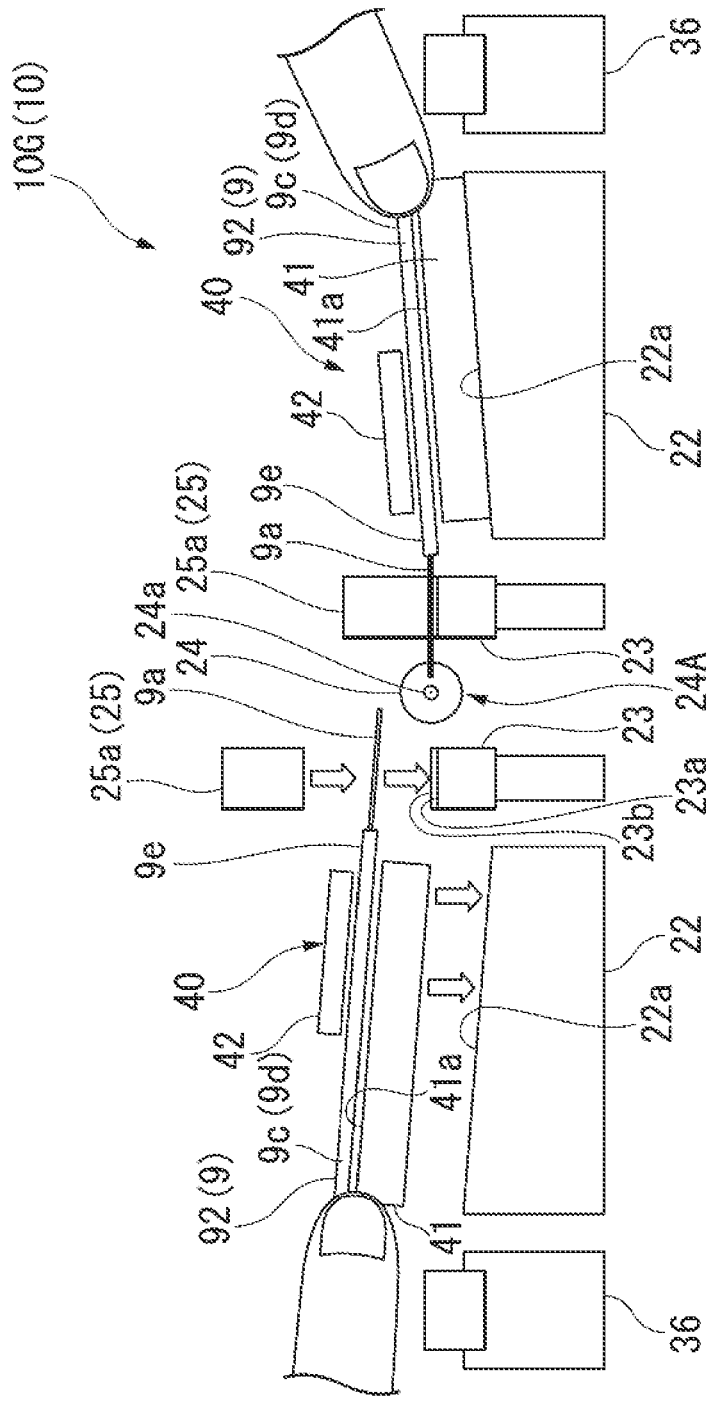
FIG. 29 is a diagram showing an example of the fusion splicer according to the embodiment of the present invention, and is a front view schematically showing a fusion splicer having a configuration in which movable stages, which function as holder mounting bases on which fiber holders are placed, and finger detectors are provided on the left and right sides of a heat fusion portion.

As shown in FIGS. 28 and 29, as the fusion splicer according to the embodiment of the present invention, it is also possible to adopt a configuration in which the fiber mounting detector is omitted and a finger detector 36, which detects that the fingers of the worker have approached, is provided on the left and right sides of the heat fusion portion 24A.

The finger detector 36 is attached to the opposite side (rear end side) of the movable stage 22 to the side, on which the heat fusion portion 24A is provided, on the apparatus body 20.

As the position of the finger detector 36 provided on the apparatus body 20, both the inside position covered by the closed windshield cover or the outside position not covered by the windshield cover is possible. However, in terms of miniaturization of the windshield cover, the outside position not covered by the windshield cover is preferable.

In a fusion splicer 10F shown in FIG. 28, when the worker brings his or her fingers holding the optical fiber 9 close to the coating clamp 50 in order to hold and fix the optical fiber 9 to the coating clamp 50, the finger detector 36 detects that the fingers have approached the finger detector 36.

As the finger detector 36, for example, an infrared sensor, a thermo sensor, and the like can be adopted.

In a fusion splicer 10G shown in FIG. 29, when the worker brings his or her fingers holding the fiber holder 40 close to the movable stage 22 in order to place the fiber holder 40, which holds and fixes the optical fiber 9, on the movable stage 22, the finger detector 36 detects that the fingers have approached the finger detector 36.

When the finger detector 36 detects fingers, each detection signal that the driving control device acquires from the finger detector 36 transitions from a non-detected state to a detected state.

In addition, when the fingers (finger) approaching the finger detector 36 are sufficiently spaced apart from the finger detector 36, each detection signal acquired from the finger detector 36 to the driving control device transitions from a detected state to a non-detected state.

In the fusion splicers 10F and 10G shown in FIGS. 28 and 29, in the fiber set standby state, both detection signals that the driving control device acquires from a pair of finger detectors 36 provided on the left and right sides of the heat fusion portion 24A transition from a non-detected state to a detected state, and both the detection signals transition to the non-detected state later.

This serves as a trigger signal to start the fiber fusion and inspection operation.

Figure 30:
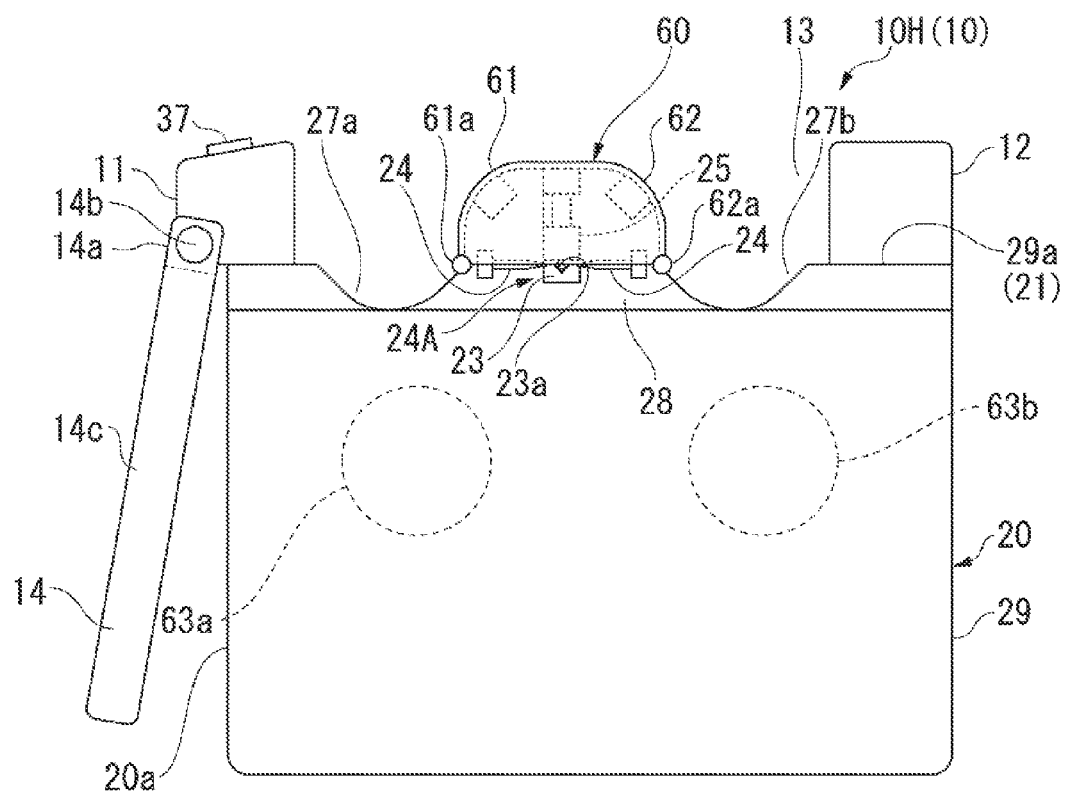
FIG. 30 is a side view showing an example of a fusion splicer having a configuration in which an operation command input operating portion is provided, and is a diagram showing a state where the windshield cover is closed.
Figure 31:
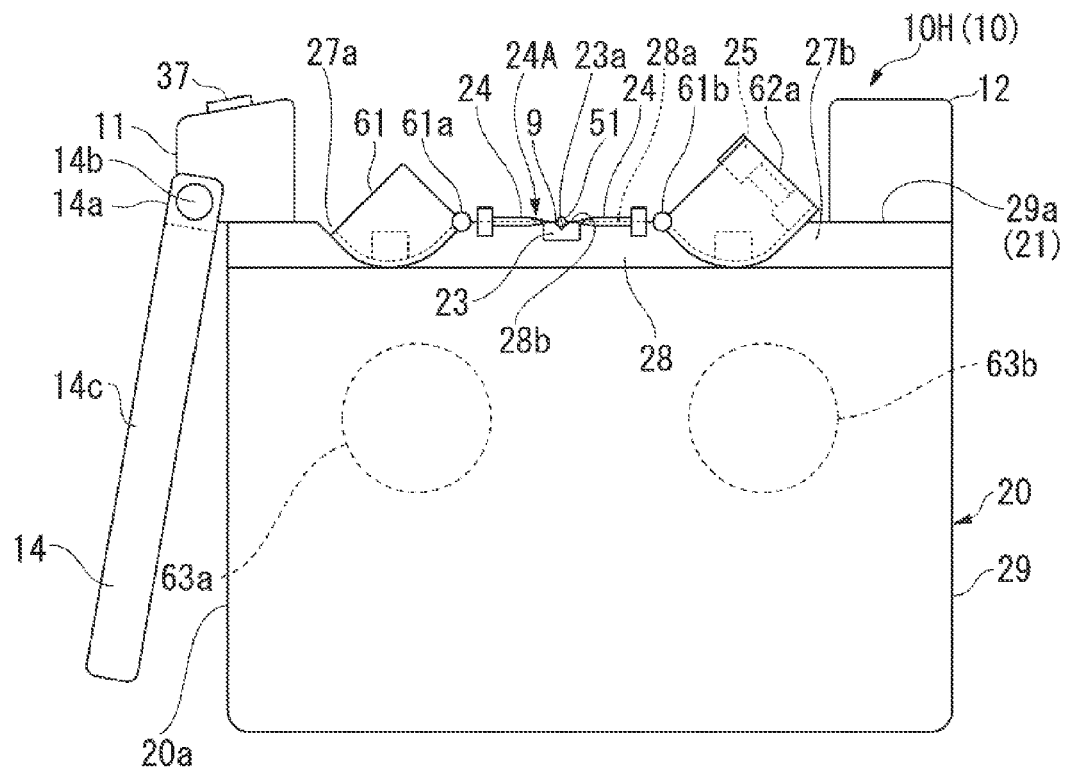
FIG. 31 is a side view showing an example of a fusion splicer having a configuration in which an operation command input operating portion is provided, and is a diagram showing a state where the windshield cover is open.

FIGS. 30 and 31 show a fusion splicer 10H obtained by adding an operation command input operating portion 37, to which an operation start command is input by manual operation, to the fusion splicer 10A described above.

Specifically, the operation command input operating portion 37 in the example shown in the drawings is a push button provided in the switch board 11.

In addition, the fusion splicer 10H is configured in the same manner as the above-described fusion splicer 10A except for the operation command input operating portion 37 and the driving control device.

For this reason, the fusion splicer 10H will be described with reference to the drawings including FIG. 1, which illustrate the above fusion splicer 10A, and FIGS. 30 and 31.

In the fusion splicer 10H, in the fiber set standby state, both detection signals that the driving control device acquires from the detector bodies 31a of a pair of clamp closing detectors 31 (refer to FIG. 1) provided on the left and right sides of the heat fusion portion 24A transition from a non-detected state to a detected state.

Then, operation specification is input to the driving control device by the operation command input operating portion 37 (refer to FIGS. 30 and 31, here, of a push button).

This serves as a trigger signal to start the fiber fusion and inspection operation.

That is, in the fusion splicer 10H, in the fiber set standby state, the fiber fusion and inspection operation is not started just by transition of both detection signals, which the driving control device acquires from the detector bodies 31a of a pair of clamp closing detectors 31 provided on the left and right sides of the heat fusion portion 24A, from a non-detected state to a detected state.

In the fusion splicer 10H, for example, in the fiber set standby state, the optical fiber 9 is held and fixed to the coating clamp 50 provided on each of the left and right sides of the heat fusion portion 24A, and then the worker operates the operation command input operating portion 37 (here, a push button) after visually checking the arrangement state of the tip of the optical fiber 9 and the like.

In this manner, fusion splice can be more reliably performed in a state where there is no positional deviation of the optical fiber 9 and the like.

As the fusion splicer according to the embodiment of the present invention, for example, the operation command input operating portion 37 is added to the fusion splicer 10B illustrated in FIG. 2. Therefore, in the fiber set standby state, both detection signals that the driving control device acquires from the detector bodies 31a of a pair of holder mounting detectors 32 provided on the left and right sides of the heat fusion portion 24A transition from a non-detected state to a detected state, and then operation specification is input to the driving control device by the operation of pushing the operation command input operating portion 37 (push button).

It is possible to adopt a fusion splicer that starts the fiber fusion and inspection operation with the above as a trigger signal.

In addition, as a fiber mounting work detector of a fusion splicer in which the operation command input operating portion 37 is provided, it is possible to adopt the fiber mounting detectors illustrated in FIGS. 23, 24, 26, and 27 and the finger detector 36 illustrated in FIGS. 28 and 29.

In a fusion splicer whose fiber mounting work detector is the finger detector 36, in the fiber set standby state, both detection signals that the driving control device acquires from a pair of finger detectors 36 provided on the left and right sides of the heat fusion portion 24A transition from a non-detected state to the detected state and then transition to the non-detected state, and then operation specification is input to the driving control device by the operation of the operation command input operating portion 37 (push button).

The fiber fusion and inspection operation can be started with this operation as a trigger signal.

In addition, it is possible to adopt a fusion splicer that does not have the operation command input operating portion 37 and that starts the fiber fusion and inspection operation when both detection signals, which the driving control device acquires from the fiber mounting detectors provided on the left and right sides of the heat fusion portion 24A, transition from a non-detected state to a detected state in the fiber set standby state (that is, with this as a trigger signal).

In this case, it is possible to reduce the time needed to complete fusion splice from the completion of mounting of the optical fiber 9 with respect to the apparatus, compared with a fusion splicer that requires the input of operation command from the operation command input operating portion 37 when starting the fiber fusion and inspection operation as the fusion splicer 10H illustrated in FIGS. 30 and 31.

This is the same for a fusion splicer having a configuration in which a fiber mounting work detector is the finger detector 36 and the fiber fusion and inspection operation is started when both detection signals, which the driving control device acquires from a pair of fiber mounting detectors provided on the left and right sides of the heat fusion portion 24A, transition from a non-detected state to a detected state and then transition to the non-detected state (that is, with this as a trigger signal).

The location of the operation command input operating portion 37 in the fusion splicer is not particularly limited. For example, the location of the operation command input operating portion 37 may be the side surface of apparatus body 20.

The operation command input operating portion 37 is not limited to the push button.

As the operation command input operating portion 37, for example, a dial type switch or a slide type switch can also be adopted.

In addition, it is also possible to use a touch panel as the monitor device 14 of the fusion splicer and to use a touch button, which is displayed on the touch panel, as the operation command input operating portion 37.

What is claimed is:

1. An optical fiber fusion splicer comprising:
an apparatus body having a heat fusion portion that fusion-splices optical fibers;
a windshield cover that is formed so as to be openable and closable with respect to the apparatus body by one or more cover members and that covers the heat fusion portion in a closed state;
clamp mounts or a pair of holder mounting portions that are provided on both sides of the heat fusion portion of the apparatus body;
a coating clamp that holds a coated portion of the optical fiber between a lower clamp member fixed on the clamp mount and an upper clamp member pivotally attached to the lower clamp member so as to be openable and closable with respect to the lower clamp member, or a fiber holder that holds a coated portion of the optical fiber between a base plate and a cover plate pivotally attached to the base plate so as to be openable and closable with respect to the base plate, the fiber holder being detachably placed on the holder mounting portion;

fiber mounting detectors that are respectively provided in both of the clamp mounts or both of the fiber mounting portions; and a windshield open and close power source that is configured to open and close the windshield cover, wherein the fiber mounting detectors are configured to detect that the optical fiber has been mounted by detecting either one of that the upper clamp member of the coating clamp has been closed with respect to the lower clamp member, that the fiber holder has been mounted on the holder mounting portion, that the optical fiber has been placed on the lower clamp member of the coating clamp, and that the optical fiber held and fixed to the fiber holder has been disposed at a predetermined position on the holder mounting portion as optical fiber mounting, and when both of the fiber mounting detectors detect that the optical fibers have been mounted, an operation to close the windshield cover by driving the windshield cover with the windshield open and close power source is performed in a state where the windshield cover is open, and an operation to open the windshield cover by driving the windshield cover with the windshield open and close power source is performed after the connection portion inspection is completed.

2. The optical fiber fusion splicer according to claim 1, wherein the clamp mounts serve as the holder mounting portion, one of the coating clamp and the fiber holder is selectively mountable to the clamp mounts, and the fiber mounting detectors are configured to detect that the optical fibers have been mounted by detecting that the upper clamp member of the coating clamp has been closed with respect to the lower clamp member mounted in the clamp mounts and that the fiber holder has been placed on the clamp mounts.

3. The optical fiber fusion splicer according to claim 1, wherein the clamp mounts, to which the coating clamp is attached, or the holder mounting portions are located on both sides of the heat fusion portion and are disposed on a movable stage that moves moved back and forth toward the heat fusion portion with respect to the apparatus body, and the fiber mounting detector is incorporated in the movable stage.

4. The optical fiber fusion splicer according to claim 1, further comprising:

positioning grooves that are provided on both sides of the heat fusion portion, the positioning grooves being disposed between the heat fusion portion and both of the clamp mounts or both of the holder mounting portions; and fiber clamp members that are connected to the cover members, the fiber clamp members pushing the optical fibers into the positioning grooves when the windshield cover is closed, wherein the windshield cover is formed by two or more cover members that are powered by the cover open and close power source, and covers the heat fusion portion, both of the positioning grooves, the fiber clamp members, and the fiber holder or the coating clamp placed on both of the holder mounting portions in a closed state, the one or more cover members are rotating cover members, which are opened and closed by being rotated around a rotating shaft disposed along an upper surface of the apparatus body, and a rotational operation range exceeding 90° is secured in the rotating cover member, and the fiber clamp member is provided to an inside of the rotating cover member and is connected to a clamp arm detachably connected to the rotating cover member, and is opened and closed with respect to the positioning groove so as to be interlocked with opening and closing operation of the rotating cover member.

5. The optical fiber fusion splicer according to claim 4, wherein the windshield cover is divided into two rotating cover members in a back-and-forth direction.

6. The optical fiber fusion splicer according to claim 5, wherein a light source for imaging that emits light when imaging each of the optical fibers with a camera is disposed on an inner side of each of the two divided rotating cover members.

7. The optical fiber fusion splicer according to claim 4, wherein a groove formed substrate having an upper surface, on which the positioning groove is provided, is provided on the apparatus body, and an axis of the rotating shaft of the rotating cover member is disposed on approximately the same plane as the upper surface of the groove formed substrate.

8. The optical fiber fusion splicer according to claim 4, wherein the cover members in a state of being opened do not protrude outward from the apparatus body in plan view of the optical fiber fusion splicer.

9. The optical fiber fusion splicer according to claim 1, wherein a power source for opening and closing the cover member of the windshield cover generates power by electromagnetic force, and at least one of an electric motor, an electromagnet, and a solenoid is used.

10. The optical fiber fusion splicer according to claim 9, wherein in an operation to open and close the cover member to which the fiber clamp member is connected, when closing the cover member, the cover member is driven at high speed at the start of closing and at a speed, which is lower than that at the start of closing, at the end of closing.

11. The optical fiber fusion splicer according to claim 1, wherein when a detection signals from both of the fiber mounting detectors transitions from a non-detected state to a detected state in a state where the windshield cover is open, the operation to close and open the windshield cover is performed.

12. The optical fiber fusion splicer according to claim 1, further comprising a windshield cover detector which detects an open or closed state of the windshield cover.

13. The optical fiber fusion splicer according to claim 1, wherein the windshield cover is formed by two or more cover members, and one or more cover members are opened and closed by being rotated around the rotating shaft disposed along an apparatus body top surface, and cover member housing grooves are formed on an upper end of the apparatus body so as to be recessed from the apparatus body top surface, the cover member housing grooves housing the cover members in a state of being opened.

14. An optical fiber fusion splicer comprising:
an apparatus body having a heat fusion portion that fusion-splices optical fibers;
a windshield cover that is formed so as to be openable and closable with respect to the apparatus body by one or more cover members and that covers the heat fusion portion in a closed state;
clamp mounts or holder mounting portions that are provided on both sides of the heat fusion portion of the apparatus body;
a coating clamp that holds a coated portion of the optical fiber between a lower clamp member fixed on the clamp mount and an upper clamp member pivotally attached to the lower clamp member so as to be openable and closable with respect to the lower clamp member, or a fiber holder that holds a coated portion of the optical fiber between a base plate and a cover plate pivotally attached to the base plate so as to be openable and closable with respect to the base plate, the fiber holder being detachably placed on the holder mounting portion;
fiber mounting detectors that are respectively provided in both of the clamp mounts or both of the fiber mounting portions;
a windshield open and close power source that is configured to open and close the windshield cover; and
an operation command input operating portion to which an operation start command is configured to be input by manual operation, wherein
the fiber mounting detectors are configured to detect that the optical fibers have been mounted by detecting either one of that the upper clamp member of the coating clamp has been closed with respect to the lower clamp member, that the fiber holder has been mounted on the holder mounting portion, that the optical fibers have been placed on the lower clamp member of the coating clamp, and that the optical fibers held and fixed to the fiber holder have been disposed at a predetermined position on the holder mounting portion as optical fiber mounting, and
when both of the fiber mounting detectors detect that the optical fibers have been mounted and the operation start command is input from the operation command input operating portion, an operation to close the windshield cover by driving the windshield cover with the windshield open and close power source is performed in a state where the windshield cover is open, and an operation to open the windshield cover by driving the windshield cover with the windshield open and close power source is performed after the connection portion inspection is completed.

15. The optical fiber fusion splicer according to claim 14, wherein
when both of the fiber mounting detectors detect that the optical fibers have been mounted and the operation start command is input from the operation command input operating portion in a state where the cover member is open, the operation to close the windshield cover is performed.

* * * * *